US009660546B2

(12) United States Patent
Kato et al.

(10) Patent No.: US 9,660,546 B2
(45) Date of Patent: May 23, 2017

(54) COIL STRUCTURE AND POWER CONVERTER

(71) Applicant: Panasonic Intellectual Property Management Co., Ltd., Osaka (JP)

(72) Inventors: Akira Kato, Osaka (JP); Kazuyuki Sakiyama, Osaka (JP); Hirohide Ichihashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 104 days.

(21) Appl. No.: 14/636,995

(22) Filed: Mar. 3, 2015

(65) Prior Publication Data

US 2015/0270052 A1 Sep. 24, 2015

(30) Foreign Application Priority Data

Mar. 20, 2014 (JP) ................................ 2014-057709

(51) Int. Cl.
*H01F 27/00* (2006.01)
*H02M 7/04* (2006.01)
*H01F 3/12* (2006.01)
*H01F 27/38* (2006.01)

(52) U.S. Cl.
CPC ................ *H02M 7/04* (2013.01); *H01F 3/12* (2013.01); *H01F 27/00* (2013.01); *H01F 27/38* (2013.01)

(58) Field of Classification Search
CPC ........................ H01F 27/00–27/30; H01F 5/00
USPC ..................... 336/65, 83, 200, 212–215, 232
See application file for complete search history.

(56) References Cited

U.S. PATENT DOCUMENTS

| | | | | | |
|---|---|---|---|---|---|
| 1,609,141 | A * | 11/1926 | Thompson | G05F 3/06 | 323/344 |
| 2,844,804 | A * | 7/1958 | Roe | H01F 29/146 | 336/160 |
| 3,697,912 | A * | 10/1972 | Solli | H01F 29/10 | 336/133 |
| 4,737,704 | A * | 4/1988 | Kalinnikov | G05F 1/16 | 174/DIG. 17 |

(Continued)

FOREIGN PATENT DOCUMENTS

| | | |
|---|---|---|
| JP | 57-015408 | 1/1982 |
| JP | 58-039024 U | 3/1983 |

(Continued)

*Primary Examiner* — Tuyen Nguyen
(74) *Attorney, Agent, or Firm* — McDermott Will & Emery LLP

(57) ABSTRACT

A coil structure includes: a magnetic core that defines a closed loop magnetic path in which a magnetic flux flows, the magnetic core including a core leg; a coil that is wound around the core leg about a coil axis extending in a first direction, the coil generating the magnetic flux; a detour member that is separate from the magnetic core, the detour member defining a detour magnetic path that detours around the closed loop magnetic path between first and second points, the detour member including a first piece that defines the first point and a second piece that defines the second point; and a fixing portion that includes an adjoining member adjoining the core leg and a connecting portion connecting at least one of the first piece and the second piece to the adjoining member and fixes positional relations among the core leg and the first and second points.

16 Claims, 34 Drawing Sheets

(56) References Cited

U.S. PATENT DOCUMENTS 7,145,421 B2 * 12/2006 Gamba .................. H01F 38/30
335/172

FOREIGN PATENT DOCUMENTS

| | | |
|---|---|---|
| JP | 2000-306746 | 11/2000 |
| JP | 2009-225527 | 10/2009 |

* cited by examiner

| RELATIVE PERMEABILITY | NO DETOUR MEMBER | 60 | 1000 | 1000 | 1000 | 3300 |
|---|---|---|---|---|---|---|
| THICKNESS (T) | | 1 mm | 1 mm | 2 mm | 1 mm | 1 mm |
| WIDTH (W) | | 10 mm | 0.5 mm | 0.5 mm | 10 mm | 0.5 mm |
| LEAKAGE INDUCTANCE | 4.2 uH | 5.1 uH | 5.5 uH | 6.7 uH | 15.6 uH | 8.1 uH |

COIL STRUCTURE AND POWER CONVERTER

CROSS REFERENCES TO RELATED APPLICATIONS

This Application claims priority to Japanese Patent Application No. 2014-057709, filed on Mar. 20, 2014, the contents of which are hereby incorporated by reference.

BACKGROUND

1. Technical Field

The present disclosure relates to a coil structure that causes leakage inductance, and a power converter that includes the coil structure.

2. Description of the Related Art

A coil structure is used variously in, for example, a reactor, a transformer, or a motor. Causing leakage inductance to occur in the coil structure enables such devices to achieve desired performance. Japanese Unexamined Utility Model Registration Application Publication No. 558-39024, Japanese Unexamined Patent Application Publication No. S57-15408, and Japanese Unexamined Patent Application Publication No. 2000-306746 suggest various techniques for causing leakage inductance.

SUMMARY

The above-mentioned conventional techniques lack flexibility in designing an occurrence position of leakage inductance and ease of adjustment of the leakage inductance.

One non-limiting and exemplary embodiment provides techniques that relate to an occurrence position of leakage inductance, offer high flexibility in design, and may facilitate adjustment of the magnitude of the leakage inductance.

In one general aspect, the techniques disclosed here feature a coil structure including a magnetic core that defines a closed loop magnetic path in which a magnetic flux flows, the magnetic core including a core leg; a coil that is wound around the core leg about a coil axis extending in a first direction, the coil generating the magnetic flux; a detour member that is separate from the magnetic core, the detour member defining a detour magnetic path that detours around the closed loop magnetic path between a first point and a second point located apart from the first point in the first direction, one of the first point and the second point being located at a position at which a part of the magnetic flux that flows along the core leg is caused to flow into the detour magnetic path, the other of the first point and the second point being located at a position at which the part of the magnetic flux that flows along the detour magnetic path is caused to meet the magnetic flux that flows along the core leg, the detour member including a first piece and a second piece, the first piece defining the first point, the second piece defining the second point; and a fixing portion that includes an adjoining member and a connecting portion, the adjoining member adjoining the core leg, the connecting portion connecting at least one of the first piece and the second piece to the adjoining member, the connecting portion fixing a first positional relation between the core leg and the first point and a second positional relation between the core leg and the second point.

It should be noted that general or specific embodiments may be implemented as a coil structure, a power converter, a device, a system, a method, or any selective combination thereof.

The present disclosure may provide techniques that relate to an occurrence position of leakage inductance, offer high flexibility in design, and facilitate adjustment of the magnitude of the leakage inductance.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
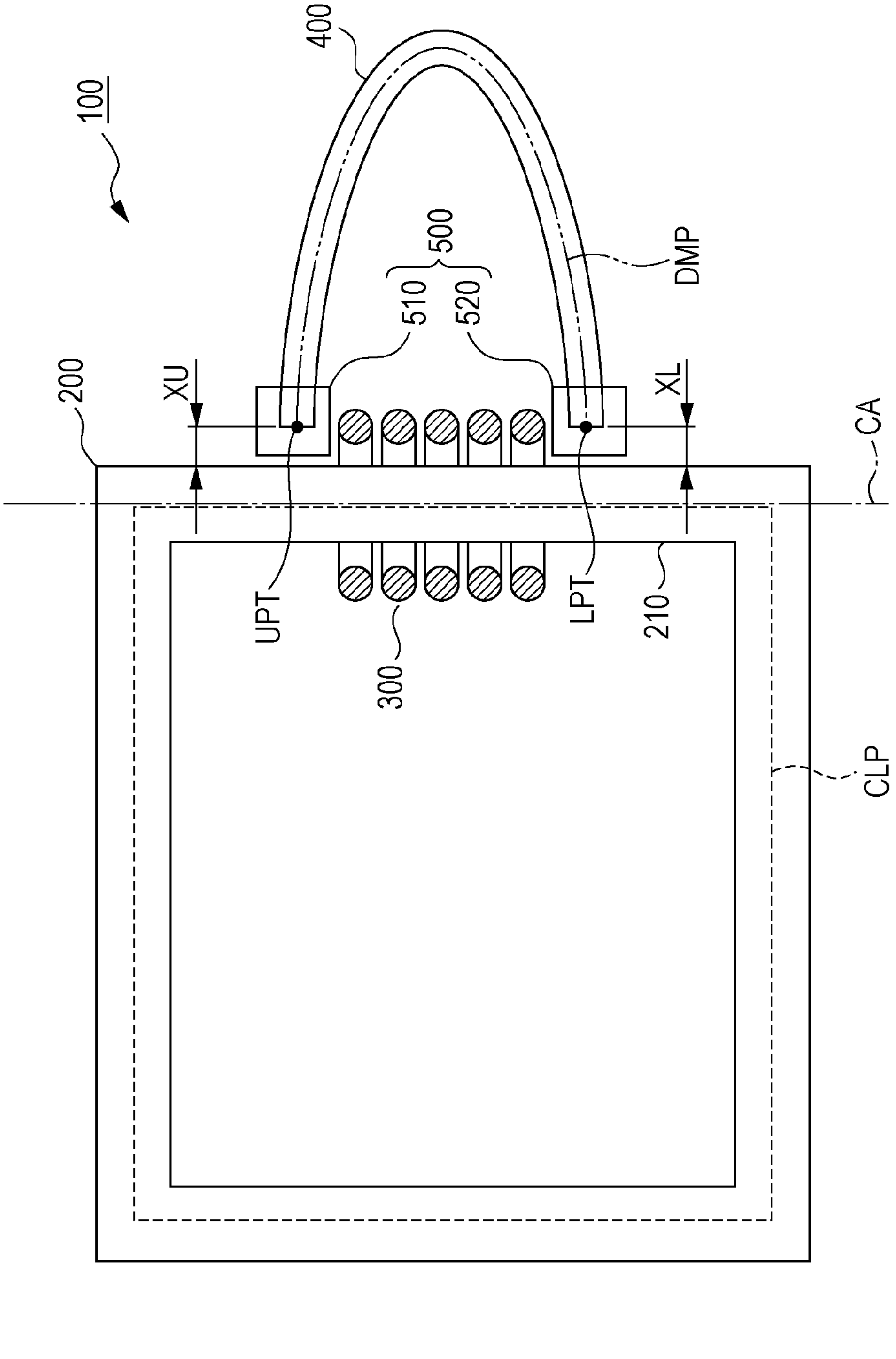
FIG. 1 is a conceptual view of a coil structure according to Embodiment 1.

Japanese Unexamined Utility Model Registration Application Publication No. S58-39024 and Japanese Unexamined Patent Application Publication No. S57-15408 each disclose a rectangular magnetic frame and a magnetic core that extends vertically in the magnetic frame. Each coil structure according to Japanese Unexamined Utility Model Registration Application Publication No. S58-39024 and Japanese Unexamined Patent Application Publication No. S57-15408 includes a pair of coil portions aligned along the magnetic core, and a magnetic member that forms a magnetic path extending horizontally between the pair of coil portions. Japanese Unexamined Utility Model Registration Application Publication No. S58-39024 and Japanese Unexamined Patent Application Publication No. S57-15408 each suggest techniques for causing leakage inductance using the magnetic member.

According to the techniques disclosed by Japanese Unexamined Utility Model Registration Application Publication No. S58-39024 and Japanese Unexamined Patent Application Publication No. S57-15408, the arrangement position of the magnetic member is limited to the inside of the magnetic frame. Thus, the techniques disclosed by Japanese Unexamined Utility Model Registration Application Publication No. 558-39024 and Japanese Unexamined Patent Application Publication No. S57-15408 hardly tolerate a change in the occurrence position of the leakage inductance.

Japanese Unexamined Patent Application Publication No. 2000-306746 discloses a primary coil, a secondary coil that surrounds the primary coil, and a magnetic substance that is partially sandwiched between the primary coil and the secondary coil. Japanese Unexamined Patent Application Publication No. 2000-306746 suggests techniques for causing leakage inductance using the magnetic substance. With the above-described structure, however, when replacement of the magnetic substance is attempted so as to adjust the magnitude of the leakage inductance, the coil structure needs to be wholly disassembled. Accordingly, the techniques disclosed by Japanese Unexamined Patent Application Publication No. 2000-306746 are not suitable for the adjustment of the magnitude of the leakage inductance.

Thus, the present disclosure provides techniques that relate to an occurrence position of leakage inductance, offer high flexibility in design, and may facilitate adjustment of the magnitude of the leakage inductance.

A coil structure according to an aspect of the present disclosure includes a magnetic core that defines a closed loop magnetic path in which a magnetic flux flows, the magnetic core including a core leg; a coil that is wound around the core leg about a coil axis extending in a first direction, the coil generating the magnetic flux; a detour member that is separate from the magnetic core, the detour member defining a detour magnetic path that detours around the closed loop magnetic path between a first point and a second point located apart from the first point in the first direction, one of the first point and the second point being located at a position at which a part of the magnetic flux that flows along the core leg is caused to flow into the detour magnetic path, the other of the first point and the second point being located at a position at which the part of the magnetic flux that flows along the detour magnetic path is caused to meet the magnetic flux that flows along the core leg, the detour member including a first piece and a second piece, the first piece defining the first point, the second piece defining the second point; and a fixing portion that includes an adjoining member and a connecting portion, the adjoining member adjoining the core leg, the connecting portion connecting at least one of the first piece and the second piece to the adjoining member, the connecting portion fixing a first positional relation between the core leg and the first point and a second positional relation between the core leg and the second point.

According to the above-described configuration, the detour member detours part of the magnetic flux that flows in the closed loop magnetic path formed by the magnetic core. Thus, the coil structure may cause leakage inductance using the detour member. Since the detour member is formed so as to be separate from the magnetic core, the detour member may be designed, in designing the coil structure, almost independently of the performance that the magnetic core is desired to exhibit. Accordingly, the magnitude of the leakage inductance may be set suitably. The occurrence position of the leakage inductance is defined according to the first positional relation between the core leg and the first point, and the second positional relation between the core leg and the second point. Thus, the occurrence position of the leakage inductance may be selected suitably from various positions around the core leg. Since the fixing portion fixes the first positional relation and the second positional relation, the coil structure may maintain the leakage inductance with a suitable magnitude. The detour member may be replaced without wholly disassembling the coil structure by canceling the fixing of the first positional relation and the second positional relation, which has been performed by the fixing portion. Accordingly, the leakage inductance may be adjusted easily.

Further, since the first piece that defines the first point and the second piece that defines the second point are connected to the adjoining member arranged next to the core leg by the connecting portion, in designing the coil structure, the detour member may be designed almost independently of the performance that the core leg is desired to exhibit.

In the above-described configuration, the fixing portion may include an adhesive that fixes at least one of the first positional relation and the second positional relation.

According to the above-described configuration, since at least one of the first positional relation and the second positional relation is fixed by the adhesive, the coil structure may be easily manufactured using the adhesive.

In the above-described configuration, the fixing portion may include a molding material that fixes at least one of the first positional relation and the second positional relation.

According to the above-described configuration, since at least one of the first positional relation and the second positional relation is fixed by the molding material, the coil structure may be easily manufactured using the molding material.

In the above-described configuration, the adjoining member may include a bobbin portion that includes: a tube-like portion around which the coil is wound; a first plate extending outward from the tube-like portion; and a second plate being located apart from the first plate in the first direction and extending outward from the tube-like portion. The connecting portion may connect the first piece to the first plate. The connecting portion may connect the second piece to the second plate.

According to the above-described configuration, since the detour member is attached to a bobbin portion, the detour member may be replaced without wholly disassembling the coil structure. Thus, the leakage inductance may be easily adjusted.

In the above-described configuration, the detour magnetic path may pass through a third point located further apart from the coil axis than the first point and the second point. The first piece may extend in a second direction along the first plate and a virtual plane that includes the coil axis and the third point.

According to the above-described configuration, since the first piece extends in the second direction along the first plate and the virtual plane, the first plate may structurally strengthen the first piece.

In the above-described configuration, the connecting portion may include a insertion hole being provided to the first plate and extending in a second direction. The connecting portion may connect the first piece to the adjoining member by causing the first piece to be inserted into the insertion hole.

According to the above-described configuration, in manufacturing the coil structure, the detour member may be easily attached to the first bobbin portion by inserting the first piece into the insertion hole.

In the above-described configuration, the connecting portion may include an insertion groove being provided to the first plate and extending in a second direction. The connecting portion may connect the first piece to the adjoining member by causing the first piece to be inserted into the insertion groove.

According to the above-described configuration, in manufacturing the coil structure, the detour member may be easily attached to the first bobbin portion by inserting the first piece into the insertion groove.

In the above-described configuration, the detour member may include an outer shell member that covers the detour member at least partially.

According to the above-described configuration, the outer shell member may structurally strengthen the first piece and the second piece.

In the above-described configuration, the connecting portion includes an insertion groove being provided to the first plate and extending in a second direction. The connecting portion may connect the first piece to the adjoining member by causing the outer shell member to be inserted into the insertion groove. The connecting portion may include a projecting portion that projects in the insertion groove. The outer shell member includes a depressed portion complementary to the projecting portion. Engagement of the projecting portion and the depressed portion may hinder displacement of the first piece in the second direction.

According to the above-described configuration, since the engagement of the projecting portion and the depressed portion hinders displacement of the first piece in the second direction, the first positional relation may be fixed suitably.

In the above-described configuration, the connecting portion may include an insertion groove being provided to the first plate and extending in a second direction. The connecting portion may connect the first piece to the adjoining member by causing the outer shell member to be inserted into the insertion groove. The connecting portion may include a depressed portion that is depressed in the insertion groove. The outer shell member may include a projecting portion complementary to the depressed portion. Engagement of the projecting portion and the depressed portion may hinder displacement of the first piece in the second direction.

According to the above-described configuration, since the engagement of the projecting portion and the depressed portion hinders displacement of the first piece in the second direction, the first positional relation may be fixed suitably.

In the above-described configuration, the detour member may include a first magnetic piece and a second magnetic piece arranged next to the first magnetic piece, the first magnetic piece including the first piece and the second piece. The outer shell member may include an accommodation groove capable of accommodating the first magnetic piece and the second magnetic piece.

According to the above-described configuration, the magnitude of the leakage inductance may be easily adjusted using the first magnetic piece and the second magnetic piece.

In the above-described configuration, the first piece may include a first facing end that faces the core leg. The second piece may include a second facing end that faces the core leg. The first facing end and the second facing end may be in contact with the core leg.

According to the above-described configuration, since the first facing end and the second facing end are in contact with the core leg, the magnetic flux that flows along the detour member is unlikely to be released into the air.

In the above-described configuration, the detour member may be detachable from the bobbin portion.

According to the above-described configuration, since the detour member is detachable from the bobbin portion, the detour member may be replaced without wholly disassembling the coil structure. Thus, the leakage inductance may be easily adjusted.

In the above-described configuration, the adjoining member may include a second coil portion attached to the magnetic core. Supplying one of the first coil portion and the second coil portion with current may cause induced current in the other of the first coil portion and the second coil portion.

According to the above-described configuration, the first coil portion and the second coil portion may cause induced current in cooperation with each other.

In the above-described configuration, the adjoining member may include a second bobbin portion that holds the second coil portion. The magnetic core may include a magnetic frame that surrounds the first bobbin portion and the second bobbin portion. The core leg may be inserted into the first bobbin portion and the second bobbin portion in the magnetic frame.

According to the above-described configuration, the magnetic core may allow magnetic flux to flow along the closed loop magnetic path that surrounds the first bobbin portion and the second bobbin portion. Since part of the magnetic flux that flows through the core leg in the magnetic frame is detoured by the detour member, the coil structure may cause leakage inductance to occur suitably.

In the above-described configuration, the coil structure may further include a coil unit that surrounds a second coil axis defined next to the first coil axis and performs an electromagnetic operation. The adjoining member may include the second bobbin portion that holds the second coil portion. The magnetic core may include a second core leg inserted in the coil unit along the second coil axis, a first linkage portion that extends between the first core leg and the second core leg, a second linkage portion that is located apart from the first linkage portion in the first direction and is linked to the first core leg and the second core leg. The first core leg may be inserted in the first bobbin portion and the second bobbin portion. The second core leg may be inserted in the coil unit along the second coil axis.

According to the above-described configuration, the magnetic core may allow magnetic flux to flow along the closed loop magnetic path defined by the first core leg, the second core leg, the first linkage portion, and the second linkage portion. Since part of the magnetic flux that flows in the first core leg is detoured by the detour member, the coil structure may cause leakage inductance to occur suitably.

In the above-described configuration, the coil unit may include a third coil portion and a fourth coil portion that surround the second coil axis. Supplying current to one of the third coil portion and the fourth coil portion may cause induced current to occur in the other of the third coil portion and the fourth coil portion.

According to the above-described configuration, since the supply of current to one of the third coil portion and the fourth coil portion causes induced current to occur in the other of the third coil portion and the fourth coil portion, the dimensions of the coil structure in the first direction may be set to small values.

In the above-described configuration, one of the first piece and the second piece may be arranged between the first bobbin portion and the second bobbin portion.

According to the above-described configuration, since one of the first piece and the second piece is arranged between the first bobbin portion and the second bobbin portion, the first bobbin portion and the second bobbin portion may stabilize the position of the detour member in the first direction.

In the above-described configuration, the second coil portion may surround the second coil axis defined next to the first coil axis. The adjoining member may include the second bobbin portion that holds the second coil portion. The magnetic core may include the second core leg inserted in the second bobbin portion along the second coil axis, the first linkage portion that extends between the first core leg and the second core leg, and the second linkage portion that is located apart from the first linkage portion in the first direction and linked to the first core leg and the second core leg.

According to the above-described configuration, since the second coil portion is formed around the second coil axis defined next to the first coil axis, the dimensions of the coil structure in the first direction may be set to small values.

In the above-described configuration, the detour member may include a first magnetic material. The magnetic core may include a second magnetic material. The first magnetic material may be different from the second magnetic material.

According to the above-described configuration, since the detour member is formed from a magnetic material different from the magnetic core, not only the leakage inductance caused by the detour member but the mechanical strength of the detour member may also be suitably set.

A power converter according to another aspect of the present disclosure includes the coil structure described above and a switching circuit that includes a switching element.

According to the above-described configuration, the power converter may operate while the leakage inductance is suitably set.

A method of manufacturing a coil structure according to still another aspect of the present disclosure includes a process of preparing a magnetic core that includes a core leg that defines the coil axis extending in a first direction and forms a closed loop magnetic path in which magnetic flux flows, a process of winding a winding around the core leg, and a process of attaching a detour member that defines a detour magnetic path for detouring the closed loop magnetic path between a first point and a second point located apart from the first point in the first direction to the magnetic core around which the winding is wound. The process of attaching the detour member includes a step of fixing a first positional relation between the core leg and the first point, and a second positional relation between the core leg and the second point.

With reference to the accompanying drawings, various embodiments that relate to the coil structure, the power converter, and the method of manufacturing the coil structure are described below. The description below enables the coil structure, the power converter, and the method of manufacturing the coil structure to be understood clearly. Expressions indicating directions, which include "upper", "lower", "left", and "right", are merely intended to clarify the description. Accordingly, such expressions should not be interpreted restrictively.

Embodiment 1

FIG. 1 is a conceptual view of a coil structure 100 according to Embodiment 1. The coil structure 100 is described with reference to FIG. 1.

The coil structure 100 includes a magnetic core 200, a coil portion 300, a detour member 400, and a fixing portion 500. The coil portion 300 may be supplied with current. Magnetic flux flows along the magnetic core 200 accordingly. Alternatively, magnetic flux that flows in the magnetic core 200 may be generated by causing induced current to occur in the coil portion 300. The principle of the present embodiment is not limited to specific magnetic flux generating techniques for the coil structure 100. In the present embodiment, the coil portion 300 exemplifies the first coil portion.

FIG. 1 illustrates a closed loop magnetic path CLP and a coil axis CA. The closed loop magnetic path CLP is defined by the magnetic core 200. The above-described magnetic flux flows along the closed loop magnetic path CLP. The magnetic flux may flow clockwise or may flow counterclockwise. The direction in which the magnetic flux flows does not limit the principle of the present embodiment at all.

The magnetic core 200 defines the closed loop magnetic path CLP, which is rectangular. Alternatively, the closed loop magnetic path CLP may have another shape. The principle of the present embodiment is not limited to a specific shape of the closed loop magnetic path CLP at all.

The coil axis CA overlaps the closed loop magnetic path CLP. The coil portion 300 surrounds the coil axis CA. The magnetic core 200 includes a core leg 210 inserted in the coil portion 300 along the coil axis CA. In the present embodiment, the coil axis CA exemplifies the coil axis. The core leg 210 exemplifies the core leg. The direction in which the coil axis CA extends exemplifies the first direction.

The detour member 400 is formed so as to be separate from the magnetic core 200. Accordingly, in manufacturing the coil structure 100, the detour member 400 may be attached after forming the coil portion 300 around the core leg 210 of the magnetic core 200. The detour member 400 defines a detour magnetic path DMP in which part of the magnetic flux that flows along the closed loop magnetic path CLP flows.

The detour member 400 may include a magnetic member formed so as to define the detour magnetic path DMP. Alternatively, in manufacturing the coil structure 100, the detour member 400 that defines the detour magnetic path DMP may be formed by connecting a plurality of magnetic members. If necessary, the magnetic material that defines the detour magnetic path DMP may be covered with resin or another covering material. As a result, the detour member 400 is suitably reinforced.

The magnetic member used for the detour member 400 may be a magnetic material different from the magnetic core 200. When a magnetic member that has a relative permeability lower than the relative permeability of the magnetic core 200 is used for the detour member 400, the cross section of the detour member 400 may be widened. As a result, the detour member 400 may have a mechanical strength that is sufficiently high.

FIG. 1 illustrates an upper point UPT and a lower point LPT. The lower point LPT is located apart from the upper point UPT in the direction in which the coil axis CA extends. The detour magnetic path DMP detours around the closed loop magnetic path CLP between the upper point UPT and the lower point LPT. One of the upper point UPT and the lower point LPT may be defined as an inflow end into which part of the magnetic flux that flows along the core leg 210 flows. The other of the upper point UPT and the lower point LPT may be defined as a meeting end at which the magnetic flux that flows along the detour magnetic path DMP meets the magnetic flux that flows along the core leg 210. The definitions regarding the upper point UPT and the lower point LPT do not limit the principle of the present embodiment at all. In the present embodiment, one of the upper point UPT and the lower point LPT exemplifies the first point. The other of the upper point UPT and the lower point LPT exemplifies the second point.

The fixing portion 500 fixes the detour member 400. The positional relation between the core leg 210 and the upper point UPT, and the positional relation between the core leg 210 and the lower point LPT are fixed accordingly. In the present embodiment, one of the positional relation between the core leg 210 and the upper point UPT, and the positional relation between the core leg 210 and the lower point LPT exemplifies the first positional relation. The other of the positional relation between the core leg 210 and the upper point UPT, and the positional relation between the core leg 210 and the lower point LPT exemplifies the second positional relation.

The fixing portion 500 includes an upper fixing portion 510 and a lower fixing portion 520. The upper fixing portion 510 fixes the positional relation between the core leg 210 and the upper point UPT. The lower fixing portion 520 fixes the positional relation between the core leg 210 and the lower point LPT.

FIG. 1 illustrates a distance XU between the core leg 210 and the upper point UPT. The distance XU is kept at an approximately constant value by the upper fixing portion 510 even while the coil structure 100 is being used.

FIG. 1 illustrates a distance XL between the core leg 210 and the lower point LPT. The distance XL is kept at an approximately constant value by the lower fixing portion 520 even while the coil structure 100 is being used.

The distances XU and XL may each be set to the value of "0". In this case, the detour member 400 is in contact with the core leg 210. As a result, the magnetic flux is unlikely to be released into the air. Alternatively, the distances XU and XL may each be set to a value larger than "0". In this case, the detour member 400 is separated from the core leg 210. The principle of the present embodiment is not limited to specific values of the distances XU and XL.

The upper fixing portion 510 and/or the lower fixing portion 520 may each be an adhesive or a molding material. In manufacturing the coil structure 100, the detour member 400 may be directly attached to the core leg 210 using the adhesive or the molding material.

Alternatively, the detour member 400 may be attached to another member that adjoins the core leg 210, such as a bobbin that maintains the shape of the coil portion 300, using the adhesive or the molding material.

The upper fixing portion 510 and/or the lower fixing portion 520 may be a mechanical connection structure, such as the engagement of a depressed portion and a projecting portion. In this case, a connection structure that separates the detour member 400 in a non-destructive manner may be employed in designing the coil structure 100. The principle of the present embodiment is not limited at all to a specific material or a specific structure applied to the fixing portion 500.

Embodiment 2

The coil structure designed on the basis of the concept described in relation to Embodiment 1 may be manufactured by various manufacturing techniques. Embodiment 2 describes an example of a technique of manufacturing the coil structure.

Figure 2:
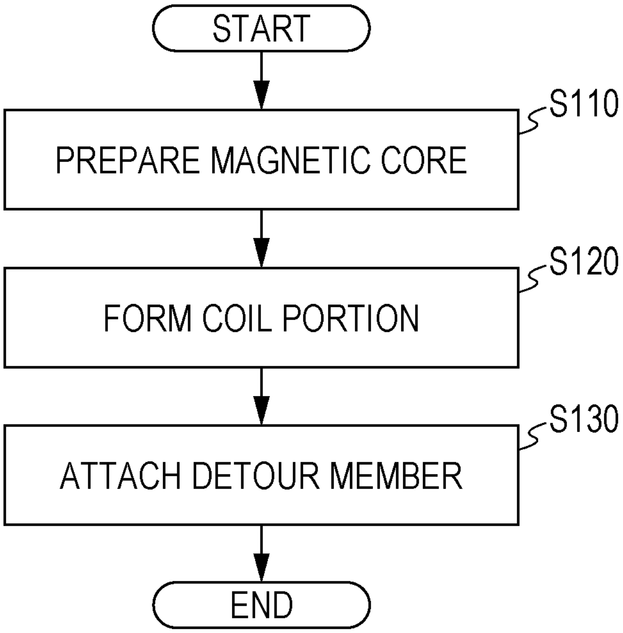
FIG. 2 is a schematic flowchart that illustrates a process of manufacturing a coil structure according to Embodiment 2.

FIG. 2 is a schematic flowchart that illustrates a process of manufacturing the coil structure 100. The process of manufacturing the coil structure 100 is described with reference to FIGS. 1 and 2.

<Step S110>

In step S110, the magnetic core 200 is prepared. The magnitude or shape of the magnetic core 200 may be suitably decided, depending on uses of the coil structure 100 or design requirements of the coil structure 100. After that, step S120 is performed.

<Step S120>

In step S120, a winding is wound around the core leg 210 and the coil portion 300 is formed. After that, step S130 is performed.

<Step S130>

In step S130, the detour member 400 is attached to the magnetic core 200. The position of the detour member 400 may be decided so as to locate the coil portion 300 between the upper point UPT and the lower point LPT. The position of the detour member 400 arranged at a suitable location may be fixed. As a result, the positional relations among the core leg 210, the upper point UPT, and the lower point LPT may be suitably fixed. As described in relation to Embodiment 1, an adhesive or a molding material may be used to fix the detour member 400. Alternatively, the detour member 400 may be mechanically fixed. The principle of the present embodiment is not limited to a specific technique for fixing the detour member 400 at all.

Embodiment 3

Various shapes may be given to the detour magnetic path. Embodiment 3 describes an example of the design principle regarding the detour magnetic path.

Figure 3:
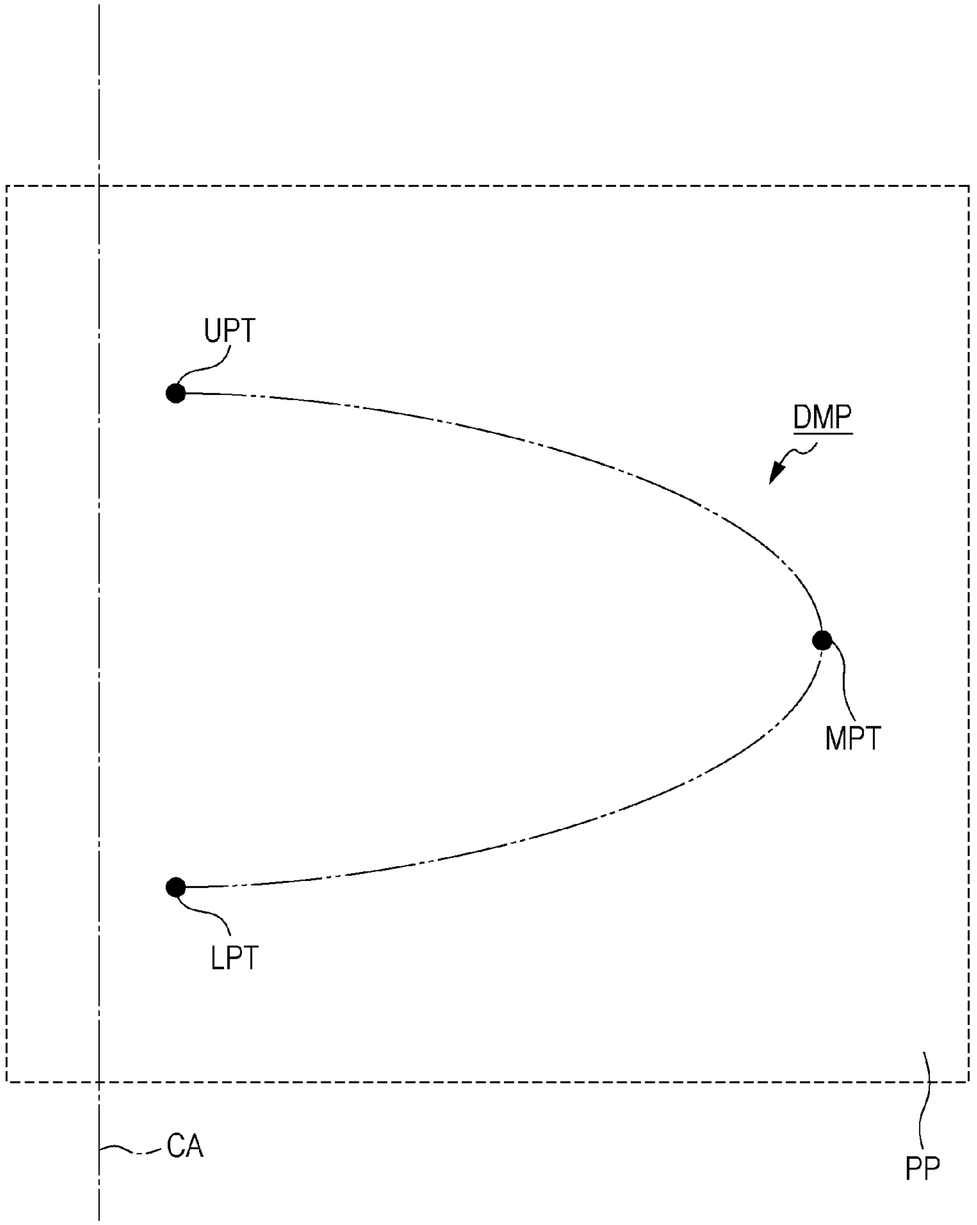
FIG. 3 is a schematic front view of a detour magnetic path according to Embodiment 3.

FIG. 3 is a schematic front view of a detour magnetic path DMP according to Embodiment 3. With reference to FIG. 3, a geometric relation between the detour magnetic path DMP and the coil axis CA is described. The reference alphanumeric characters used in common in Embodiments 1 and 3 imply that the elements to which the common reference alphanumeric characters are given in Embodiment 3 have the same functions as the functions of the elements to which the common reference alphanumeric characters are given in Embodiment 1. Accordingly, the explanation in Embodiment 1 is applied to such elements in Embodiment 3.

As described in relation to Embodiment 1, each of the upper point UPT and the lower point LPT set near the coil axis CA may define an end portion of the detour magnetic path DMP. FIG. 3 illustrates a middle point MPT and a virtual plane PP. The middle point MPT is depicted on the detour magnetic path DMP between the upper point UPT and the lower point LPT. Accordingly, the middle point MPT is positioned farther from the coil axis CA than the upper point UPT and the lower point LPT. The virtual plane PP includes the middle point MPT and the coil axis CA. In the present embodiment, the middle point MPT exemplifies the third point.

Figure 4A:
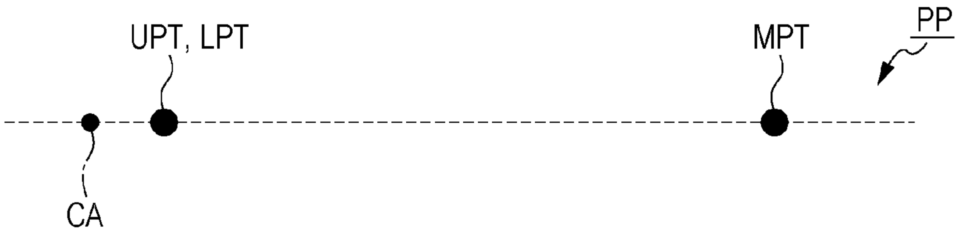
FIG. 4A is a schematic top view of the virtual plane illustrated in FIG. 3.
Figure 4B:
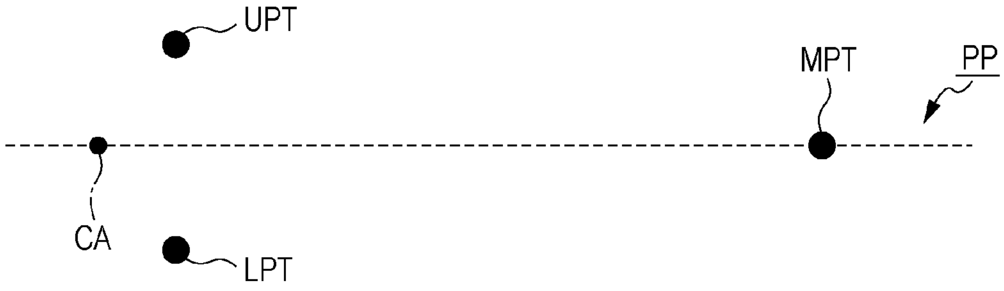
FIG. 4B is a schematic top view of the virtual plane illustrated in FIG. 3.

FIGS. 4A and 4B are schematic top views of the virtual plane PP. The geometric relations among the virtual plane PP, the upper point UPT, and the lower point LPT are described with reference to FIGS. 3, 4A, and 4B.

As illustrated in FIG. 4A, the upper point UPT and the lower point LPT may be set on the virtual plane PP. Alternatively, as illustrated in FIG. 4B, the upper point UPT and/or the lower point LPT may be set so as to be positioned apart from the virtual plane PP.

Figure 5A:
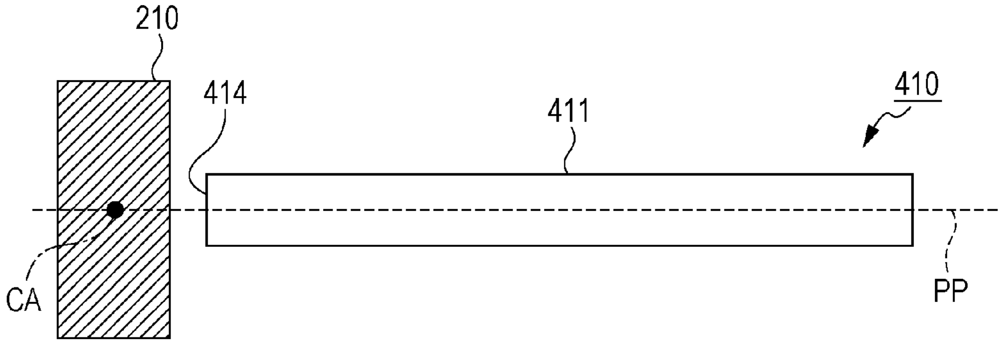
FIG. 5A is a schematic plan view of a magnetic piece available as a detour member that defines the detour magnetic path illustrated in FIG. 3.
Figure 5B:
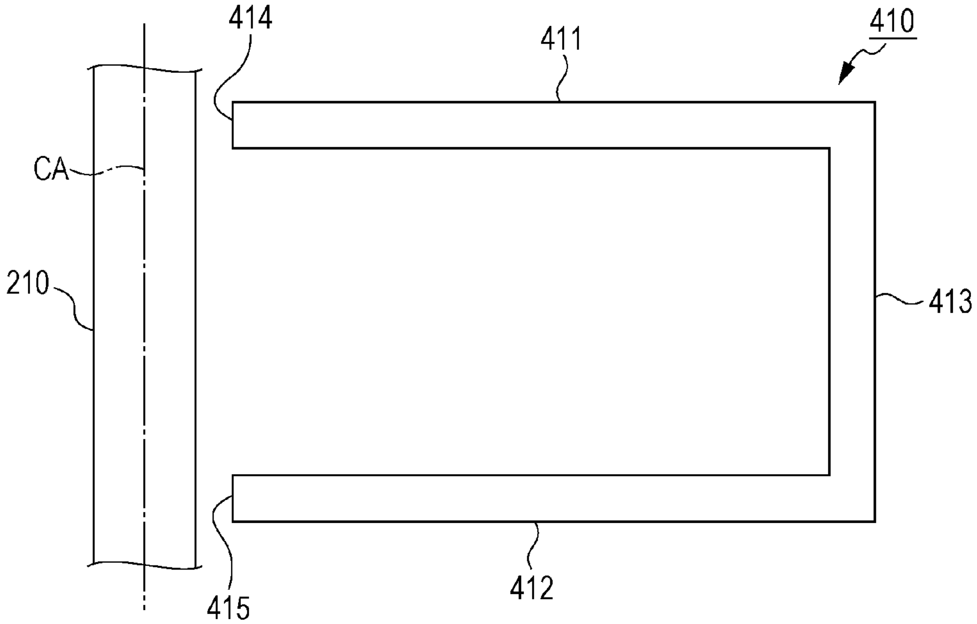
FIG. 5B is a schematic front view of the magnetic piece available as the detour member that defines the detour magnetic path illustrated in FIG. 3.

FIG. 5A is a schematic plan view of a magnetic piece 410 available as the detour member 400. FIG. 5B is a schematic front view of the magnetic piece 410. The magnetic piece 410 is described with reference to FIGS. 4A, 5A, and 5B.

The magnetic piece 410 is designed on the basis of the design principle described with reference to FIG. 4A. The magnetic piece 410 includes an upper bar 411, a lower bar 412, and a middle bar 413. The upper bar 411, the lower bar 412, and the middle bar 413 may be molded from a magnetic material.

The upper bar 411 includes an upper facing end 414 that faces the core leg 210. The upper facing end 414 corresponds to the upper point UPT described with reference to FIG. 4A. The upper bar 411 extends from the upper facing end 414 to the middle bar 413 approximately horizontally. The lower bar 412 includes a lower facing end 415 that faces the core leg 210. The lower facing end 415 corresponds to the lower point LPT described with reference to FIG. 4A. The lower bar 412 extends from the lower facing end 415 to the middle bar 413 approximately horizontally. In the present embodiment, one of the upper bar 411 and the lower bar 412 exemplifies the first piece. The other of the upper bar 411 and the lower bar 412 exemplifies the second piece. The direction in which the upper bar 411 and the lower bar 412 extend exemplifies the second direction. One of the upper facing end 414 and the lower facing end 415 exemplifies the first facing end. The other of the upper facing end 414 and the lower facing end 415 exemplifies the second facing end.

The middle bar 413 is connected to the upper bar 411 and the lower bar 412. The middle point MPT described with reference to FIG. 4A corresponds to a point on the upper bar 411, the lower bar 412, and the middle bar 413 except the upper facing end 414 and the lower facing end 415.

The magnetic piece 410 includes the upper bar 411, the lower bar 412, and the middle bar 413, and has a U shape. Herein, the U shape typically indicates a shape obtained by bending a bar-like substance. The thickness of the bar-like substance does not need to be uniform. Similar to a magnetic piece 420, which is described below, the bar-like substance may include a difference in thickness. The U shape is not limited to a U shape with round corners but may be a U shape with right-angled corners or a U shape with corners other than the right-angled corners. By causing the magnetic piece 410 to have the U shape described above, the magnetic piece 410 may be easily placed from outside of the coil portion 300. In addition, both of the end portions may be arranged near the magnetic core 200.

Figure 6A:
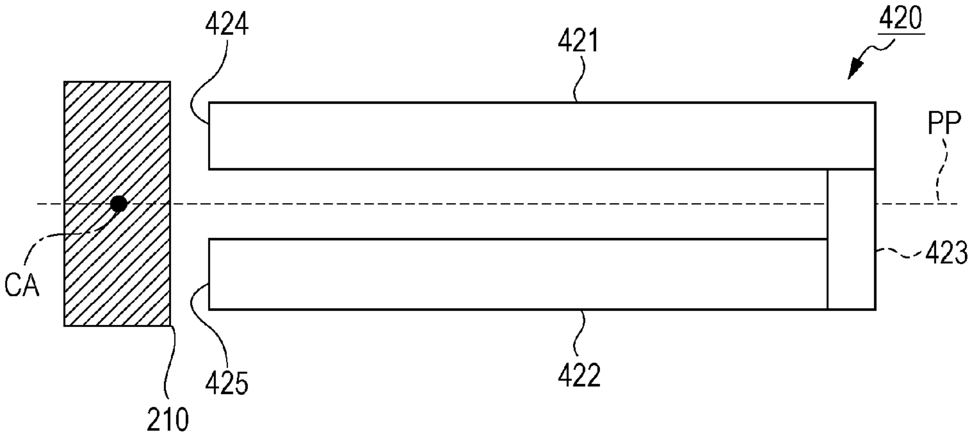
FIG. 6A is a schematic plan view of a magnetic piece available as the detour member that defines the detour magnetic path illustrated in FIG. 3.
Figure 6B:
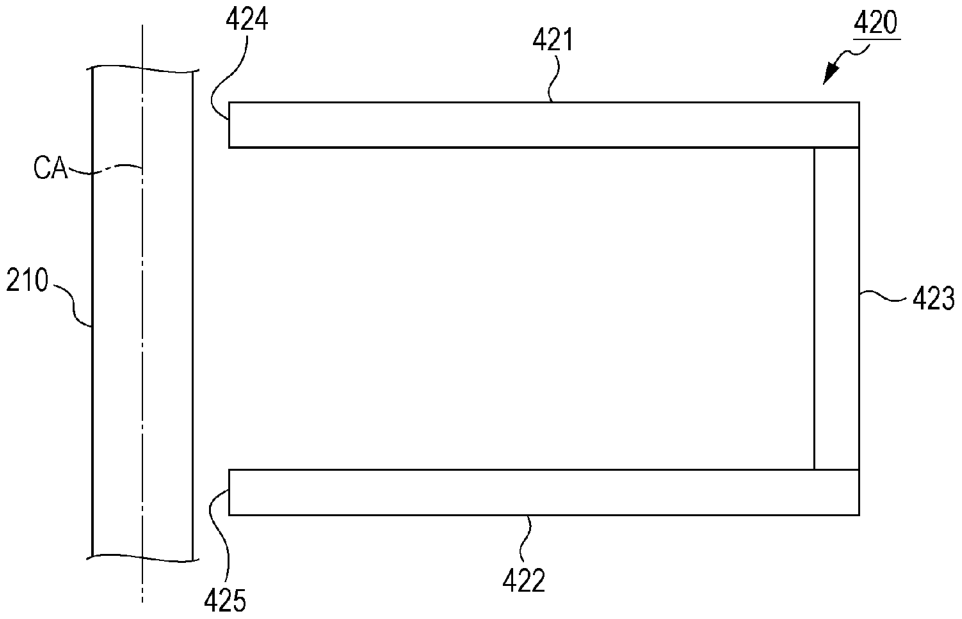
FIG. 6B is a schematic front view of the magnetic piece available as the detour member that defines the detour magnetic path illustrated in FIG. 3.

FIG. 6A is a schematic plan view of the magnetic piece 420 available as the detour member 400. FIG. 6B is a schematic front view of the magnetic piece 420. The magnetic piece 420 is described with reference to FIGS. 4B, 5A, 5B, 6A, and 6B.

The magnetic piece 420 is designed on the basis of the design principle described with reference to FIG. 4B. The magnetic piece 420 includes an upper bar 421, a lower bar 422, and a middle bar 423. The upper bar 421, the lower bar 422, and the middle bar 423 may be molded from a magnetic material.

The upper bar 421 includes an upper facing end 424 that faces the core leg 210. The upper facing end 424 corresponds to the upper point UPT described with reference to FIG. 4B. The upper bar 421 extends from the upper facing end 424 to the middle bar 423 approximately horizontally. The lower bar 422 includes a lower facing end 425 that faces the core leg 210. The lower facing end 425 corresponds to the lower point LPT described with reference to FIG. 4B. The lower bar 422 extends from the lower facing end 425 to the middle bar 423 approximately horizontally. Unlike the magnetic piece 410 described with reference to FIGS. 5A and 5B, the upper bar 421 and the lower bar 422 are separated from the virtual plane PP.

The middle bar 423 is connected to the upper bar 421 and the lower bar 422. The middle point MPT described with reference to FIG. 4B corresponds to an intersection portion of the middle bar 423 and the virtual plane PP.

Embodiment 4

The fixing portion that fixes the detour member may include an adjoining member arranged next to the core leg. When the adjoining member is utilized to fix the detour member, the detour member may be attached firmly.

Embodiment 4 describes a technique of attaching the detour member for which the adjoining member is utilized.

Figure 7:
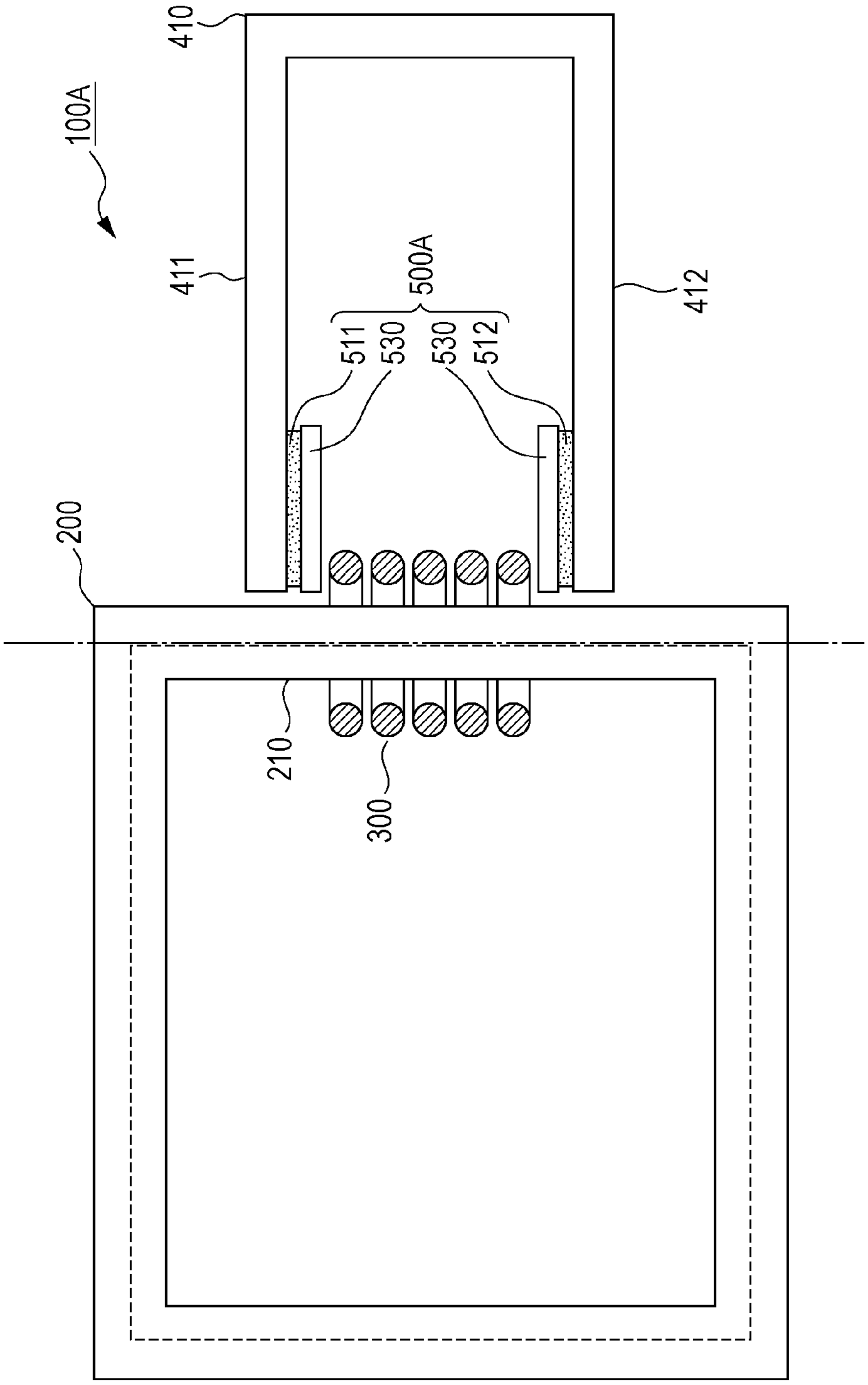
FIG. 7 is a conceptual view of a coil structure according to Embodiment 4.

FIG. 7 is a conceptual view of a coil structure 100A according to Embodiment 4. The coil structure 100A is described with reference to FIG. 7. The reference alphanumeric characters used in common in Embodiments 1, 3, and 4 imply that the elements to which the common reference alphanumeric characters are given in Embodiment 4 have the same functions as the functions of the elements to which the common reference alphanumeric characters are given in Embodiment 1 or 3. Accordingly, the explanation in Embodiment 1 or 3 is applied to such elements in Embodiment 4.

Similar to Embodiment 1, the coil structure 100A includes a magnetic core 200 and a coil portion 300. The coil structure 100A further includes the magnetic piece 410 described in relation to Embodiment 3.

The coil structure 100A further includes a fixing portion 500A. The fixing portion 500A includes an adjoining member 530, an upper connecting portion 511, and a lower connecting portion 512. The adjoining member 530 is arranged next to the core leg 210. The adjoining member 530 may be utilized exclusively for the fixation of the magnetic piece 410. Alternatively, the adjoining member 530 may be utilized not only for the fixation of the magnetic piece 410 but may also be utilized to hold the coil portion 300. The principle of the present embodiment is not limited to specific uses of the adjoining member 530.

The upper connecting portion 511 connects the upper bar 411 to the adjoining member 530. The upper connecting portion 511 may be a layer that includes an adhesive or a molding material. In this case, in designing the coil structure 100A, a large adhesion area may be given to the upper bar 411 using the adjoining member 530. The upper connecting portion 511 may be a mechanical connection structure for connecting the upper bar 411 to the adjoining member 530. The principle of the present embodiment is not limited to specific material properties or a specific structure of the upper connecting portion 511. In the present embodiment, the upper connecting portion 511 may exemplify the connecting portion.

The lower connecting portion 512 connects the lower bar 412 to the adjoining member 530. The lower connecting portion 512 may be a layer that includes an adhesive or a molding material. In this case, in designing the coil structure 100A, a large adhesion area may be given to the lower bar 412 using the adjoining member 530. The lower connecting portion 512 may be a mechanical connection structure for connecting the lower bar 412 to the adjoining member 530. The principle of the present embodiment is not limited to specific material properties or a specific structure of the lower connecting portion 512. In the present embodiment, the lower connecting portion 512 may exemplify the connecting portion.

The magnetic piece 410 may be connected to the adjoining member 530 using only one of the upper connecting portion 511 and the lower connecting portion 512. For example, when the magnetic piece 410 has rigidity and the positional relation between the upper bar 411 and the lower bar 412 is held, the positional relation between the lower bar 412 and the core leg 210 may be indirectly fixed by fixing the positional relation between the upper bar 411 and the core leg 210 using the upper connecting portion 511.

Embodiment 5

The adjoining member described in relation to Embodiment 4 may function as a bobbin portion around which a winding is wound. Embodiment 5 describes a technique of attaching the detour member for which a bobbin portion is utilized as the adjoining member.

Figure 8:
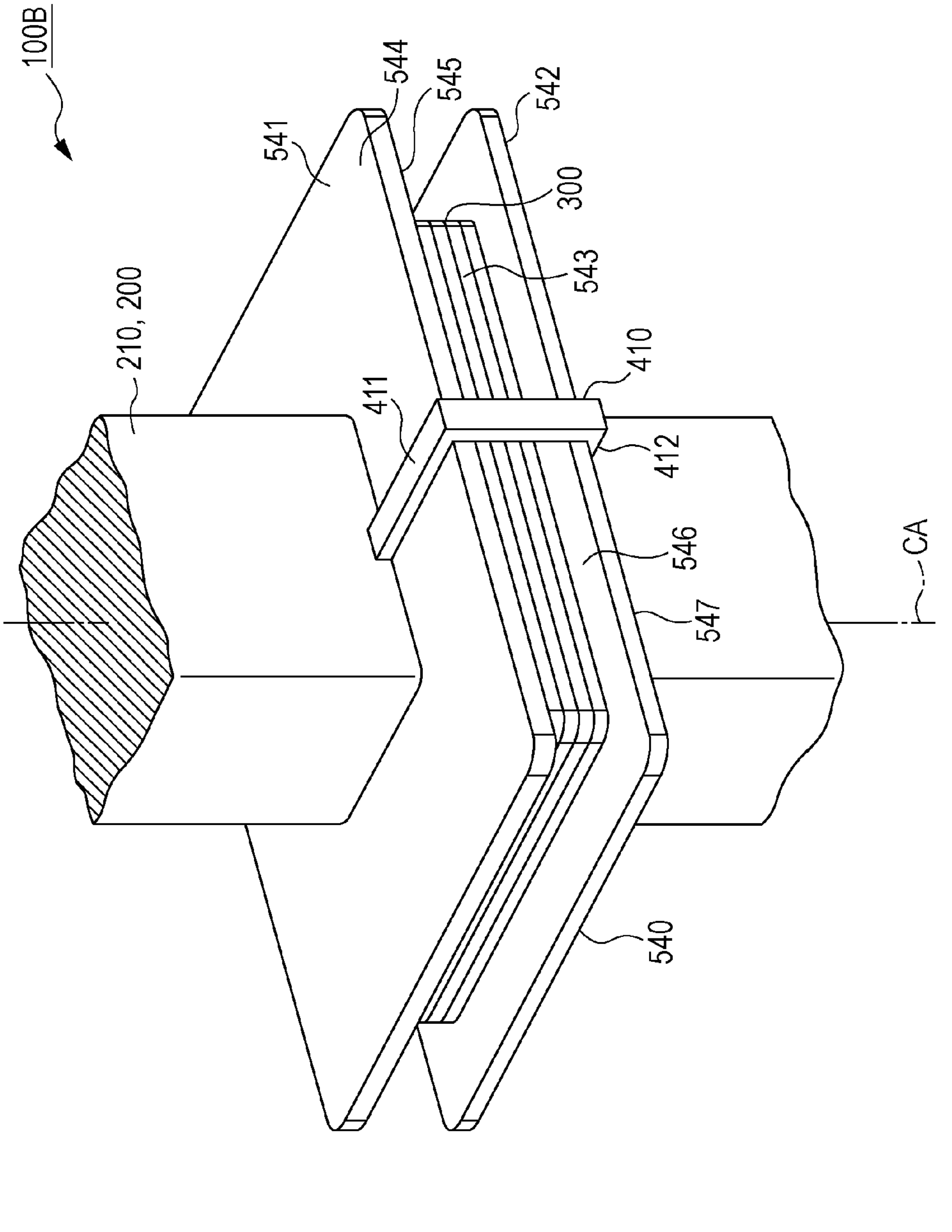
FIG. 8 is a schematic perspective view of a coil structure according to Embodiment 5.

FIG. 8 is a schematic perspective view of a coil structure 100B according to Embodiment 5. The coil structure 100B is described with reference to FIG. 8. The reference alphanumeric characters used in common in Embodiments 4 and 5 imply that the elements to which the common reference alphanumeric characters are given in Embodiment 5 have the same functions as the functions of the elements to which the common reference alphanumeric characters are given in Embodiment 4. Accordingly, the explanation in Embodiment 4 is applied to such elements in Embodiment 5.

Similar to Embodiment 4, the coil structure 100B includes the magnetic core 200, the coil portion 300, and the magnetic piece 410. FIG. 8 illustrates the core leg 210 as the magnetic core 200. The principle of the present embodiment is not limited to a specific shape of the magnetic core 200.

The coil structure 100B further includes a bobbin portion 540. The bobbin portion 540 corresponds to the adjoining member described in relation to Embodiment 4.

The bobbin portion 540 includes an upper plate 541, a lower plate 542, and a tube-like portion 543. The core leg 210 is arranged through the bobbin portion 540. The winding that forms the coil portion 300 is wound around the tube-like portion 543. The upper plate 541 extends outward from an upper end of the tube-like portion 543. The lower plate 542 extends outward from a lower end of the tube-like portion 543. Accordingly, the lower plate 542 is located apart from the upper plate 541 in the direction in which the coil axis CA extends. In the present embodiment, the bobbin portion 540 exemplifies the bobbin portion. One of the upper plate 541 and the lower plate 542 exemplifies the first plate. The other of the upper plate 541 and the lower plate 542 exemplifies the second plate.

The upper plate 541 includes an upper surface 544 and a lower surface 545 opposite the upper surface 544. The lower surface 545 faces the lower plate 542. The upper bar 411 extends along the upper surface 544. In manufacturing the coil structure 100B, the upper bar 411 may be fixed to the upper surface 544 using an adhesive or a molding material after placing the upper bar 411 on the upper surface 544.

The lower plate 542 includes an upper surface 546 and a lower surface 547 opposite the upper surface 546. The upper surface 546 faces the upper plate 541. The lower bar 412 extends along the lower surface 547. The lower bar 412 may be fixed to the lower surface 547 using an adhesive or a molding material after bringing the lower bar 412 into contact with the lower surface 547.

Only one of the upper bar 411 and the lower bar 412 may be fixed to the bobbin portion 540. For example, when the magnetic piece 410 has rigidity and the positional relation between the upper bar 411 and the lower bar 412 is held, the positional relation between the lower bar 412 and the bobbin portion 540 may be indirectly fixed by fixing the upper bar 411 to the upper surface 544.

Embodiment 6

The detour member may be fixed to the bobbin portion by a mechanical structure. Embodiment 6 describes a technique of mechanically fixing the detour member.

Figure 9:
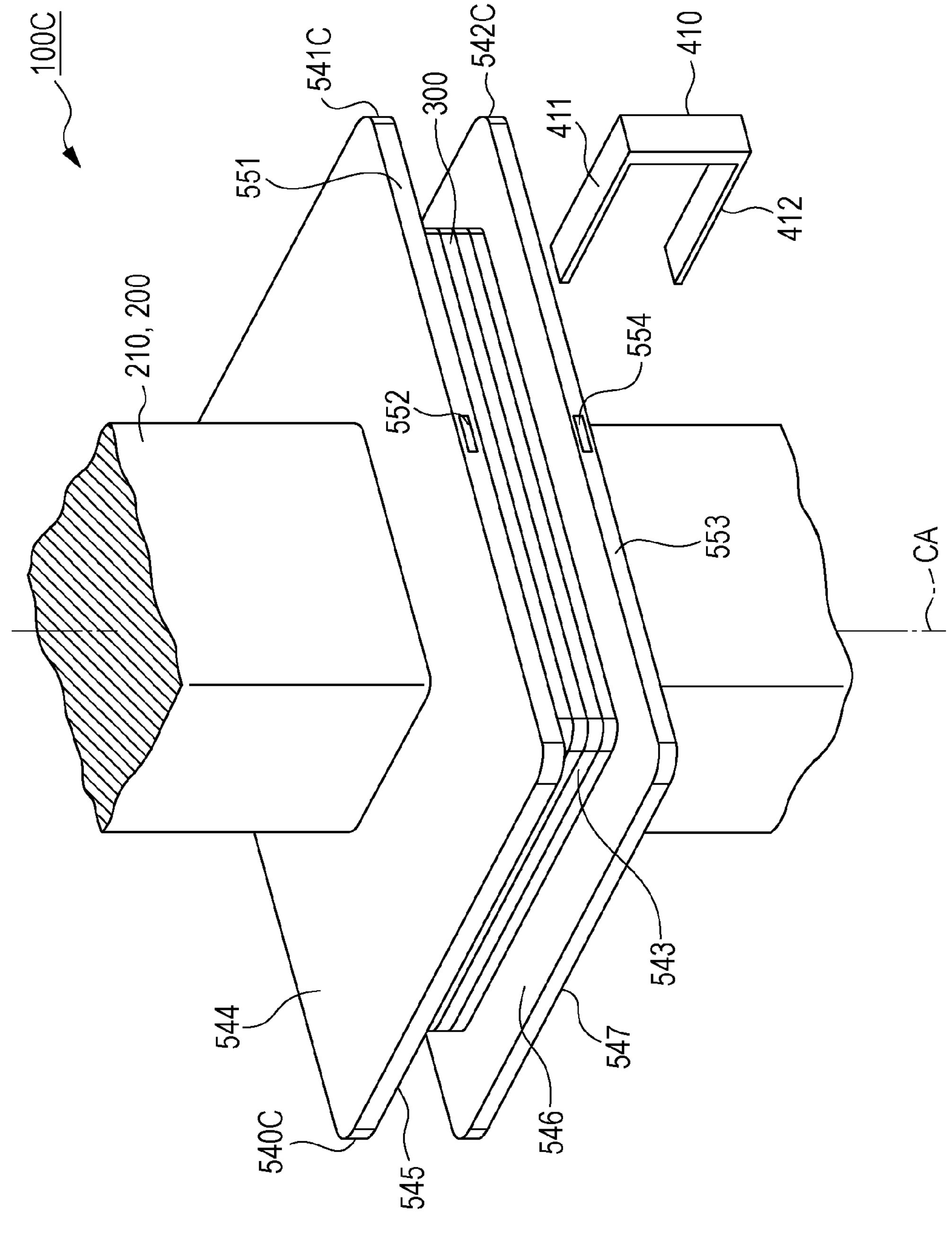
FIG. 9 is a schematic perspective view of a coil structure according to Embodiment 6.

FIG. 9 is a schematic perspective view of a coil structure 100C according to Embodiment 6. The coil structure 100C is described with reference to FIG. 9. The reference alphanumeric characters used in common in Embodiments 5 and 6 imply that the elements to which the common reference alphanumeric characters are given in Embodiment 6 have the same functions as the functions of the elements to which the common reference alphanumeric characters are given in Embodiment 5. Accordingly, the explanation in Embodiment 5 is applied to such elements in Embodiment 6.

Similar to Embodiment 5, the coil structure 100C includes the magnetic core 200, the coil portion 300, and the magnetic piece 410. FIG. 9 illustrates the core leg 210 as the magnetic core 200. The principle of the present embodiment is not limited to a specific shape of the magnetic core 200.

The coil structure 100C further includes a bobbin portion 540C. Similar to Embodiment 5, the bobbin portion 540C includes a tube-like portion 543. The bobbin portion 540C includes an upper plate 541C and a lower plate 542C. The upper plate 541C extends outward from an upper end of the tube-like portion 543. The lower plate 542C extends outward from a lower end of the tube-like portion 543. Accordingly, the lower plate 542C is located apart from the upper plate 541C in the direction in which the coil axis CA extends. In the present embodiment, the bobbin portion 540C exemplifies the bobbin portion. One of the upper plate 541C and the lower plate 542C exemplifies the first plate.

Similar to Embodiment 5, the upper plate 541C includes an upper surface 544 and a lower surface 545. The upper plate 541C further includes a peripheral surface 551, which makes a rectangular outline between the upper surface 544 and the lower surface 545. The outline and shape made by the peripheral surface 551 do not limit the principle of the present embodiment at all.

An upper insertion hole 552 is formed in the peripheral surface 551. The upper insertion hole 552 extends from the peripheral surface 551 toward the core leg 210 between the upper surface 544 and the lower surface 545. The upper bar 411 is inserted into the upper insertion hole 552. In manufacturing the coil structure 100C, if necessary, the upper bar 411 may be fixed using an adhesive or a molding material after inserting the upper bar 411 into the upper insertion hole 552.

Similar to Embodiment 5, the lower plate 542C includes an upper surface 546 and a lower surface 547. The lower plate 542C further includes a peripheral surface 553, which makes a rectangular outline between the upper surface 546 and the lower surface 547. The outline and shape made by the peripheral surface 553 do not limit the principle of the present embodiment at all.

A lower insertion hole 554 is formed in the peripheral surface 553. The lower insertion hole 554 extends from the peripheral surface 553 toward the core leg 210 between the upper surface 546 and the lower surface 547. The lower bar 412 is inserted into the lower insertion hole 554. In manufacturing the coil structure 100C, if necessary, the lower bar 412 may be fixed using an adhesive or a molding material after inserting the lower bar 412 into the lower insertion hole 554.

In the present embodiment, one of the upper insertion hole 552 and the lower insertion hole 554 exemplifies the insertion hole. The direction in which the upper insertion hole 552 and the lower insertion hole 554 extend exemplifies the second direction. One of the upper bar 411 and the lower bar 412 exemplifies the first piece.

Embodiment 7

The principle of Embodiment 6 enables the detour member to be fixed using the insertion hole. Alternatively, the detour member may be fixed by another structure. Embodiment 7 describes a technique of attaching the detour member using a grooved structure.

Figure 10:
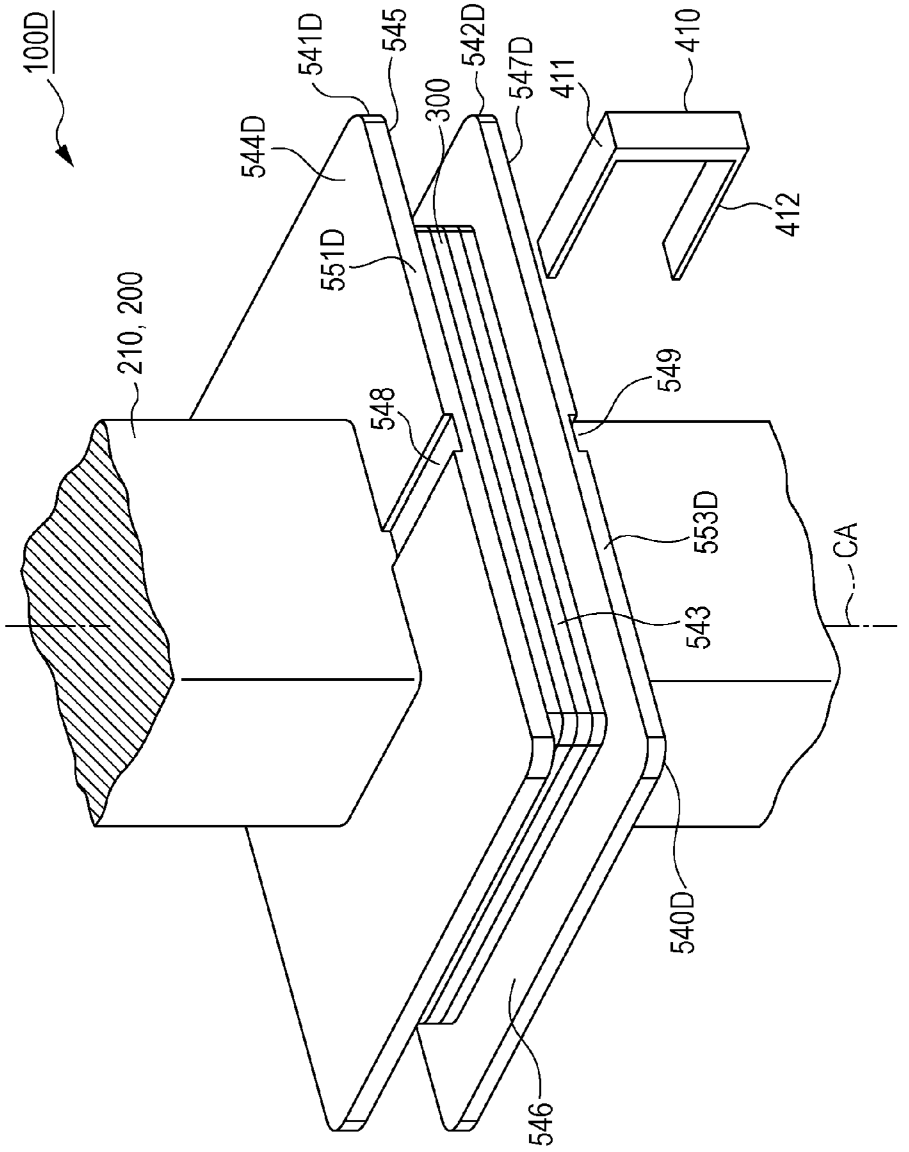
FIG. 10 is a schematic perspective view of a coil structure according to Embodiment 7.

FIG. 10 is a schematic perspective view of a coil structure 100D according to Embodiment 7. The coil structure 100D is described with reference to FIG. 10. The reference alphanumeric characters used in common in Embodiments 5 and 7 imply that the elements to which the common reference alphanumeric characters are given in Embodiment 7 have the same functions as the functions of the elements to which the common reference alphanumeric characters are given in Embodiment 5. Accordingly, the explanation in Embodiment 5 is applied to such elements in Embodiment 7.

Similar to Embodiment 5, the coil structure 100D includes the magnetic core 200, the coil portion 300, and the magnetic piece 410. FIG. 10 illustrates the core leg 210 as the magnetic core 200. The principle of the present embodiment is not limited to a specific shape of the magnetic core 200.

The coil structure 100D further includes a bobbin portion 540D. Similar to Embodiment 5, the bobbin portion 540D includes a tube-like portion 543.

The bobbin portion 540D further includes an upper plate 541D and a lower plate 542D. The upper plate 541D extends outward from an upper end of the tube-like portion 543. The lower plate 542D extends outward from a lower end of the tube-like portion 543. Accordingly, the lower plate 542D is located apart from the upper plate 541D in the direction in which the coil axis CA extends. In the present embodiment, the bobbin portion 540D exemplifies the first bobbin portion. One of the upper plate 541D and the lower plate 542D exemplifies the first plate.

Similar to Embodiment 5, the upper plate 541D includes a lower surface 545. The upper plate 541D further includes an upper surface 544D opposite the lower surface 545, and a peripheral surface 551D. The peripheral surface 551D makes a rectangular outline between the upper surface 544D and the lower surface 545. The outline and shape made by the peripheral surface 551D do not limit the principle of the present embodiment at all.

An upper groove 548 is formed on the upper surface 544D. The upper groove 548 extends from the peripheral surface 551D toward the core leg 210. The upper bar 411 is inserted into the upper groove 548. In manufacturing the coil structure 100D, if necessary, the upper bar 411 may be fixed using an adhesive or a molding material after inserting the upper bar 411 into the upper groove 548.

Similar to Embodiment 5, the lower plate 542D includes an upper surface 546. The lower plate 542D further includes a lower surface 547D opposite the upper surface 546, and a peripheral surface 553D. The peripheral surface 553D makes a rectangular outline between the upper surface 546 and the lower surface 547D. The outline and shape made by the peripheral surface 553D do not limit the principle of the present embodiment at all.

A lower groove 549 is formed on the lower surface 547D. The lower groove 549 extends from the peripheral surface 553D toward the core leg 210. The lower bar 412 is inserted into the lower groove 549. In manufacturing the coil structure 100D, if necessary, the lower bar 412 may be fixed using an adhesive or a molding material after inserting the lower bar 412 into the lower groove 549.

In the present embodiment, one of the upper groove 548 and the lower groove 549 exemplifies the insertion groove. The direction in which the upper groove 548 and the lower groove 549 extend exemplifies the second direction. One of the upper bar 411 and the lower bar 412 exemplifies the first piece.

Embodiment 8

Utilizing a narrow magnetic piece as the detour magnetic path is useful to obtain small leakage inductance. Such narrow magnetic pieces are structurally weak. For example, in manufacturing the coil structure described in relation to Embodiment 6, when a narrow magnetic piece is inserted into an insertion hole, the magnetic piece may be broken. As another possibility, in manufacturing the coil structure described in relation to Embodiment 7, when the narrow magnetic piece is inserted into the insertion groove, the magnetic piece may be broken. Embodiment 8 describes a detour member that is structurally strengthened.

Figure 11:
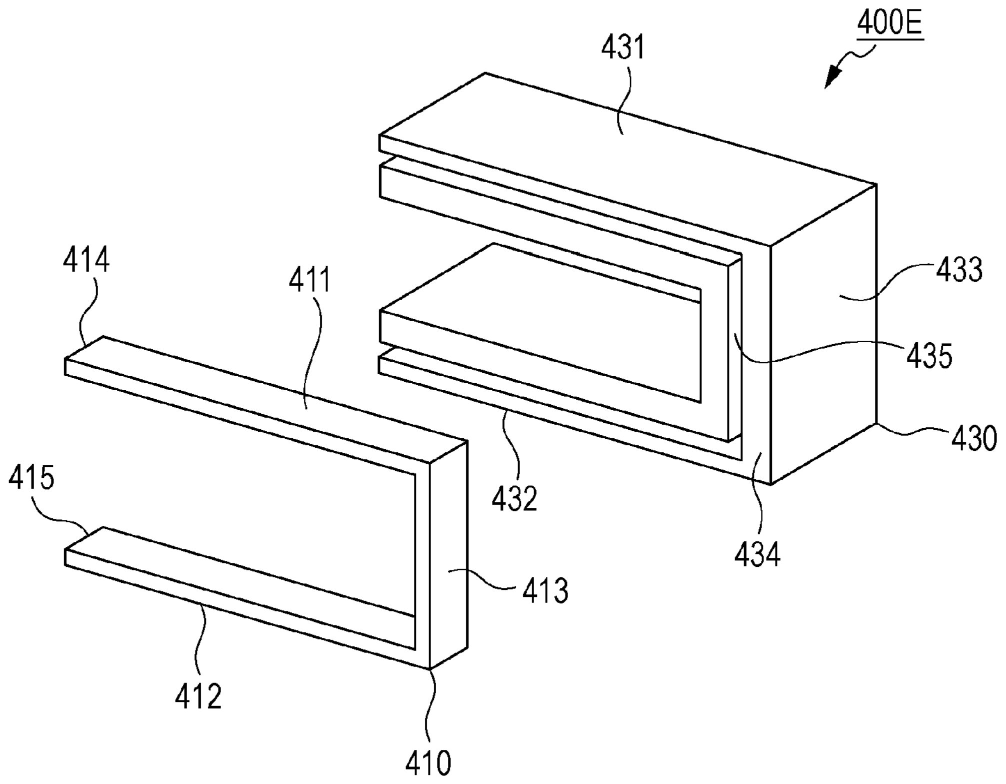
FIG. 11 is a schematic exploded perspective view of a detour member according to Embodiment 8.

FIG. 11 is a schematic exploded perspective view of a detour member 400E. The detour member 400E is described with reference to FIGS. 5B and 11. The reference alphanumeric characters used in common in Embodiments 3 and 8 imply that the elements to which the common reference alphanumeric characters are given in Embodiment 8 have the same functions as the functions of the elements to which the common reference alphanumeric characters are given in Embodiment 3. Accordingly, the explanation in Embodiment 3 is applied to such elements in Embodiment 8.

The detour member 400E includes the magnetic piece 410 described with reference to FIG. 5B. The detour member 400E further includes a protective outer shell 430. The protective outer shell 430 includes an upper outer shell 431, a lower outer shell 432, and a middle outer shell 433. The upper outer shell 431 protects the upper bar 411. The lower outer shell 432 protects the lower bar 412. The middle outer shell 433 protects the middle bar 413.

In cooperation with one another, the upper outer shell 431, the lower outer shell 432, and the middle outer shell 433 form a front surface 434, which is approximately C-shaped. An accommodation groove 435, which is approximately C-shaped and complementary to the magnetic piece 410, is formed in the front surface 434. The magnetic piece 410 is accommodated in the accommodation groove 435. The upper facing end 414 and the lower facing end 415 may be exposed from the protective outer shell 430. In this case, the upper facing end 414 and the lower facing end 415 may be brought into contact with the core leg 210.

In the present embodiment, the protective outer shell 430 that partially covers the magnetic piece 410 exemplifies the outer shell member. Alternatively, the outer shell member may wholly cover the magnetic piece 410. The principle of the present embodiment is not limited to a specific shape of the outer shell member.

Embodiment 9

In designing the coil structure, a firmly-joined structure between the bobbin portion and the detour member may be designed by utilizing the outer shell member described in relation to Embodiment 8. The firmly-joined structure between the bobbin portion and the detour member may prevent the detour member from being separated from the bobbin portion even when the coil structure is subjected to vibrations or an impact. Embodiment 9 describes a joined structure for which the outer shell member is utilized.

Figure 12:
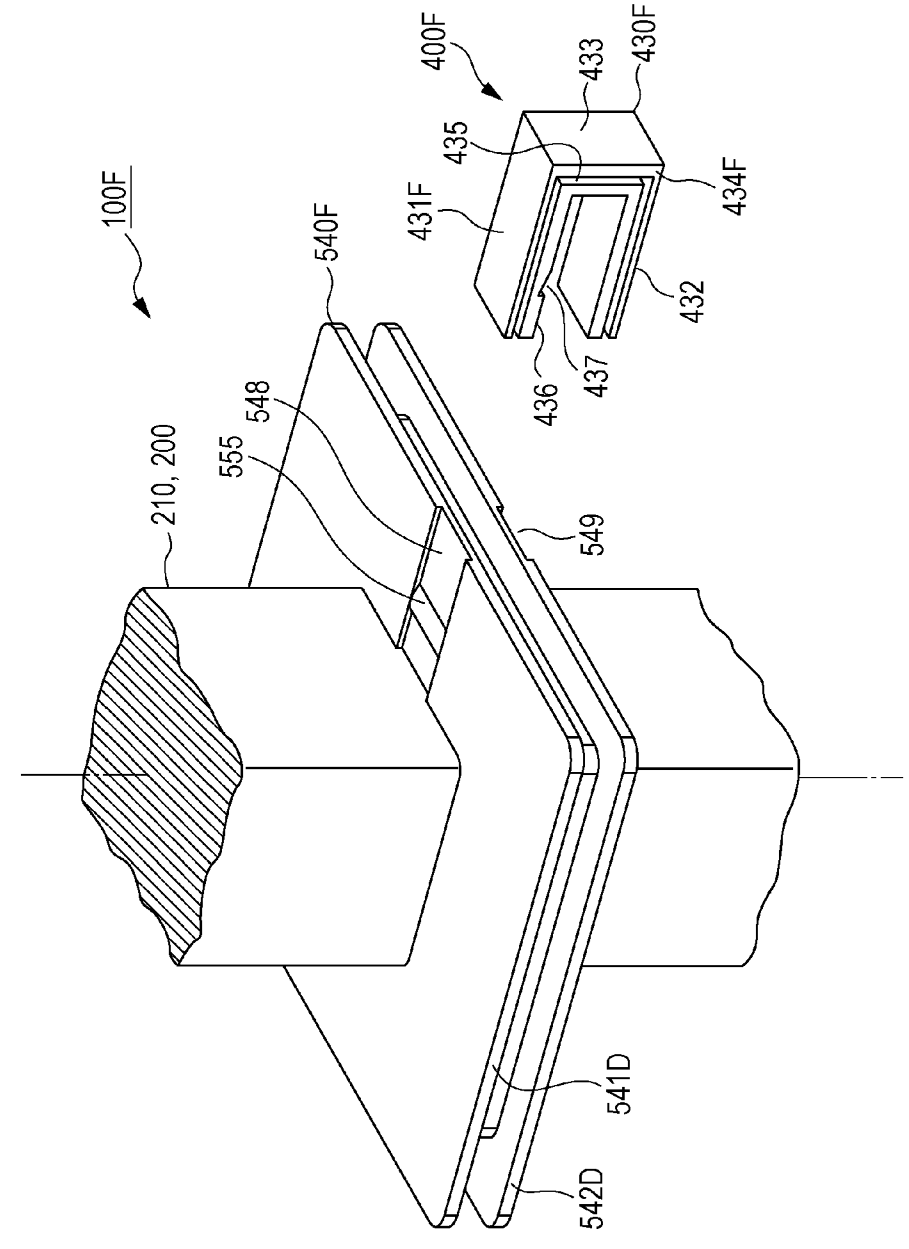
FIG. 12 is a schematic perspective view of a coil structure according to Embodiment 9.

FIG. 12 is a schematic perspective view of a coil structure 100F according to Embodiment 9. The coil structure 100F is described with reference to FIG. 12. The reference alphanumeric characters used in common in Embodiments 7 to 9 imply that the elements to which the common reference alphanumeric characters are given in Embodiment 9 have the same functions as the functions of the elements to which the common reference alphanumeric characters are given in Embodiment 7 or 8. Accordingly, the explanation in Embodiment 7 or 8 is applied to such elements in Embodiment 9.

Similar to Embodiment 7, the coil structure 100F includes the magnetic core 200 and the coil portion (not illustrated). FIG. 12 illustrates the core leg 210 as the magnetic core 200. The principle of the present embodiment is not limited to a specific shape of the magnetic core 200.

The coil structure 100F further includes a detour member 400F and a bobbin portion 540F. Similar to Embodiment 8, the detour member 400F includes a magnetic piece (not illustrated). Similar to Embodiment 7, the bobbin portion 540F includes an upper plate 541D, a lower plate 542D, and a tube-like portion (not illustrated). Similar to Embodiment 7, the coil portion and the tube-like portion are arranged between the upper plate 541D and the lower plate 542D.

The bobbin portion 540F further includes a projecting portion 555 that projects upward in the upper groove 548. The projecting portion 555 is utilized for the engagement with the detour member 400F. In the present embodiment, the upper groove 548 exemplifies the insertion groove.

The detour member 400F includes a protective outer shell 430F. The above-described magnetic piece is arranged in the protective outer shell 430F.

Similar to Embodiment 8, the protective outer shell 430F includes a lower outer shell 432 and a middle outer shell 433. The protective outer shell 430F further includes an upper outer shell 431F.

In cooperation with one another, the upper outer shell 431F, the lower outer shell 432, and the middle outer shell 433 form a front surface 434F, which is approximately C-shaped. Similar to Embodiment 8, an accommodation groove 435, which is approximately C-shaped and complementary to the magnetic piece, is formed in the front surface 434F. The magnetic piece is accommodated in the accommodation groove 435.

The upper outer shell 431F includes a lower surface 436 that faces the lower outer shell 432. A notch portion 437 complementary to the projecting portion 555 is formed on the lower surface 436.

The lower outer shell 432 is inserted into the lower groove 549. The upper outer shell 431F is inserted into the upper groove 548. The projecting portion 555 engages with the notch portion 437 accordingly. The engagement between the projecting portion 555 and the notch portion 437 hinders displacement of the detour member 400F in the direction in which the upper groove 548 and the lower groove 549 extend, that is, the direction away from the core leg 210. In the present embodiment, the protective outer shell 430F exemplifies the outer shell member. The notch portion 437 exemplifies the depressed portion.

Embodiment 10

The joined structure described in relation to Embodiment 9 causes the projecting portion of the bobbin portion to engage with the depressed portion of the outer shell member. Another engaging structure may be employed. Embodiment 10 describes another joined structure between the outer shell member and the bobbin portion.

Figure 13:
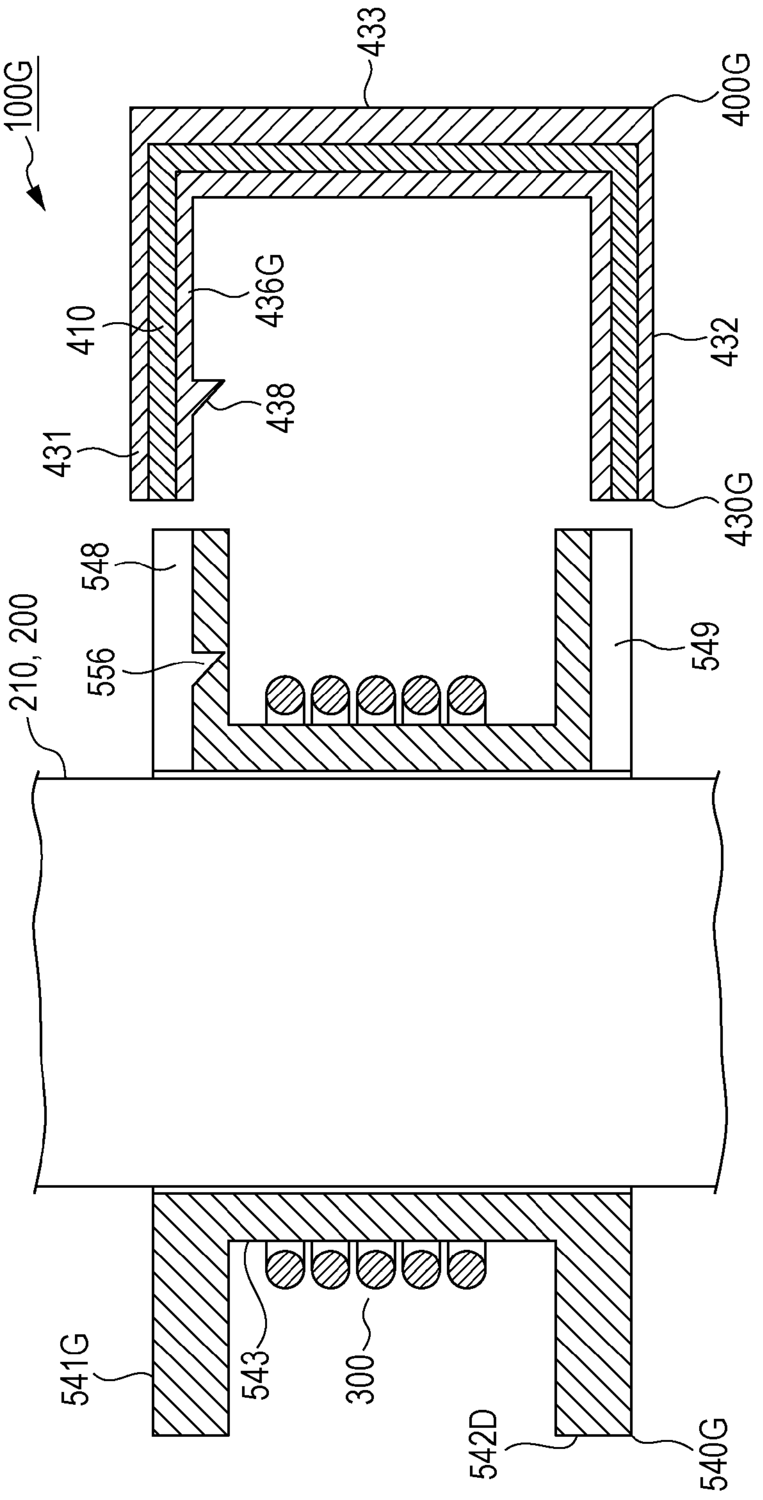
FIG. 13 is a schematic exploded cross-sectional view of a coil structure according to Embodiment 10.

FIG. 13 is a schematic exploded cross-sectional view of a coil structure 100G according to Embodiment 10. The coil structure 100G is described with reference to FIG. 13. The reference alphanumeric characters used in common in Embodiments 7 to 10 imply that the elements to which the common reference alphanumeric characters are given in Embodiment 10 have the same functions as the functions of the elements to which the common reference alphanumeric characters are given in Embodiment 7 to 9. Accordingly, the explanation in Embodiment 7 to 9 is applied to such elements in Embodiment 10.

Similar to Embodiment 7, the coil structure 100G includes the magnetic core 200 and the coil portion 300. FIG. 13 illustrates the core leg 210 as the magnetic core 200. The principle of the present embodiment is not limited to a specific shape of the magnetic core 200.

The coil structure 100G further includes a detour member 400G and a bobbin portion 540G. Similar to Embodiment 9, the detour member 400G includes the magnetic piece 410. Similar to Embodiment 7, the bobbin portion 540G includes a lower plate 542D and a tube-like portion 543.

The bobbin portion 540G further includes an upper plate 541G. The upper plate 541G extends outward from an upper end of the tube-like portion 543. Similar to Embodiment 7, an upper groove 548 is formed on the upper plate 541G. A depressed portion 556 is formed in the upper groove 548 of the upper plate 541G. The depressed portion 556 is utilized for the engagement with the detour member 400G. In the present embodiment, the upper groove 548 exemplifies the insertion groove.

The detour member 400G includes a protective outer shell 430G. The magnetic piece 410 is arranged in the protective outer shell 430G.

Similar to Embodiment 8, the protective outer shell 430G includes an upper outer shell 431, a lower outer shell 432, and a middle outer shell 433. The upper outer shell 431 includes a lower surface 436G that faces the lower outer shell 432. The protective outer shell 430G further includes a projecting portion 438 that projects downward from the lower surface 436G. The projecting portion 438 is complementary to the depressed portion 556.

The lower outer shell 432 is inserted into the lower groove 549. The upper outer shell 431 is inserted into the upper groove 548. The depressed portion 556 engages with the projecting portion 438 accordingly. The engagement between the depressed portion 556 and the projecting portion 438 hinders displacement of the detour member 400G in the direction in which the upper groove 548 and the lower groove 549 extend, that is, the direction away from the core leg 210. In the present embodiment, the protective outer shell 430G exemplifies the outer shell member. The projecting portion 438 exemplifies the projecting portion.

Embodiment 11

The outer shell member described in relation to Embodiments 8 to 10 enables a plurality of magnetic members to be handled easily. When a plurality of magnetic members are used in manufacturing a coil structure, leakage inductance may be adjusted with high accuracy. Embodiment 11 describes a technique of adjusting leakage inductance.

Figures 14A, 14B:
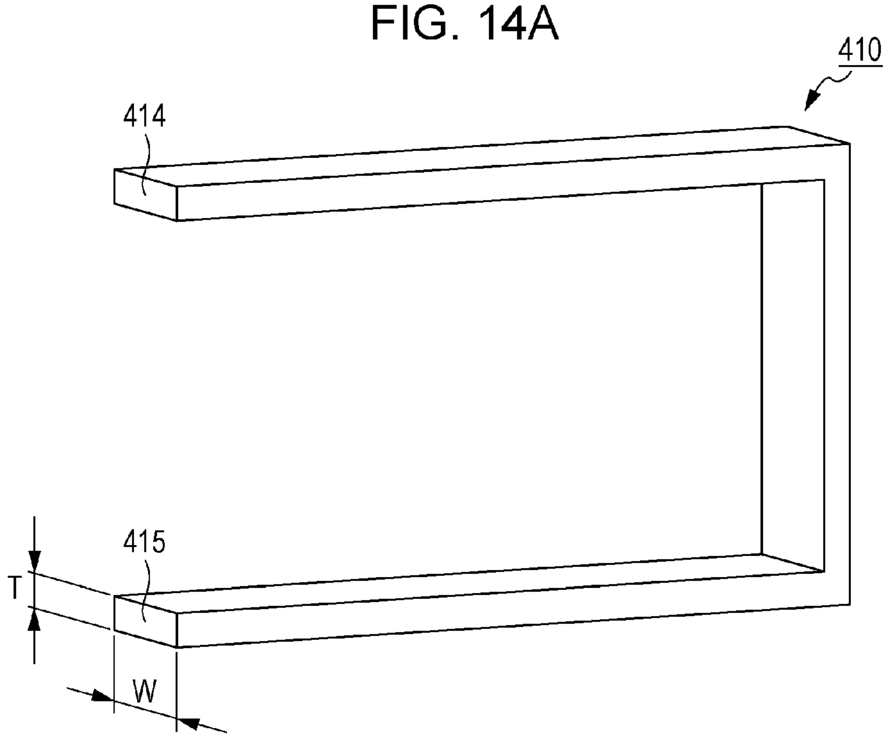
FIG. 14A is a schematic perspective view of a magnetic piece according to Embodiment 11.
FIG. 14B is a table that illustrates relations between design parameters of the magnetic piece and leakage inductance according to Embodiment 11.

FIG. 14A is a schematic perspective view of the magnetic piece 410. FIG. 14B is a table that illustrates relations between design parameters of the magnetic piece 410 and leakage inductance. An example of the design of the magnetic piece 410 is described with reference to FIGS. 14A, and 14B.

In FIG. 14A, "T" indicates a dimensional value regarding the thickness of the magnetic piece 410 while "W" indicates a dimensional value regarding the width of the magnetic piece 410.

The data illustrated in FIG. 14B are obtained from a coil structure (not illustrated) that includes a magnetic core (not illustrated), which has a relative permeability of "3300". The magnetic core makes a rectangular closed loop magnetic path in which magnetic flux flows. The upper facing end 414 and the lower facing end 415 are in contact with the magnetic core.

According to the data illustrated in FIG. 14B, when a magnetic material with a relative permeability that is smaller than the relative permeability of the magnetic core is used for the magnetic piece 410, the value of leakage inductance is small. According to the data illustrated in FIG. 14B, when a large cross-sectional area is given to the magnetic piece 410, leakage inductance of a large value may be obtained.

The detour member may be formed from two magnetic members. The two magnetic members may be arranged slightly apart from each other. In this case, the leakage inductance is smaller than the data illustrated in FIG. 14B. Thus, the magnitude of leakage inductance may be adjusted using a gap between the two magnetic members.

Figure 15A:
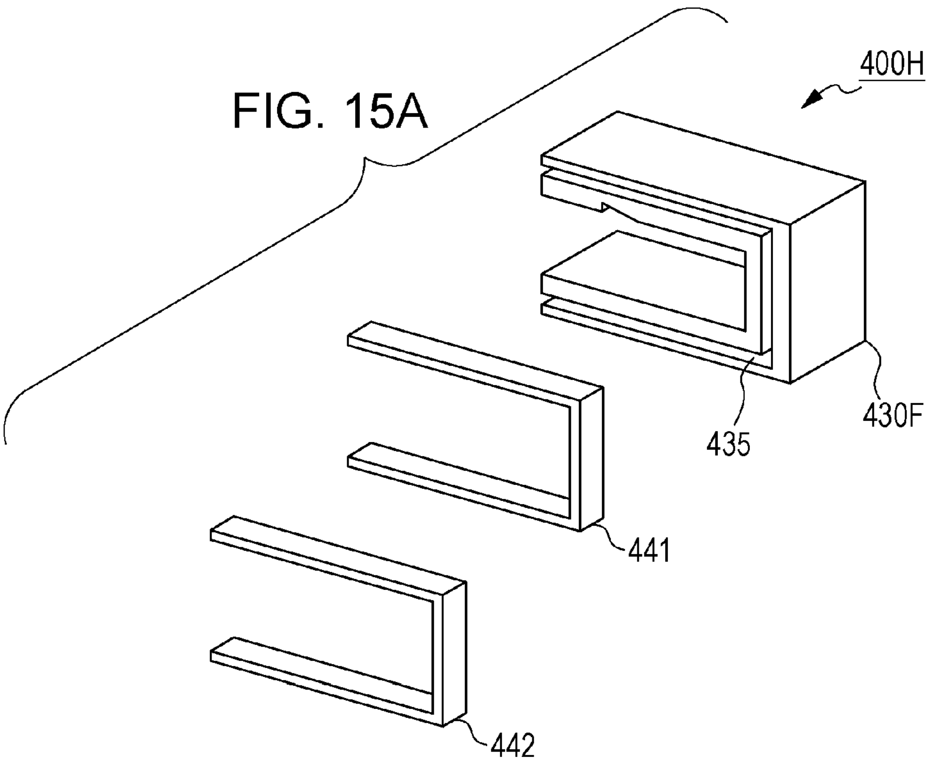
FIG. 15A is a schematic exploded perspective view of a detour member according to Embodiment 11.
Figure 15B:
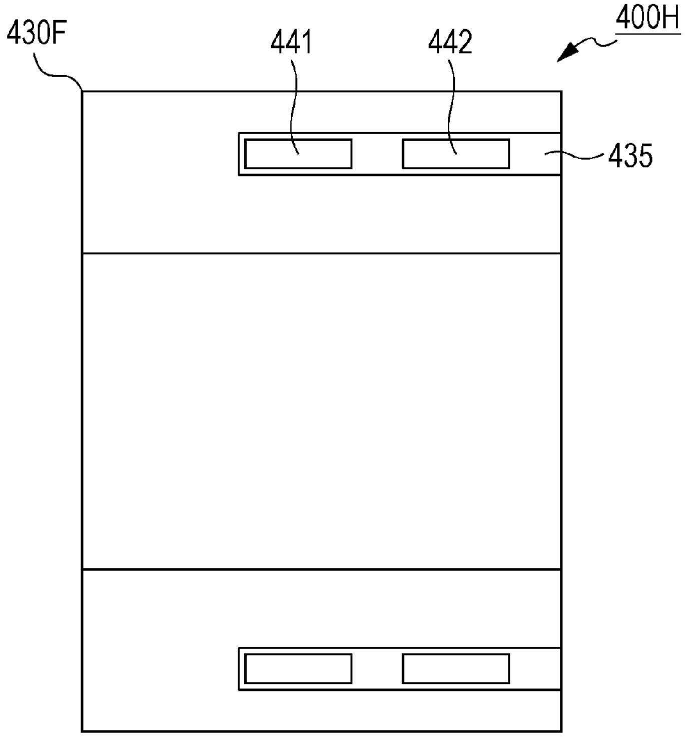
FIG. 15B is a schematic side view of the detour member illustrated in FIG. 15A.

FIG. 15A is a schematic exploded perspective view of a detour member 400H. FIG. 15B is a schematic side view of the detour member 400H. The detour member 400H is described with reference to FIGS. 5B, 14B, 15A, and 15B. The reference alphanumeric characters used in common in Embodiments 9 and 11 imply that the elements to which the common reference alphanumeric characters are given in Embodiment 11 have the same functions as the functions of the elements to which the common reference alphanumeric characters are given in Embodiment 9. Accordingly, the explanation in Embodiment 9 is applied to such elements in Embodiment 11.

Similar to Embodiment 9, the detour member 400H includes the protective outer shell 430F. The detour member 400H further includes a first magnetic piece 441 and a second magnetic piece 442. The first magnetic piece 441 and the second magnetic piece 442 may be structurally the same as the magnetic piece 410 described with reference to FIG. 5B. The first magnetic piece 441 may have the same cross-sectional dimensions as the cross-sectional dimensions of the second magnetic piece 442. Alternatively, the first magnetic piece 441 may have cross-sectional dimensions different from the cross-sectional dimensions of the second magnetic piece 442. The first magnetic piece 441 may have the same material properties as the material properties of the second magnetic piece 442 in terms of the kind and/or magnetic permeability. Alternatively, the first magnetic piece 441 may have material properties different from the material properties of the second magnetic piece 442 in terms of the kind and/or magnetic permeability.

The first magnetic piece 441 and the second magnetic piece 442 are accommodated in the accommodation groove 435. Accordingly, the second magnetic piece 442 is arranged next to the first magnetic piece 441. According to the data described with reference to FIG. 14B, when one of the first magnetic piece 441 and the second magnetic piece 442 is removed, leakage inductance is reduced. Thus, in manufacturing a coil structure (not illustrated), leakage inductance may be reduced by removing one of the first magnetic piece 441 and the second magnetic piece 442.

The principle of the present embodiment is not limited to a specific number of magnetic pieces accommodated in the accommodation groove 435. Accordingly, the number of magnetic pieces accommodated in the accommodation groove 435 may be more than two.

Figure 16:
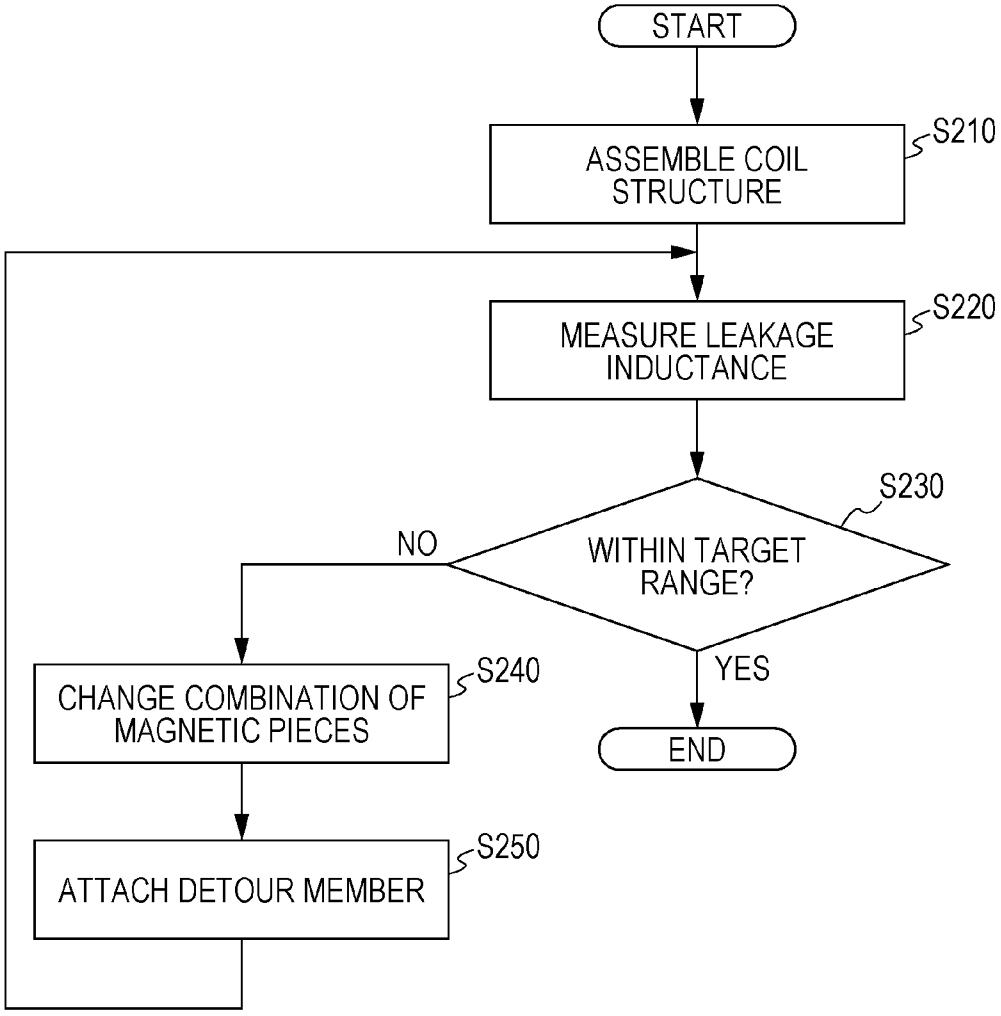
FIG. 16 is a schematic flowchart that illustrates an example of an adjustment process for leakage inductance.

FIG. 16 is a schematic flowchart that illustrates an example of an adjustment process for leakage inductance. The process of adjusting leakage inductance is described with reference to FIG. 16.

<Step S210>

In step S210, a coil structure (not illustrated) is assembled. After that, step S220 is performed.

<Step S220>

In step S220, the leakage inductance of the coil structure is measured. After that, step S230 is performed.

<Step S230>

In step S230, whether or not the value of the leakage inductance is within a target range is determined. When the value of the leakage inductance is within the target range, the manufacture of the coil structure is completed. Otherwise, step S240 is performed.

<Step S240>

In step S240, a detour member (not illustrated) is detached from a bobbin portion (not illustrated). After that, the combination of magnetic pieces (not illustrated) accommodated in a protective outer shell is changed. After that, step S250 is performed.

<Step S250>

In step S250, the detour member is attached to the bobbin portion. After that, step S220 is performed.

Embodiment 12

The coil structure described in relation to Embodiments 1 to 11 enables induced current to occur in a coil of a coil system arranged near the coil structure. As another possibility, the coil structure described in relation to Embodiments 1 to 11 enables induced current to occur, depending on the supply of current to a coil portion of a coil system arranged near the coil structure. Alternatively, two coil portions may be included in the coil structure. Embodiment 12 describes a coil structure that includes two coil portions.

Figure 17:
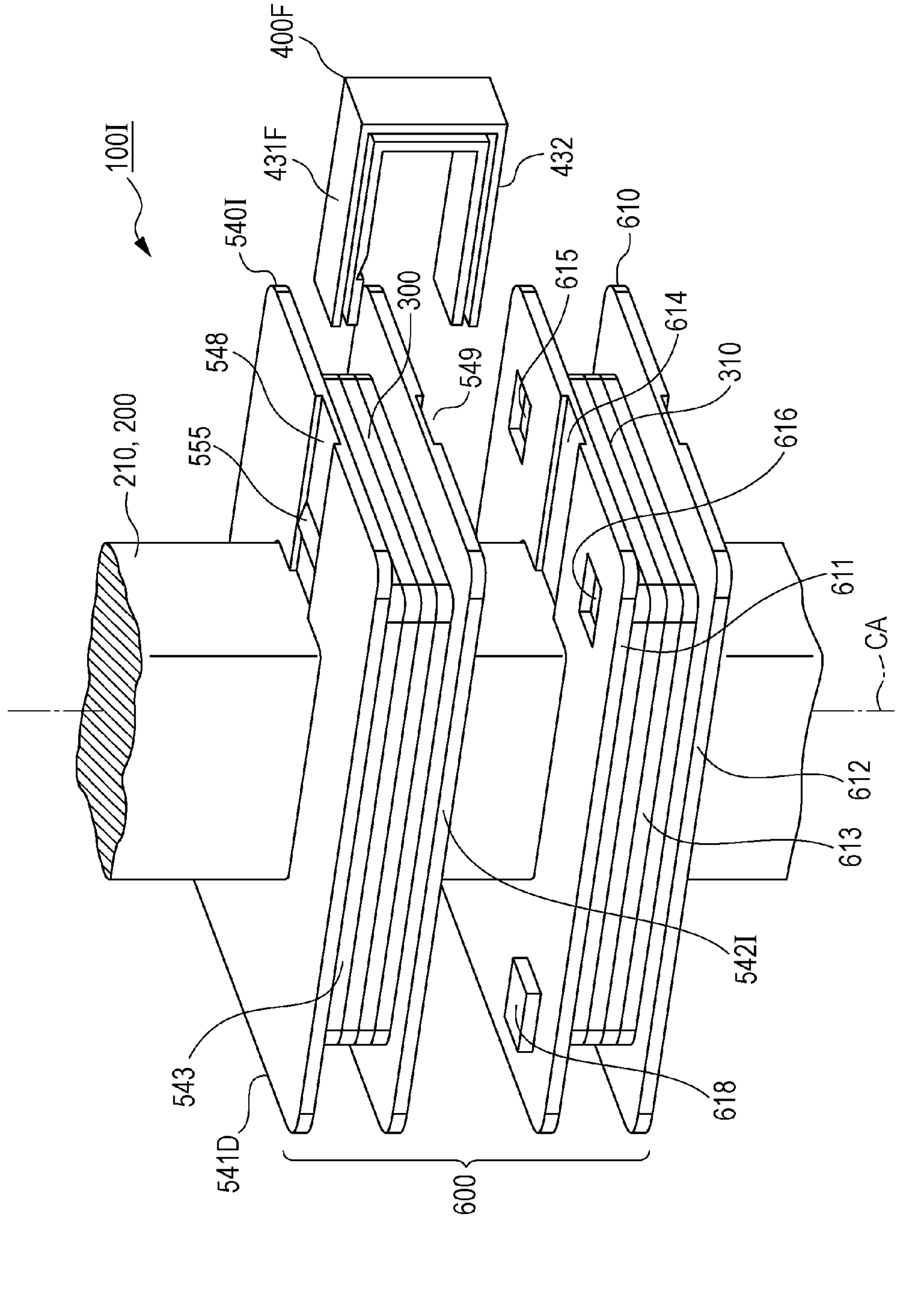
FIG. 17 is a schematic exploded perspective view of a coil structure according to Embodiment 12.

FIG. 17 is a schematic exploded perspective view of a coil structure 100I according to Embodiment 12. The coil structure 100I is described with reference to FIGS. 7 and 17. The reference alphanumeric characters used in common in Embodiments 9 and 12 imply that the elements to which the common reference alphanumeric characters are given in Embodiment 12 have the same functions as the functions of the elements to which the common reference alphanumeric characters are given in Embodiment 9. Accordingly, the explanation in Embodiment 9 is applied to such elements in Embodiment 12.

Similar to Embodiment 9, the coil structure 100I includes the magnetic core 200. FIG. 17 illustrates the core leg 210 as the magnetic core 200. The principle of the present embodiment is not limited to a specific shape of the magnetic core 200.

The coil structure 100I includes a coil unit 600. The coil unit 600 includes a coil portion 300 and the detour member 400F described in relation to Embodiment 9. The coil unit 600 further includes bobbin portions 540I and 610, and a coil portion 310. The core leg 210 is arranged through the bobbin portions 540I and 610. A winding that forms the coil portion 300 is wound around the bobbin portion 540I. The coil portion 300 is attached to the core leg 210 through the bobbin portion 540I accordingly. The winding that forms the coil portion 310 is wound around the bobbin portion 610. Thus, the coil portion 310 is attached to the core leg 210 through the bobbin portion 610.

Similar to Embodiment 9, the bobbin portion 540I includes an upper plate 541D, a tube-like portion 543, and a projecting portion 555. The winding that forms the coil portion 300 is wound around the tube-like portion 543.

The bobbin portion 540I further includes an upper connecting plate 542I. The upper connecting plate 542I extends outward from a lower end of the tube-like portion 543. Accordingly, the upper connecting plate 542I is located apart from the upper plate 541D in the direction in which the coil axis CA extends. The upper connecting plate 542I faces the bobbin portion 610. The upper connecting plate 542I is used for the connection with the bobbin portion 610.

A lower groove 549 is formed on the upper connecting plate 542I. The lower outer shell 432 is inserted into the lower groove 549.

The bobbin portion 610 includes a lower connecting plate 611, a lower plate 612, and a tube-like portion 613. A winding that forms the coil portion 310 is wound around the tube-like portion 613. The lower connecting plate 611 extends outward from an upper end of the tube-like portion 613. The lower plate 612 extends outward from a lower end of the tube-like portion 613. The lower connecting plate 611 faces the upper connecting plate 542I. The lower connecting plate 611 is used for the connection with the upper connecting plate 542I.

An upper groove 614 is formed on the lower connecting plate 611. The upper groove 614 is superposed on the lower groove 549. As a result, in cooperation with each other, the upper groove 614 and the lower groove 549 form an insertion hole into which the lower outer shell 432 is inserted. The lower outer shell 432 is arranged between the upper connecting plate 542I and the lower connecting plate 611.

In using the coil structure 100I, the coil portion 300 may be supplied with current. In this case, induced current occurs in the coil portion 310. Alternatively, the coil portion 310 may be supplied with current. In this case, induced current occurs in the coil portion 300. In the present embodiment, the coil portion 310 exemplifies the second coil portion.

The upper plate 541D, the upper connecting plate 542I, and the lower connecting plate 611 correspond to the adjoining member 530 described with reference to FIG. 7. The projecting portion 555 and the upper groove 548 correspond to the upper connecting portion 511 described with reference to FIG. 7. The upper groove 614 and the lower groove 549 correspond to the lower connecting portion 512 described with reference to FIG. 7. In the present embodiment, the bobbin portion 610 exemplifies the second bobbin portion.

Figure 18:
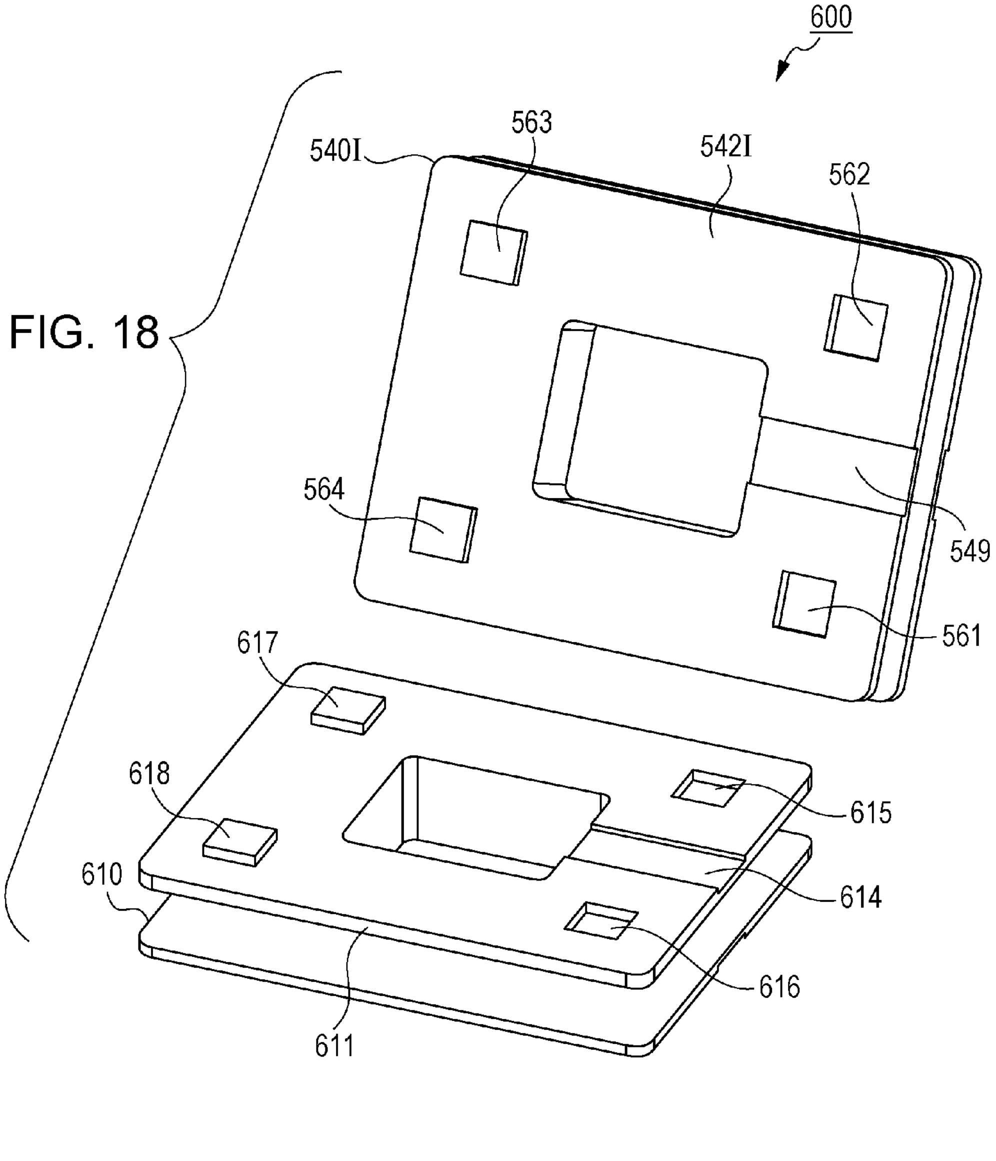
FIG. 18 is a schematic exploded perspective view of the coil structure illustrated in FIG. 17.

FIG. 18 is a schematic exploded perspective view of the coil unit 600. The connection structure between the bobbin portions 540I and 610 is described with reference to FIGS. 17 and 18.

The bobbin portion 540I includes connection bosses 561 and 562. The connection bosses 561 and 562 project from the upper connecting plate 542I toward the lower connecting plate 611. The lower groove 549 is positioned between the connection bosses 561 and 562.

Connection holes 615 and 616 complementary to the connection bosses 561 and 562 are formed through the lower connecting plate 611. The upper groove 614 is positioned between the connection holes 615 and 616. The connection bosses 561 and 562 are fitted in the connection holes 615 and 616.

Connection holes 563 and 564 are formed through the upper connecting plate 542I. The bobbin portion 610 includes connection bosses 617 and 618 complementary to the connection holes 563 and 564. The connection bosses 617 and 618 are fitted in the connection holes 563 and 564.

The principle of the present embodiment is not limited to a specific connection structure between the bobbin portions 540I and 610. As another connection structure, an adhesive or another suitable connecting technique may be used.

The detour member 400F may be attached to the bobbin portion 610. In this case, the upper outer shell 431F of the detour member 400F is arranged between the bobbin portions 540I and 610.

Embodiment 13

Various coil structures including the coil unit described in relation to Embodiment 12 may be designed. Embodiment 13 describes an example of a coil structure that includes a coil unit.

Figure 19:
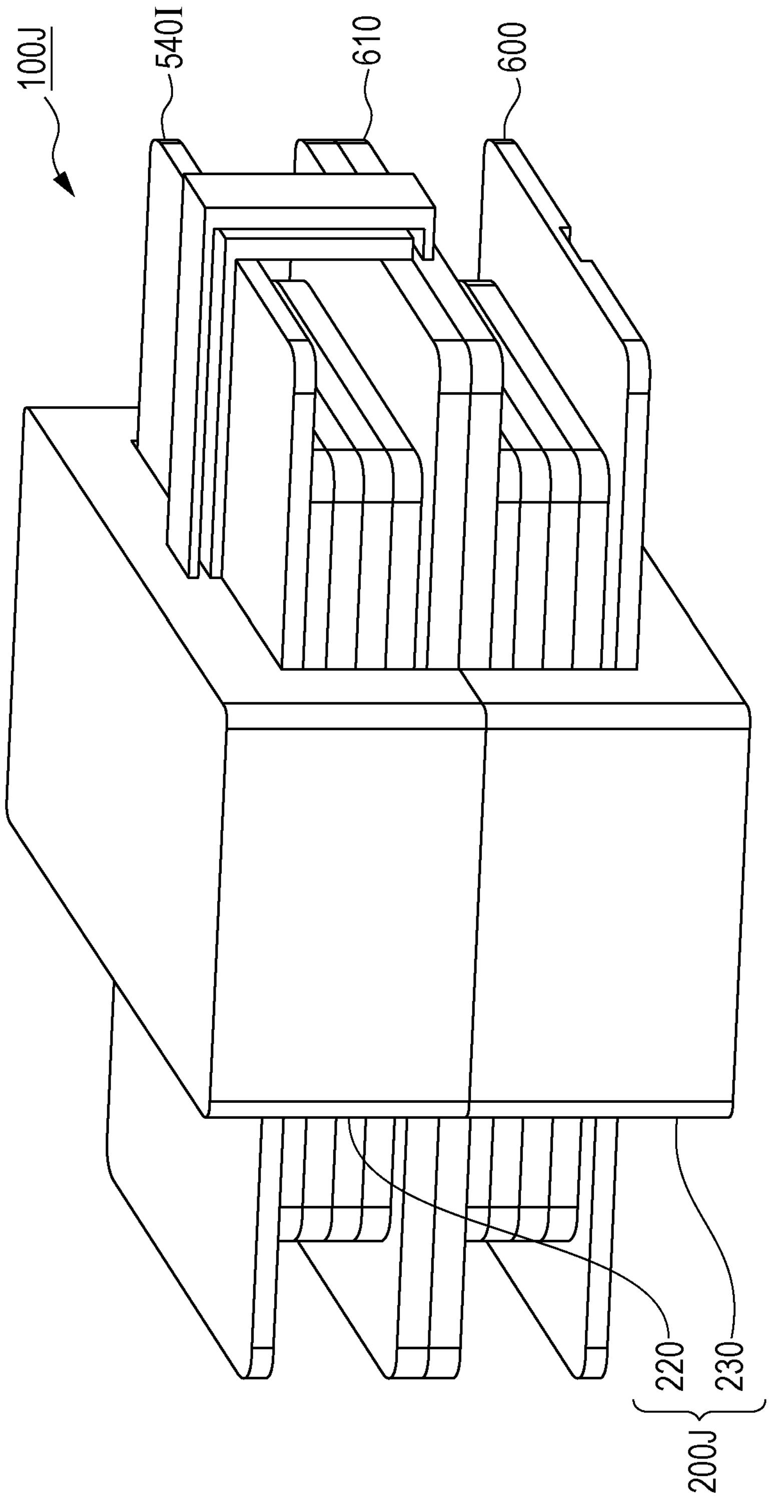
FIG. 19 is a schematic perspective view of a coil structure according to Embodiment 13.

FIG. 19 is a schematic perspective view of a coil structure 100J according to Embodiment 13. The coil structure 100J is described with reference to FIG. 19. The reference alphanumeric characters used in common in Embodiments 12 and 13 imply that the elements to which the common reference alphanumeric characters are given in Embodiment 13 have the same functions as the functions of the elements to which the common reference alphanumeric characters are given in Embodiment 12. Accordingly, the explanation in Embodiment 12 is applied to such elements in Embodiment 13.

Similar to Embodiment 12, the coil structure 100J includes the coil unit 600. The coil structure 100J further includes a magnetic core 200J. The magnetic core 200J includes an upper core 220 and a lower core 230. The upper core 220 surrounds the bobbin portion 540I. The lower core 230 surrounds the bobbin portion 610. Accordingly, the upper core 220 and the lower core 230 form a magnetic frame that surrounds the bobbin portions 540I and 610.

Figure 20:
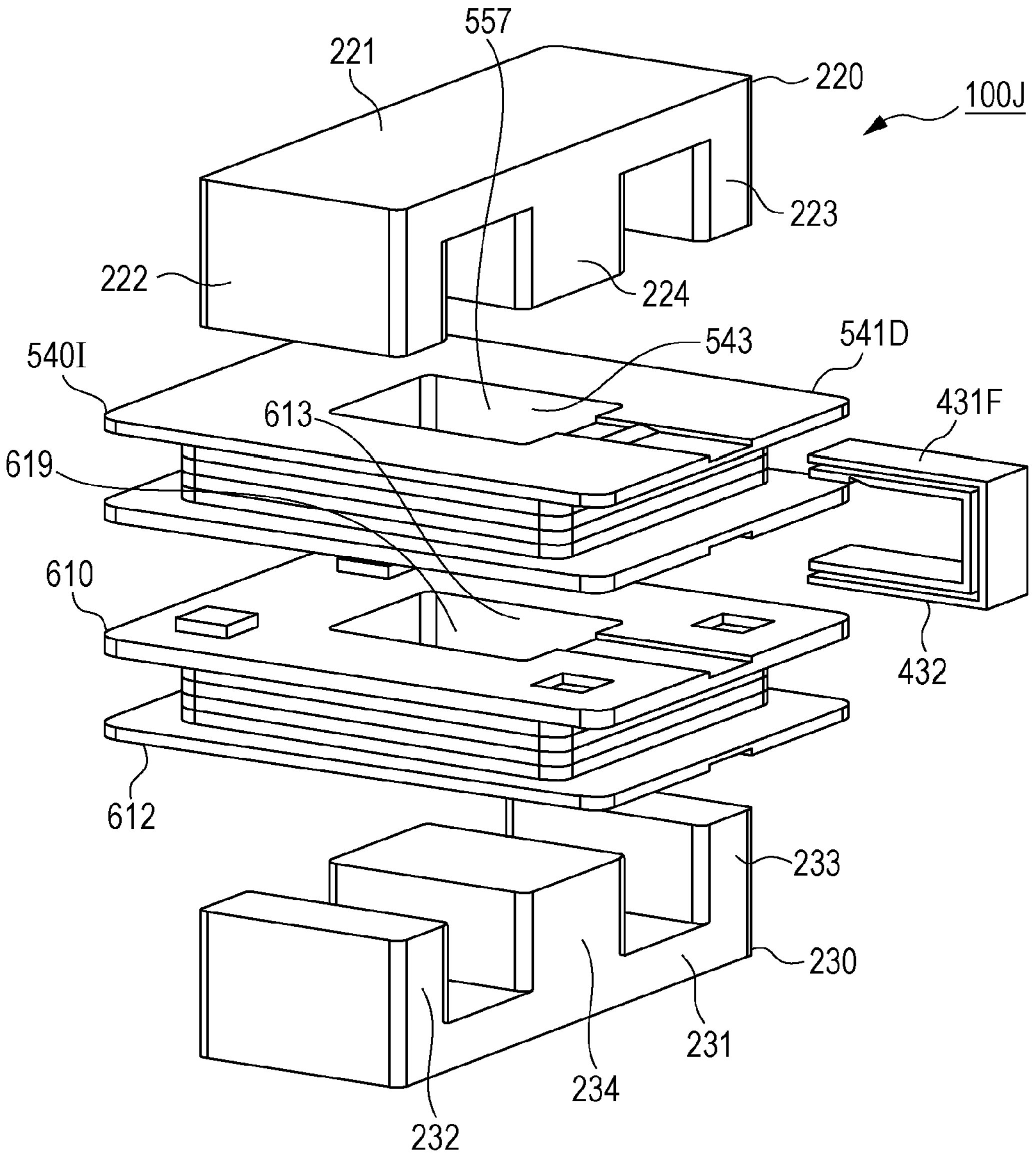
FIG. 20 is a schematic exploded perspective view of the coil structure illustrated in FIG. 19.

FIG. 20 is a schematic exploded perspective view of the coil structure 100J. The coil structure 100J is further described with reference to FIGS. 17 and 20.

The upper core 220 includes a linkage portion 221, a front leg 222, a rear leg 223, and a central leg 224. The linkage portion 221 extends along the upper plate 541D in the direction perpendicular to the direction in which the upper outer shell 431F and the lower outer shell 432 extend. The front leg 222 extends downward from a front end of the linkage portion 221 and is connected to the lower core 230. The rear leg 223 opposite the front leg 222 extends downward from a rear end of the linkage portion 221 and is connected to the lower core 230. Between the front leg 222 and the rear leg 223, the central leg 224 extends downward from the linkage portion 221. The central leg 224 is inserted into an insertion hole 557 defined by the tube-like portion 543 and is connected to the lower core 230.

The lower core 230 includes a linkage portion 231, a front leg 232, a rear leg 233, and a central leg 234. The linkage portion 231 extends along the lower plate 612 in the direction perpendicular to the direction in which the upper outer shell 431F and the lower outer shell 432 extend. The front leg 232 extends downward from a front end of the linkage portion 231 and is connected to the front leg 222 of the upper core 220. The rear leg 233 opposite the front leg 232 extends upward from a rear end of the linkage portion 231 and is connected to the rear leg 223 of the upper core 220. Between the front leg 232 and the rear leg 233, the central leg 234 extends upward from the linkage portion 231. The central leg 234 is inserted into an insertion hole 619 defined by the tube-like portion 613 and is connected to the central leg 224.

The linkage portions 221 and 231, the front legs 222 and 232, and the rear legs 223 and 233 form a magnetic frame that surrounds the bobbin portions 540I and 610. In the magnetic frame formed by the linkage portions 221 and 231, the front legs 222 and 232, and the rear legs 223 and 233, the central legs 224 and 234 are inserted into the bobbin portions 540I and 610. The central legs 224 and 234 correspond to the core leg 210 described with reference to FIG. 17.

Embodiment 14

Various coil structures with different arrangements of the windings, which are a primary winding and a secondary winding, may be designed on the basis of the principle of Embodiment 13. Embodiment 14 describes various coil structures with different arrangements of the windings. The principle of the present embodiment is not limited to a specific arrangement pattern of the windings.

Figure 21A:
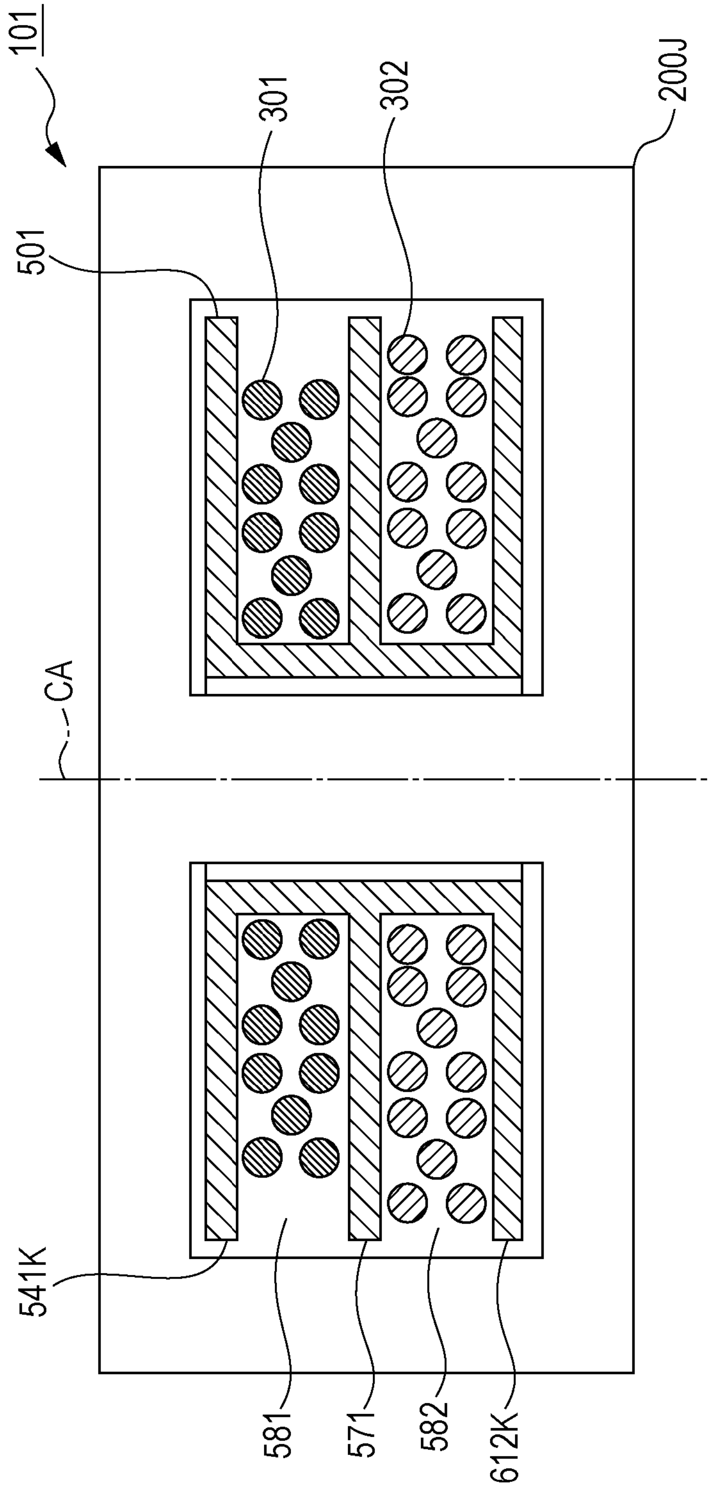
FIG. 21A is a schematic cross-sectional view of a coil structure according to Embodiment 14.
Figure 21B:
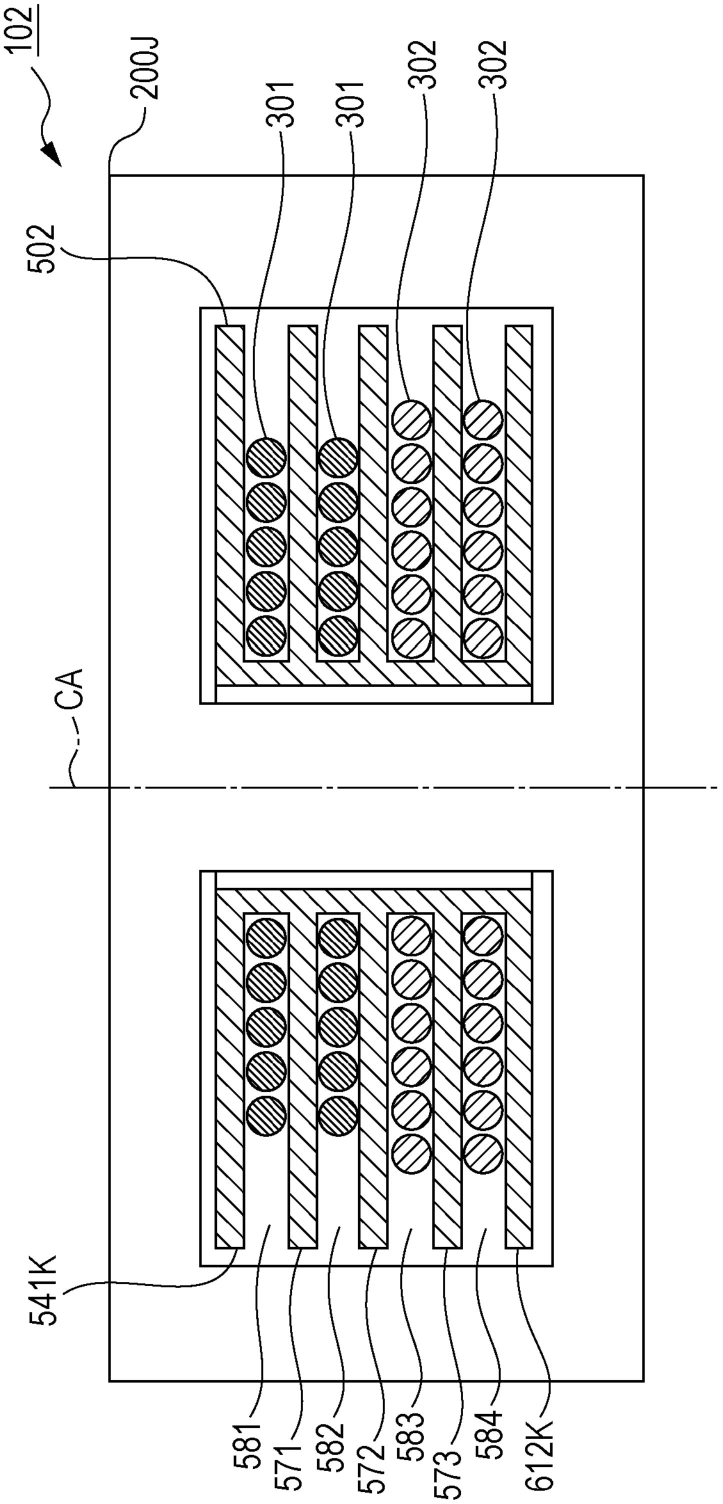
FIG. 21B is a schematic cross-sectional view of the coil structure according to Embodiment 14.
Figure 21C:
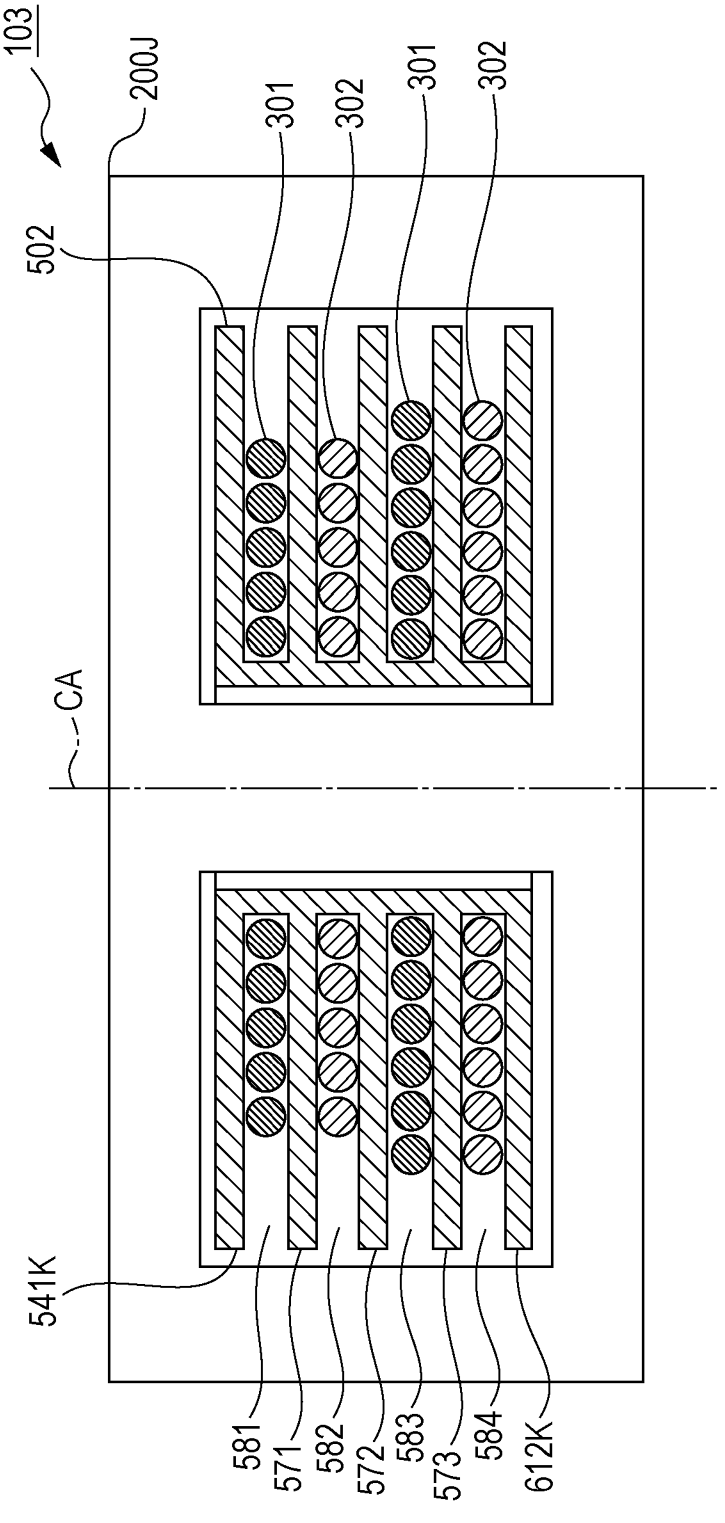
FIG. 21C is a schematic cross-sectional view of the coil structure according to Embodiment 14.

FIGS. 21A, 21B, and 21C are respective schematic cross-sectional views of coil structures 101 to 103 manufactured on the basis of the design principle described in relation to Embodiment 13. The coil structures 101, 102, and 103 are described with reference to FIGS. 17, 21A, 21B, and 21C. The coil structures 101, 102, and 103 are different from one another in arrangement of the windings, which are the primary winding and the secondary winding. The reference alphanumeric characters used in common in Embodiments 13 and 14 imply that the elements to which the common reference alphanumeric characters are given in Embodiment 14 have the same functions as the functions of the elements to which the common reference alphanumeric characters are given in Embodiment 13. Accordingly, the explanation in Embodiment 13 is applied to such elements in Embodiment 14.

The structure of the coil structure 101 is described with reference to FIG. 21A. The coil structure 101 includes a primary winding 301, a secondary winding 302, and a magnetic core 200J. The primary winding 301 corresponds to the winding that is one of the coil portions 300 and 310 described with reference to FIG. 17. The secondary winding 302 corresponds to the winding that is the other of the coil portions 300 and 310.

The coil structure 101 further includes a bobbin structure 501. The bobbin structure 501 includes an upper plate 541K, a lower plate 612K, a first partition plate 571, and a detour member (not illustrated). The detour member forms a detour magnetic path between the upper plate 541K and the first partition plate 571 and/or between the lower plate 612K and the first partition plate 571. The bobbin structure 501 corresponds to an assembly of the bobbin portions 540I and 610 described with reference to FIG. 17. The upper plate 541K corresponds to the upper plate 541D described with reference to FIG. 17. The lower plate 612K corresponds to the lower plate 612 described with reference to FIG. 17. The first partition plate 571 corresponds to a combination of the upper connecting plate 542I and the lower connecting plate 611 described with reference to FIG. 17.

The upper plate 541K forms an upper surface of the bobbin structure 501. The lower plate 612K forms a lower surface of the bobbin structure 501. The first partition plate 571 partitions a space between the upper plate 541K and the lower plate 612K into a first region 581 and a second region 582. The primary winding 301 is wound for ten turns around a coil axis CA in the first region 581. The secondary winding 302 is wound for twelve turns around the coil axis CA in the second region 582.

A structure of the coil structure 102 is now described with reference to FIG. 21B. Similar to the coil structure 101, the coil structure 102 includes the primary winding 301, the secondary winding 302, and the magnetic core 200J. The primary winding 301 is wound for ten turns around the coil axis CA. The secondary winding 302 is wound for twelve turns around the coil axis CA.

The coil structure 102 further includes a bobbin structure 502. Similar to the bobbin structure 501, the bobbin structure 502 includes an upper plate 541K, a lower plate 612K, a first partition plate 571, and a detour member (not illustrated). The bobbin structure 502 further includes a second partition plate 572 below the first partition plate 571 and a third partition plate 573 below the second partition plate 572. The second partition plate 572 separates a third region 583 from the second region 582. The third partition plate 573 separates a fourth region 584 from the third region 583. The detour member defines a detour magnetic path that straddles at least one of the first region 581, the second region 582, the third region 583, and the fourth region 584.

Unlike the coil structure 101, the primary winding 301 is wound for five turns in the first region 581 and wound for five turns in the second region 582 around the coil axis CA. The secondary winding 302 is arranged in the third region 583 and the fourth region 584. The secondary winding 302 is wound for six turns in the third region 583 and wound for six turns in the fourth region 584 around the coil axis CA.

The coil structure 103 is now described with reference to FIG. 21C. Similar to the coil structure 102, the coil structure 103 includes the primary winding 301, the secondary winding 302, the bobbin structure 502, the magnetic core 200J, and a detour member (not illustrated). The primary winding 301 is wound around the coil axis CA for ten turns. The secondary winding 302 is wound around the coil axis CA for twelve turns.

Unlike the coil structure 102, the primary winding 301 is wound in the first region 581 and the third region 583. The secondary winding 302 is wound in the second region 582 and the fourth region 584. Accordingly, the primary winding 301 and the secondary winding 302 are alternately arranged in a plurality of regions, which are the first region 581, the second region 582, the third region 583, and the fourth region 584 divided by a plurality of partition plates, which are the first partition plate 571, the second partition plate 572, and the third partition plate 573. That is, the regions in which the primary winding 301 is arranged are next to the regions in which the secondary winding 302 is arranged.

The primary winding 301 is wound for five turns in the first region 581 and wound for five turns in the third region 583 around the coil axis CA. The secondary winding 302 is wound for six turns in the second region 582 and wound for six turns in the fourth region 584 around the coil axis CA.

Advantages of the coil structure 101 are now described. The coil structure 101 utilizes a smaller number of partition members than the number of partition members in the coil structures 102 and 103 so as to partition the space between the upper plate 541K and the lower plate 612K. Accordingly, relatively small dimensional values may be given to the coil structure 101 in the direction in which the coil axis CA extends.

Advantages of the coil structures 102 and 103 are now described. The numbers of turns of the windings in the coil structures 102 and 103 are smaller than the number of turns of the windings in the coil structure 101 in each of the regions. In addition, the voltage applied between the windings is small. Accordingly, the coil structures 102 are 103 may be structurally stronger against electrical breakdown of the winding than the coil structure 101.

Lastly, advantages of the coil structure 103 are described. In the absence of the detour member, the coil structure 103 may achieve leakage inductance smaller than the leakage inductance achieved by the coil structures 101 and 102. That is, an adjustment range of the leakage inductance using the detour member is large. Thus, when the design principle of the coil structure 103 is employed, the leakage inductance may be set to various magnitudes by utilizing the detour member.

The principle of the present embodiment enables various coil structures to be designed. In view of the above-described various advantages, the arrangement pattern of the windings in the coil structure may be decided. The number of turns of the winding in each region may be decided, depending on the design parameters including the leakage inductance, the maximum magnetic flux density, and the input-to-output voltage ratio, which are desired. For example, in designing the coil structure 102, the leakage inductance may be decreased by increasing the number of turns of the primary winding 301 in the second region 582.

Embodiment 15

Various coil structures that form a plurality of detour magnetic paths may be designed on the basis of the design principle described in relation to Embodiment 13. Embodiment 15 describes an example of a coil structure that forms a plurality of detour magnetic paths.

Figure 22:
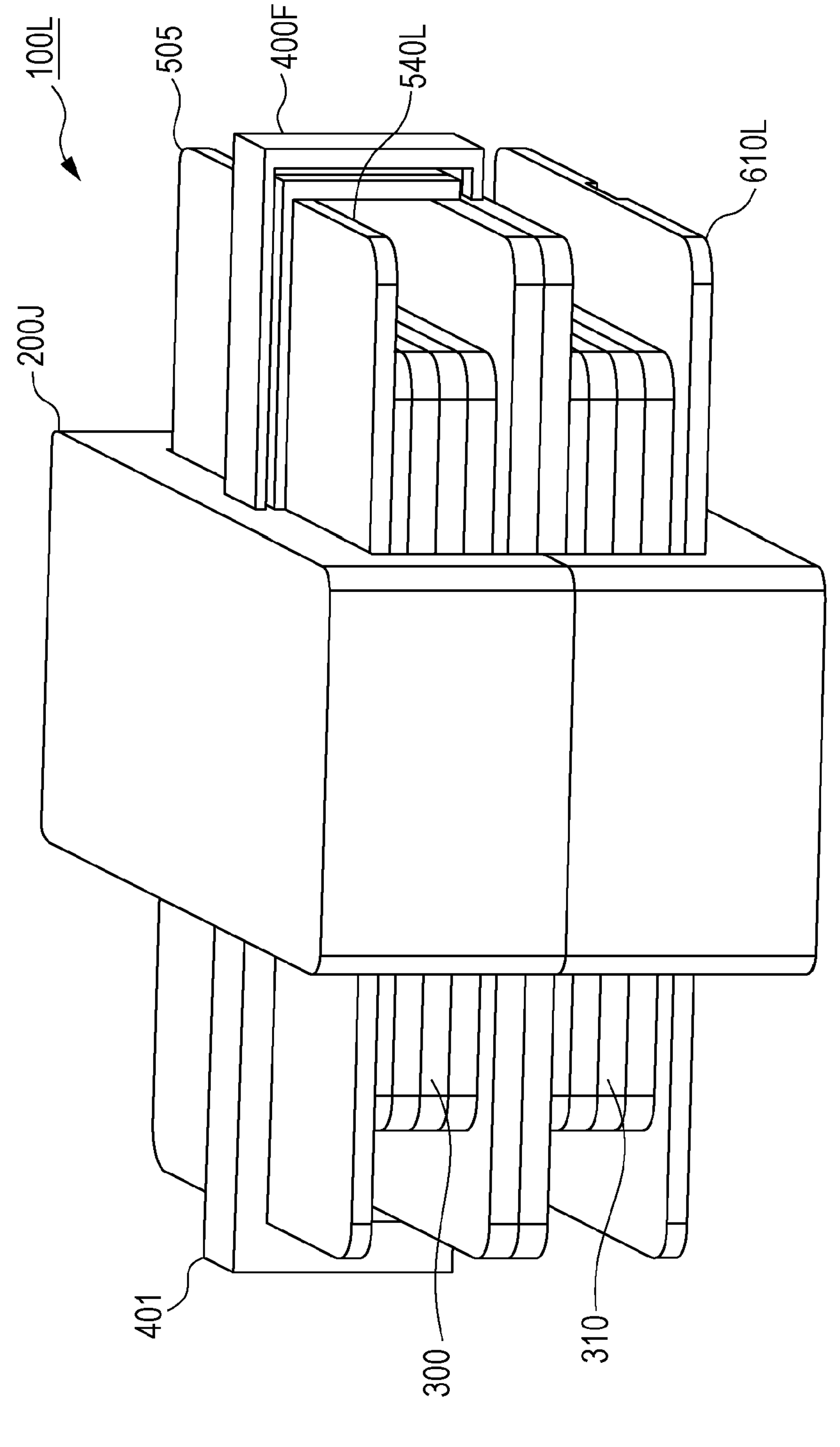
FIG. 22 is a schematic perspective view of a coil structure according to Embodiment 15.

FIG. 22 is a schematic perspective view of a coil structure 100L according to Embodiment 15. The coil structure 100L is described with reference to FIG. 22. The reference alphanumeric characters used in common in Embodiments 13 and 15 imply that the elements to which the common reference alphanumeric characters are given in Embodiment 15 have the same functions as the functions of the elements to which the common reference alphanumeric characters are given in Embodiment 13. Accordingly, the explanation in Embodiment 13 is applied to such elements in Embodiment 15.

Similar to Embodiment 13, the coil structure 100L includes the magnetic core 200J, the coil portions 300 and 310, and the detour member 400F. The coil structure 100L further includes a bobbin structure 505 and a detour member 401. The detour member 401 may have the same structure as the structure of the detour member 400F. The bobbin structure 505 includes a fixing structure for fixing the detour member 400F. The fixing structure may be the grooved structure and the engaging structure described in relation to Embodiment 13. The bobbin structure 505 further includes a fixing structure for fixing the detour member 401. The fixing structure for the detour member 401 may be the same as the fixing structure for the detour member 400F.

The bobbin structure 505 includes bobbin portions 540L and 610L. The coil portion 300 surrounds the bobbin portion 540L. The coil portion 310 surrounds the bobbin portion 610L. The detour members 400F and 401 form detour magnetic paths around the bobbin portion 540L. Alternatively, the coil structure may be designed so as to form detour magnetic paths respectively for the bobbin portions 540L and 610L. The principle of the present embodiment is not limited to specific formation positions of the detour magnetic paths.

The number of detour magnetic paths in the coil structure may be set to more than two. The principle of the present embodiment is not limited to a specific number of detour magnetic paths.

Embodiment 16

A coil structure with two coil axes may be designed. Embodiment 16 describes a coil structure that includes two coil axes.

Figure 23:
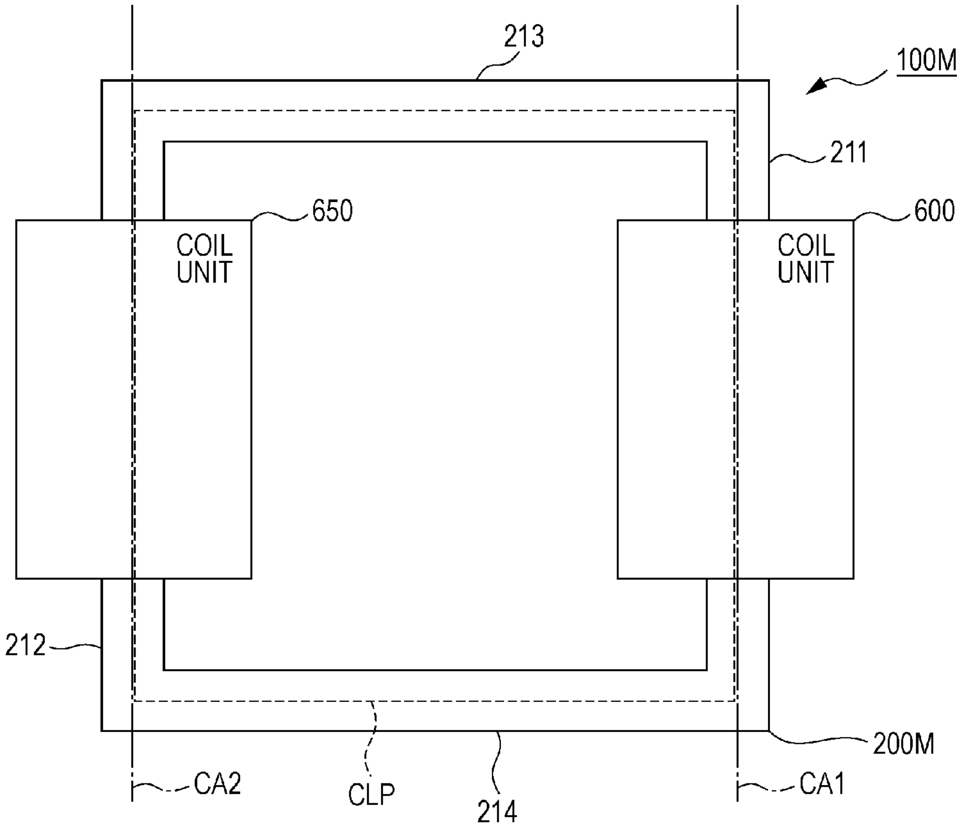
FIG. 23 is a conceptual view of a coil structure according to Embodiment 16.

FIG. 23 is a conceptual view of a coil structure 100M according to Embodiment 16. The coil structure 100M is described with reference to FIG. 23. The reference alphanumeric characters used in common in Embodiments 1, 12, and 16 imply that the elements to which the common reference alphanumeric characters are given in Embodiment 16 have the same functions as the functions of the elements to which the common reference alphanumeric characters are given in Embodiment 1 or 12. Accordingly, the explanation in Embodiment 1 or 12 is applied to such elements in Embodiment 16.

Similar to Embodiment 12, the coil structure 100M includes the coil unit 600. The coil structure 100M further includes a magnetic core 200M and a coil unit 650. The magnetic core 200M includes a first core leg 211, a second core leg 212, an upper linkage portion 213, and a lower linkage portion 214.

The first core leg 211 extends along a first coil axis CA1 and is arranged through the coil unit 600. The second core leg 212 extends along a second coil axis CA2 defined next to the first coil axis CA1 and is inserted into the coil unit 650. The coil unit 650 may perform various electromagnetic operations. For example, similar to the coil unit 600 described in relation to Embodiment 12, the coil unit 650 may cause induced current, depending on the supply of current. The principle of the present embodiment is not limited to specific employment or a specific structure of the coil unit 650.

The upper linkage portion 213 extends between an upper end of the first core leg 211 and an upper end of the second core leg 212. The lower linkage portion 214 is arranged in a position apart from the upper linkage portion 213 in the direction in which the first coil axis CA1 and the second coil axis CA2 extend. The lower linkage portion 214 is linked to a lower end of the first core leg 211 and a lower end of the second core leg 212. Accordingly, the magnetic core 200M may define the closed loop magnetic path CLP in which magnetic flux flows.

Embodiment 17

Various coil structures may be designed on the basis of the design principle described in relation to Embodiment 16. Embodiment 17 describes an example of the coil structure based on the design principle of Embodiment 16. Since the coil structure of Embodiment 17 includes a plurality of coil units, dimensions in the direction in which a coil axis extends may be set to small values.

Figure 24:
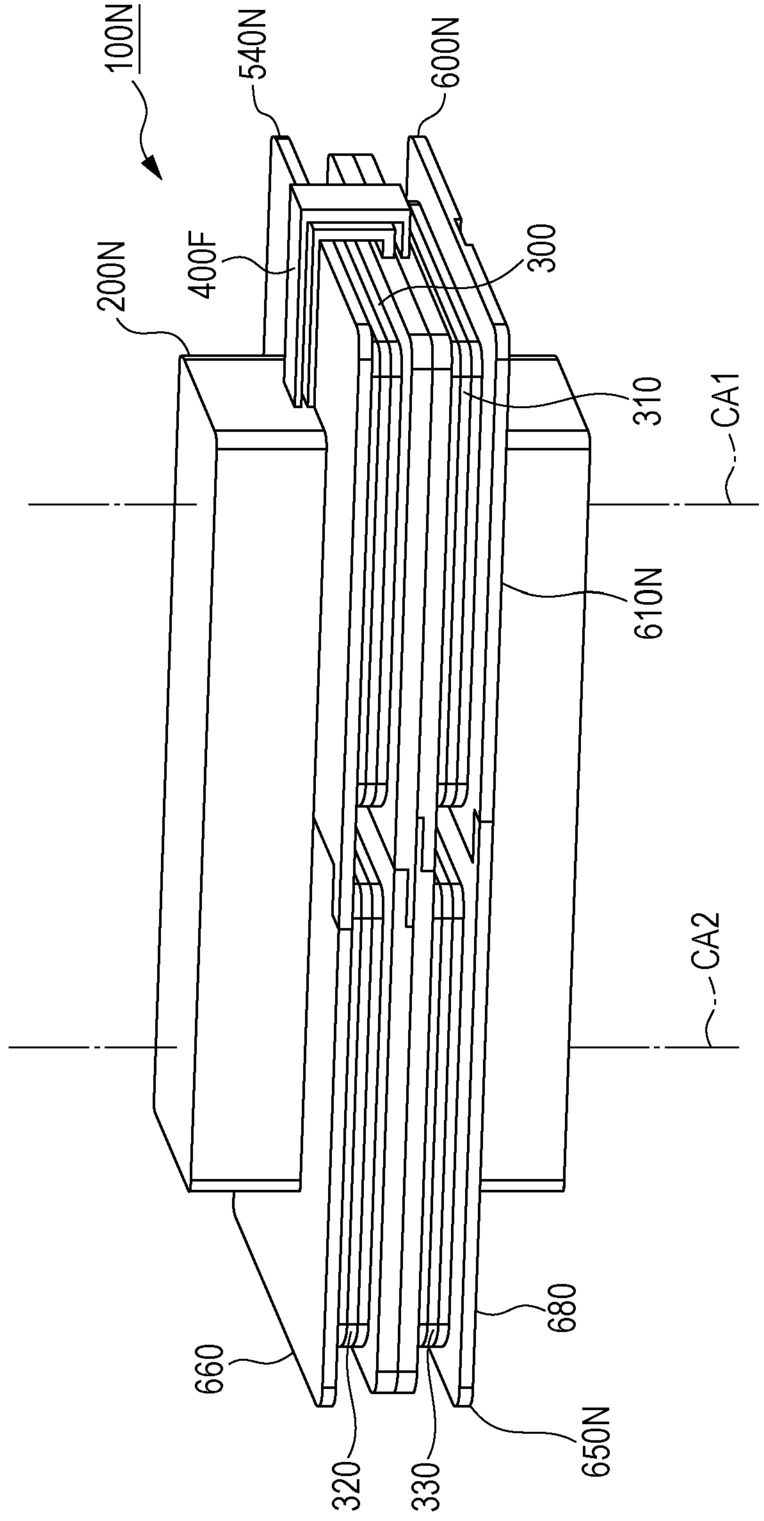
FIG. 24 is a conceptual view of a coil structure according to Embodiment 17.

FIG. 24 is a conceptual view of a coil structure 100N according to Embodiment 17. The coil structure 100N is described with reference to FIGS. 23 and 24. The reference alphanumeric characters used in common in Embodiments 12 and 17 imply that the elements to which the common reference alphanumeric characters are given in Embodiment 17 have the same functions as the functions of the elements to which the common reference alphanumeric characters are given in Embodiment 12. Accordingly, the explanation in Embodiment 12 is applied to such elements in Embodiment 17.

The coil structure 100N includes a magnetic core 200N and coil units 600N and 650N. The magnetic core 200N corresponds to the magnetic core 200M described with reference to FIG. 23. The coil unit 600N corresponds to the coil unit 600 described with reference to FIG. 23. The coil unit 650N corresponds to the coil unit 650 described with reference to FIG. 23.

Similar to Embodiment 16, the coil unit 600N includes the coil portions 300 and 310, and the detour member 400F. The coil unit 600N further includes bobbin portions 540N and 610N. The coil portions 300 and 310, and the bobbin portions 540N and 610N surround the first coil axis CA1. The bobbin portion 610N may be aligned with the bobbin portion 540N along the first coil axis CA1. A winding of the coil portion 300 is wound around the bobbin portion 540N. A winding of the coil portion 310 is around the bobbin portion 610N. The detour member 400F forms a detour magnetic path that partially surrounds the coil portion 300.

The coil unit 650N includes coil portions 320 and 330, and bobbin portions 660 and 680. The coil portions 320 and 330, and the bobbin portions 660 and 680 surround the second coil axis CA2. The bobbin portion 680 may be aligned with the bobbin portion 660 along the second coil axis CA2. A winding of the coil portion 320 is wound around the bobbin portion 660. A winding of the coil portion 330 is wound around the bobbin portion 680.

In using the coil structure 100N, the coil portion 320 may be supplied with current. Induced current occurs in the coil portion 330. Alternatively, the coil portion 330 may be supplied with current. Induced current occurs in the coil portion 320. In the present embodiment, the bobbin portion 660 exemplifies the third bobbin portion. The bobbin portion 680 exemplifies the fourth bobbin portion. In the present embodiment, the coil portion 320 exemplifies the third coil portion. The coil portion 330 exemplifies the fourth coil portion.

The coil portions 300 and 320 may be formed of a common winding. The coil portion 320 may be formed of a winding different from the winding of the coil portion 300. The coil portions 310 and 330 may be formed of a common winding. The coil portion 330 may be formed of a winding different from the winding of the coil portion 310. The principle of the present embodiment is not limited to a specific structure related to the winding.

Figure 25:
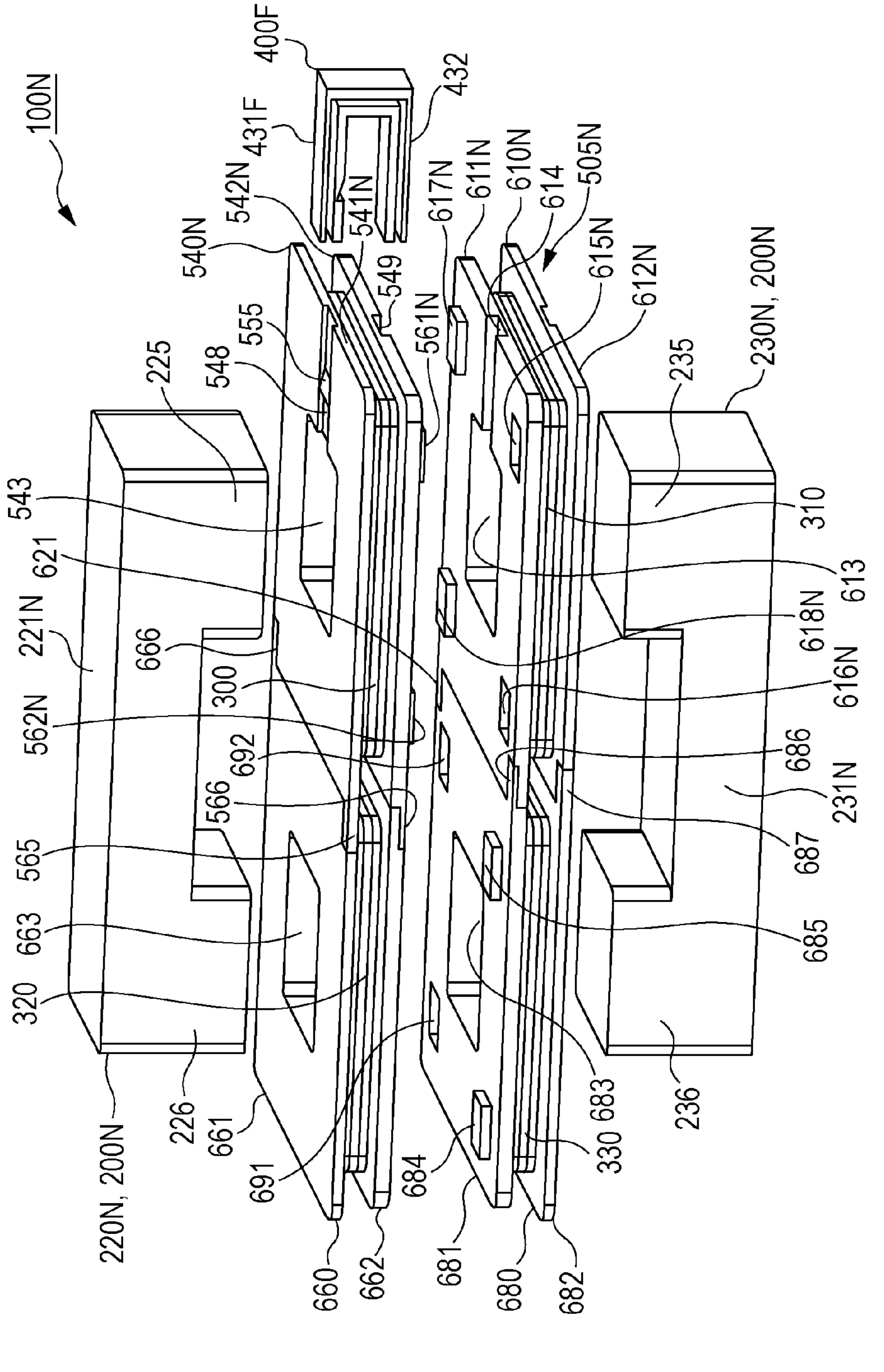
FIG. 25 is a schematic exploded perspective view of the coil structure illustrated in FIG. 24.

FIG. 25 is a schematic exploded perspective view of the coil structure 100N. The coil structure 100N is further described with reference to FIGS. 23 and 25.

The magnetic core 200N includes an upper core 220N and a lower core 230N. The upper core 220N includes a linkage portion 221N, a right core leg 225, and a left core leg 226. The linkage portion 221N extends in the direction in which the upper outer shell 431F and the lower outer shell 432 extend. The right core leg 225 extends downward from a right end of the linkage portion 221N and is connected to the lower core 230N. The left core leg 226 extends downward from a left end of the linkage portion 221N and is connected to the lower core 230N. The linkage portion 221N corresponds to the upper linkage portion 213 described with reference to FIG. 23.

The lower core 230N includes a linkage portion 231N, a right core leg 235, and a left core leg 236. The linkage portion 231N extends in the direction in which the upper outer shell 431F and the lower outer shell 432 extend. The right core leg 235 extends upward from a right end of the linkage portion 231N and is connected to the right core leg 225 of the upper core 220N. The left core leg 236 extends upward from a left end of the linkage portion 231N and is connected to the left core leg 226 of the upper core 220N. The right core legs 225 and 235 correspond to the first core leg 211 described with reference to FIG. 23. The left core legs 226 and 236 correspond to the second core leg 212 described with reference to FIG. 23.

Figure 26:
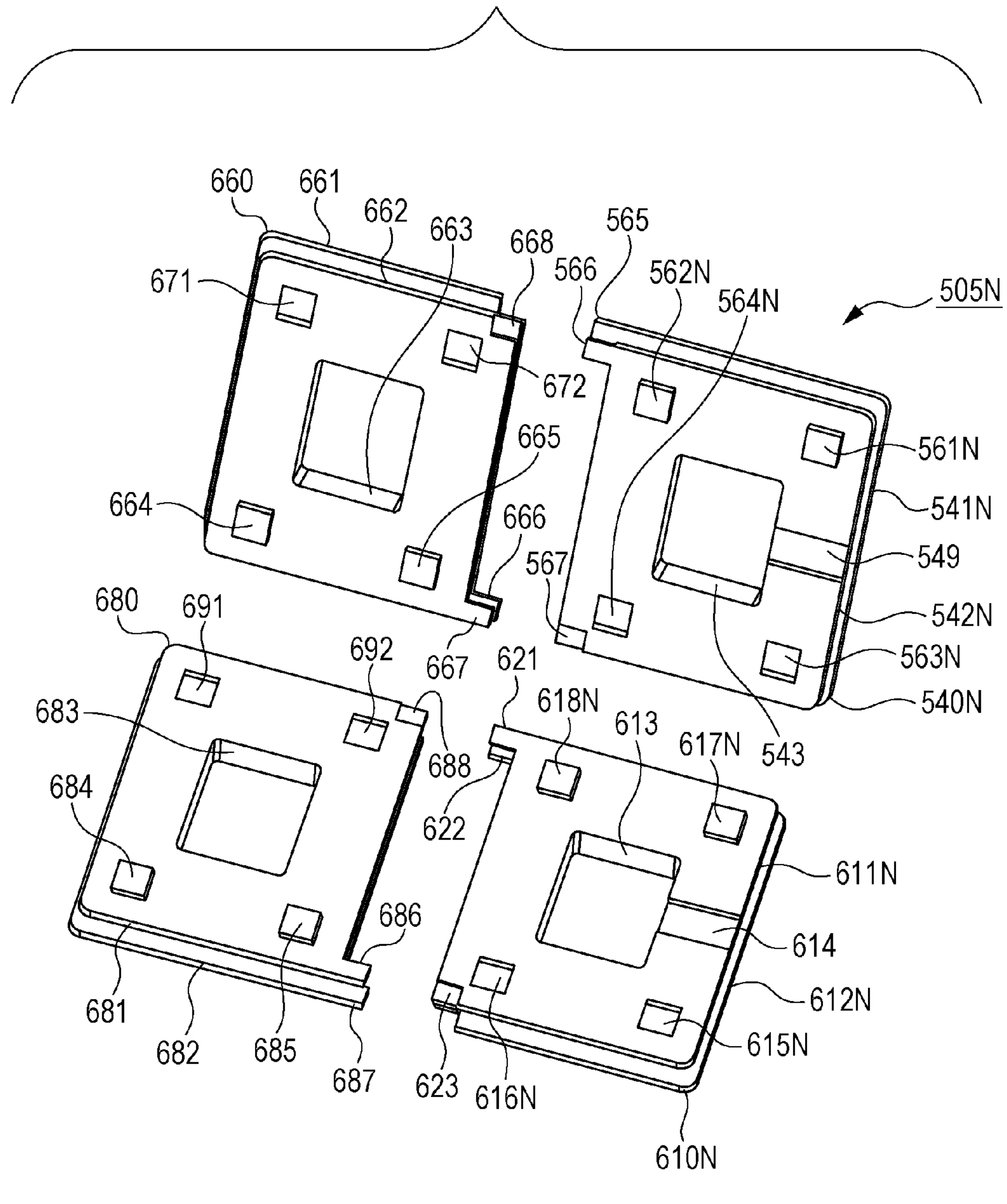
FIG. 26 is a schematic exploded perspective view of a bobbin structure of the coil structure illustrated in FIG. 24.

FIG. 26 is a schematic exploded perspective view of a bobbin structure 505N that includes the bobbin portions 540N, 610N, 660, and 680. The bobbin structure 505N is described with reference to FIGS. 25 and 26.

Similar to Embodiment 12, the bobbin portion 540N includes the tube-like portion 543 and the projecting portion 555. The bobbin portion 540N further includes an upper plate 541N, an upper connecting plate 542N, connection bosses 561N and 562N, an upper tongue portion 565, and a lower tongue portion 566.

Similar to Embodiment 12, an upper groove 548 is formed on the upper plate 541N. The projecting portion 555 is formed in the upper groove 548. The upper outer shell 431F is inserted into the upper groove 548 and engages with the projecting portion 555.

The upper tongue portion 565 projects from the upper plate 541N toward the bobbin portion 660. The upper tongue portion 565 is utilized for the connection between the bobbin portions 540N and 660.

Similar to Embodiment 12, a lower groove 549 is formed on the upper connecting plate 542N. The lower outer shell 432 is inserted into the lower groove 549.

Connection holes 563N and 564N are formed through the upper connecting plate 542N. The connection bosses 561N and 562N project downward from the upper connecting plate 542N. The connection holes 563N and 564N, and the connection bosses 561N and 562N are utilized for the connection with the bobbin portion 610N.

The lower tongue portion 566 projects from the upper connecting plate 542N toward the bobbin portion 660. The lower tongue portion 566 is thinner than the upper connecting plate 542N. The upper connecting plate 542N includes a thin region 567 formed so as to be thinner by the thickness of the lower tongue portion 566. The lower tongue portion 566 and the thin region 567 are utilized for the connection with the bobbin portion 660.

Similar to Embodiment 12, the bobbin portion 610N includes a tube-like portion 613. The bobbin portion 610N further includes a lower connecting plate 611N, a lower plate 612N, connection bosses 617N and 618N, an upper tongue portion 621, and a lower tongue portion 622.

Similar to Embodiment 12, an upper groove 614 is formed on the lower connecting plate 611N. The upper groove 614 is superposed on the lower groove 549. Accordingly, in cooperation with each other, the upper groove 614 and the lower groove 549 form an insertion hole into which the lower outer shell 432 is inserted. The lower outer shell 432 is arranged between the upper connecting plate 542N and the lower connecting plate 611.

Connection holes 615N and 616N are formed through the lower connecting plate 611N. The connection bosses 561N and 562N are fitted in the connection holes 615N and 616N. The connection bosses 617N and 618N project upward from the lower connecting plate 611N. The connection bosses 617N and 618N are fitted in the connection holes 563N and 564N.

The upper tongue portion 621 projects from the lower connecting plate 611N toward the bobbin portion 680. The upper tongue portion 621 is thinner than the lower connecting plate 611N. The lower connecting plate 611N includes a thin region 623 formed so as to be thinner by the thickness of the upper tongue portion 621. The upper tongue portion 621 and the thin region 623 are utilized for the connection with the bobbin portion 680.

The lower tongue portion 622 projects from the lower plate 612N toward the bobbin portion 680. The lower tongue portion 622 is utilized for the connection between the bobbin portions 610N and 680.

The bobbin portion 660 includes an upper plate 661, an upper connecting plate 662, a tube-like portion 663, connection bosses 664 and 665, an upper tongue portion 666, and a lower tongue portion 667. The upper tongue portion 666 projects from the upper plate 661 toward the bobbin portion 540N. The upper plate 541N of the bobbin portion 540N has an outline and a shape that enable the upper plate 541N to accommodate the upper tongue portion 666 of the bobbin portion 660. The upper plate 661 of the bobbin portion 660 has an outline and a shape that enable the upper plate 661 to accommodate the upper tongue portion 565 of the bobbin portion 540N. Accordingly, the upper plates 541N and 661 form a planar surface. The linkage portion 221N extends along the plane formed by the upper plates 541N and 661.

The lower tongue portion 667 has a thickness approximately the same as the thicknesses of the lower tongue portion 566 of the bobbin portion 540N and the upper tongue portion 621 of the bobbin portion 610N. That is, the lower tongue portion 667 is thinner than the upper connecting plate 662. The lower tongue portion 667 projects from the upper connecting plate 662 toward the bobbin portion 540N. The lower tongue portion 667 is arranged in a cavity formed between the thin region 567 of the bobbin portion 540N and the lower connecting plate 611N of the bobbin portion 610N.

The upper connecting plate 662 includes a thin region 668 formed so as to be thinner by the thickness of the lower tongue portion 566 of the bobbin portion 540N. The lower tongue portion 566 is arranged in a cavity formed between the thin region 668 of the bobbin portion 660 and the bobbin portion 680.

Connection holes 671 and 672 are formed through the upper connecting plate 662. Connection bosses 664 and 665 project downward from the upper connecting plate 662. The connection holes 671 and 672, and the connection bosses 664 and 665 are utilized for the connection with the bobbin portion 680.

The bobbin portion 680 includes a lower connecting plate 681, a lower plate 682, a tube-like portion 683, connection bosses 684 and 685, an upper tongue portion 686, and a lower tongue portion 687. The upper tongue portion 686 projects from the lower connecting plate 681 toward the bobbin portion 610N. The upper tongue portion 686 has a thickness approximately the same as the lower tongue portion 566 of the bobbin portion 540N, the upper tongue portion 621 of the bobbin portion 610N, and the lower tongue portion 667 of the bobbin portion 660. That is, the upper tongue portion 686 is thinner than the lower connecting plate 681. The upper tongue portion 686 projects from the lower connecting plate 681 toward the bobbin portion 610N. The upper tongue portion 686 is arranged in a cavity formed between the thin region 623 of the bobbin portion 610N and the upper connecting plate 542N of the bobbin portion 540N.

The lower tongue portion 687 projects from the lower plate 682 toward the bobbin portion 610N. The lower plate 612N of the bobbin portion 610N has an outline and a shape that enable the lower plate 612N to accommodate the lower tongue portion 687. The lower plate 682 of the bobbin portion 680 has an outline and a shape that enable the lower plate 682 to accommodate the lower tongue portion 622 of the bobbin portion 610N. Accordingly, the lower plates 612N and 682 form a planar surface. The linkage portion 231N extends along the plane formed by the lower plates 612N and 682.

The lower connecting plate 681 includes a thin region 688 formed so as to be thinner by the thickness of the upper tongue portion 621 of the bobbin portion 610N. The upper tongue portion 621 is arranged in a cavity formed between the thin region 688 of the bobbin portion 680 and the bobbin portion 660.

Connection holes 691 and 692 are formed through the lower connecting plate 681. The connection bosses 664 and 665 of the bobbin portion 660 are fitted in the connection holes 691 and 692. The connection bosses 684 and 685 project upward from the lower connecting plate 681. The connection bosses 684 and 685 are fitted in the connection holes 671 and 672 of the bobbin portion 660.

The principle of the present embodiment is not limited to a specific connection structure among the bobbin portions 540N, 610N, 660, and 680. As another connection structure, an adhesive or another suitable connecting technique may be used.

The detour member 400F may be attached to at least one of the bobbin portions 540N, 610N, 660, and 680. The principle of the present embodiment is not limited to a specific attachment position of the detour member 400F.

Embodiment 18

Various coil structures different in arrangement of windings, which are a primary winding and a secondary winding, may be designed on the basis of the principle of Embodiment 17. Embodiment 18 describes various coil structures different in arrangement of windings. The principle of the present embodiment is not limited to a specific arrangement pattern of the windings.

Figure 27A:
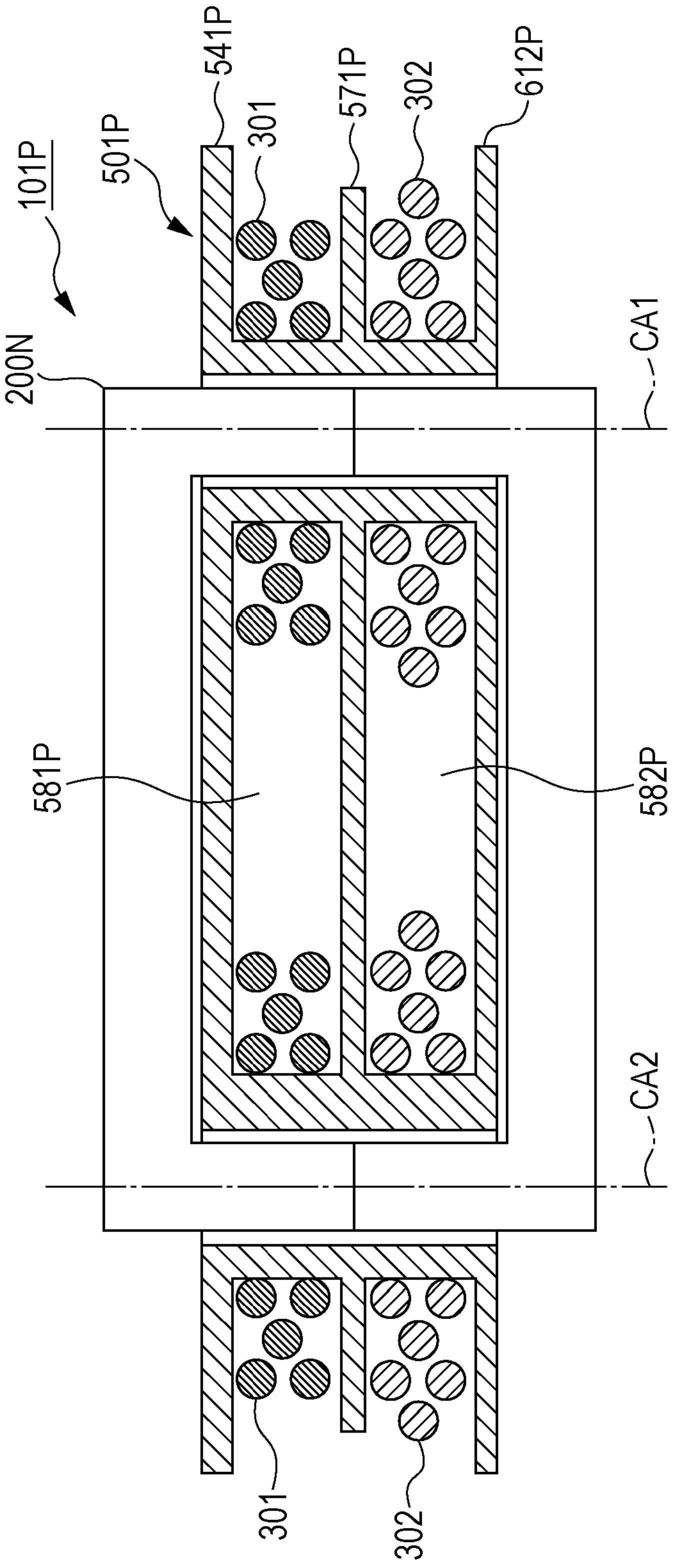
FIG. 27A is a schematic cross-sectional view of a coil structure according to Embodiment 18.
Figure 27B:
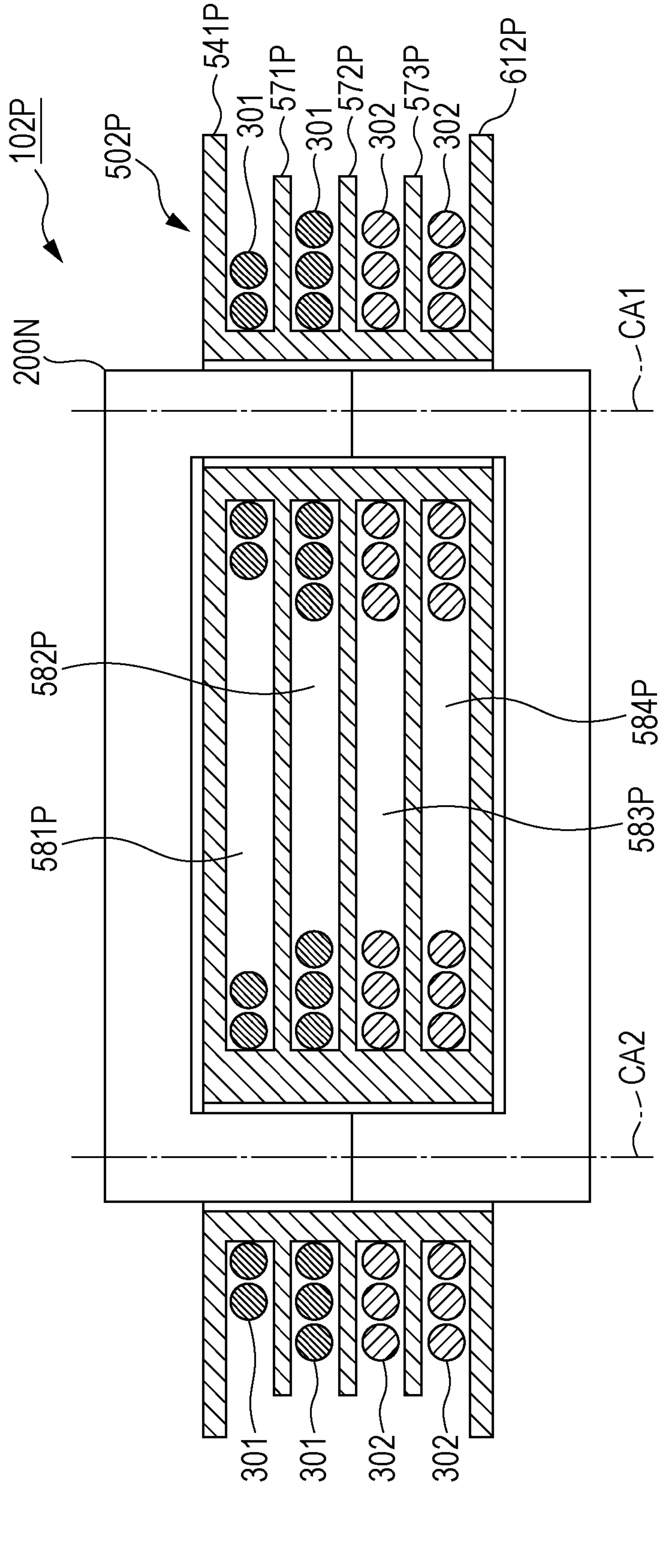
FIG. 27B is a schematic cross-sectional view of the coil structure according to Embodiment 18.
Figure 27C:
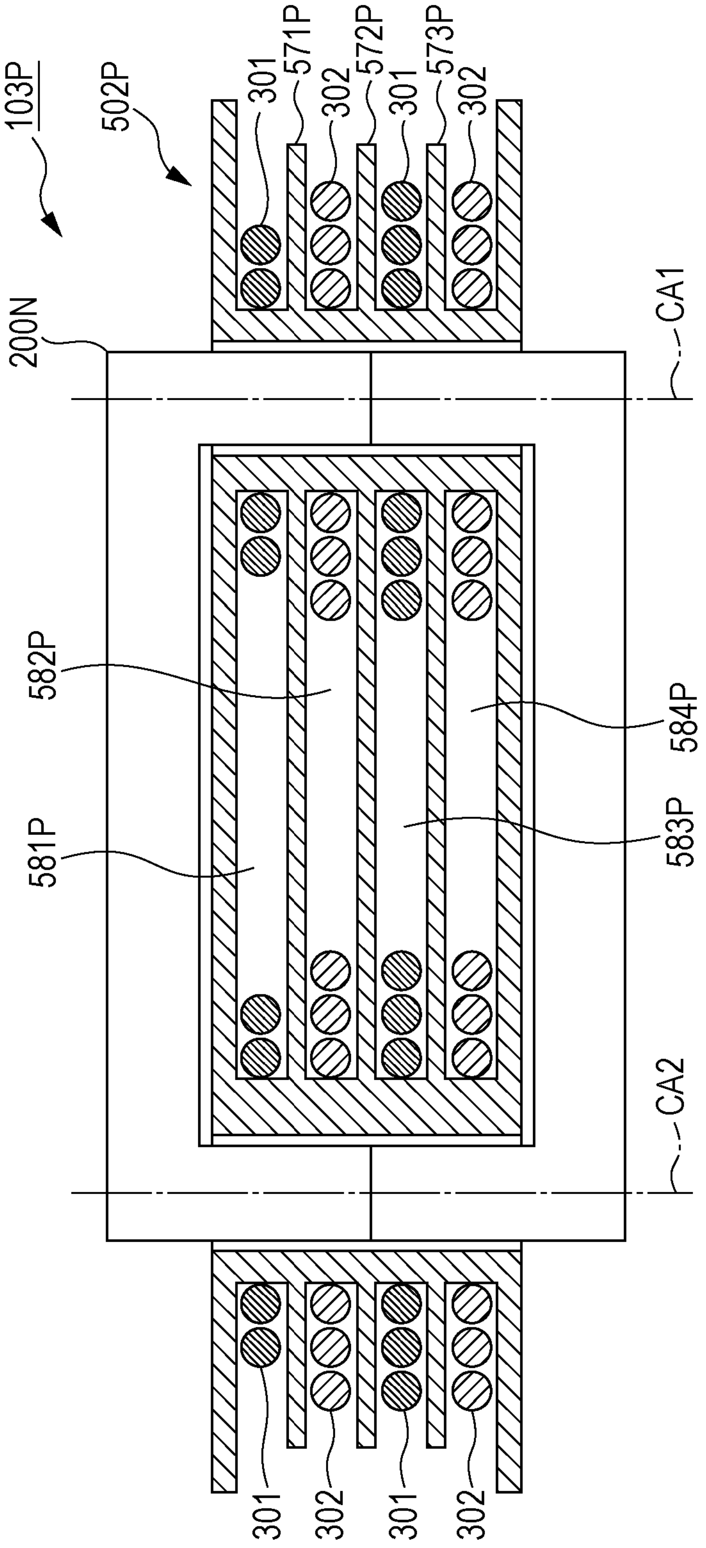
FIG. 27C is a schematic cross-sectional view of the coil structure according to Embodiment 18.

FIGS. 27A, 27B, and 27C are respective schematic cross-sectional views of coil structures 101P, 102P, and 103P manufactured on the basis of the design principle described in relation to Embodiment 17. The coil structures 101P, 102P, and 103P are described with reference to FIGS. 25, 27A, 27B, and 27C. The coil structures 101P, 102P, and 103P are different in arrangement of the windings, which are the primary winding and the secondary winding. The reference alphanumeric characters used in common in Embodiments 17 and 18 imply that the elements to which the common reference alphanumeric characters are given in Embodiment 18 have the same functions as the functions of the elements to which the common reference alphanumeric characters are given in Embodiment 17. Accordingly, the explanation in Embodiment 17 is applied to such elements in Embodiment 18.

A structure of the coil structure 101P is now described with reference to FIG. 27A. The coil structure 101P includes a primary winding 301, a secondary winding 302, and a magnetic core 200N. The primary winding 301 may form the coil portions 300 and 320 described with reference to FIG. 25. Alternatively, the primary winding 301 may form the coil portions 310 and 330 described with reference to FIG. 25. The secondary winding 302 may form the coil portions 310 and 330 described with reference to FIG. 25. Alternatively, the secondary winding 302 may form the coil portions 300 and 320 described with reference to FIG. 25.

The coil structure 101P further includes a bobbin structure 501P. The bobbin structure 501P includes an upper plate 541P, a lower plate 612P, a first partition plate 571P, and a detour member (not illustrated). The detour member forms a detour magnetic path between the upper plate 541P and the first partition plate 571P and/or between the lower plate 612P and the first partition plate 571P. The bobbin structure 501P corresponds to the bobbin structure 505N described with reference to FIG. 25. The upper plate 541P corresponds to the upper plates 541N and 661 described with reference to FIG. 25. The lower plate 612P corresponds to the lower plates 612N and 682 described with reference to FIG. 25. The first partition plate 571P corresponds to the combination of the upper connecting plates 542N and 662, and the lower connecting plates 611N and 681 described with reference to FIG. 25.

The upper plate 541P forms an upper surface of the bobbin structure 501P. The lower plate 612P forms a lower surface of the bobbin structure 501P. The first partition plate 571P partitions a space between the upper plate 541P and the lower plate 612P into a first region 581P and a second region 582P. The primary winding 301 is wound for five turns around the first coil axis CA1 in the first region 581P. The primary winding 301 is wound for five turns around the second coil axis CA2 in the first region 581P. The secondary winding 302 is wound for six turns around the first coil axis CA1 in the second region 582P. The secondary winding 302 is wound for six turns around the second coil axis CA2 in the second region 582P.

A structure of the coil structure 102P is described with reference to FIG. 27B. Similar to the coil structure 101P, the coil structure 102P includes the primary winding 301, the secondary winding 302, and the magnetic core 200N. The primary winding 301 is wound for five turns around the first coil axis CA1. The primary winding 301 is wound for five turns around the second coil axis CA2. The secondary winding 302 is wound for six turns around the first coil axis CA1. The secondary winding 302 is wound for six turns around the second coil axis CA2.

The coil structure 102P further includes a bobbin structure 502P. Similar to the bobbin structure 501P, the bobbin structure 502P includes an upper plate 541P, a lower plate 612P, a first partition plate 571P, and a detour member (not illustrated). The bobbin structure 502P further includes a second partition plate 572P below the first partition plate 571P, and a third partition plate 573P below the second partition plate 572P. The second partition plate 572P separates the third region 583P from the second region 582P. The third partition plate 573P separates a fourth region 584P from the third region 583P. The detour member defines a detour magnetic path that straddles at least one of the first region 581P, the second region 582P, the third region 583P, and the fourth region 584P.

Unlike the coil structure 101P, the primary winding 301 is wound for two turns in the first region 581P and wound for three turns in the second region 582P around the first coil axis CA1. The primary winding 301 is wound for two turns in the first region 581P and wound for three turns in the second region 582P around the second coil axis CA2.

The secondary winding 302 is arranged in the third region 583P and the fourth region 584P. The secondary winding 302 is wound for three turns in the third region 583P and wound for three turns in the fourth region 584P around the first coil axis CA1. The secondary winding 302 is wound for three turns in the third region 583P and wound for three turns in the fourth region 584P around the second coil axis CA2.

The coil structure 103P is now described with reference to FIG. 27C. Similar to the coil structure 102P, the coil structure 103P includes the primary winding 301, the secondary winding 302, the bobbin structure 502P, the magnetic core 200N, and a detour member (not illustrated). The primary winding 301 is wound for five turns around the first coil axis CA1. The primary winding 301 is wound for five turns around the second coil axis CA2. The secondary winding 302 is wound for six turns around the first coil axis CA1. The secondary winding 302 is wound for six turns around the second coil axis CA2.

Unlike the coil structure 102P, the primary winding 301 is wound in the first region 581P and the third region 583P. The secondary winding 302 is wound in the second region 582P and the fourth region 584P. Accordingly, the primary winding 301 and the secondary winding 302 are alternately arranged in a plurality of regions, which are the first region 581P, the second region 582P, the third region 583P, and the fourth region 584P divided by a plurality of partition plates, which are the first partition plate 571P, the second partition plate 572P, and the third partition plate 573P. That is, the regions in which the primary winding 301 is arranged are next to the regions in which the secondary winding 302 is arranged.

The primary winding 301 is wound for two turns in the first region 581P and wound for three turns in the third region 583P around the first coil axis CA1. The primary winding 301 is wound for two turns in the first region 581P and wound for three turns in the third region 583P around the second coil axis CA2. The secondary winding 302 is wound for three turns in the second region 582P and wound for three turns in the fourth region 584P around the first coil axis CA1. The secondary winding 302 is wound for three turns in the second region 582P and wound for three turns in the fourth region 584P around the second coil axis CA2.

Advantages of the coil structure 101P are now described. The coil structure 101P utilizes a smaller number of partition members than the number of partition members in the coil structures 102P and 103P so as to partition the space between the upper plate 541P and the lower plate 612P. Accordingly, relatively small dimensional values may be given to the coil structure 101P in the direction in which the first coil axis CA1 and the second coil axis CA2 extend.

Advantages of the coil structures 102P and 103P are now described. The numbers of turns of the windings in the coil structures 102P and 103P are smaller than the number of turns of the windings in the coil structure 101P in each of the regions. In addition, the voltage applied between the windings is small. Accordingly, the coil structures 102P and 103P may be structurally stronger against electrical breakdown of the winding than the coil structure 101P.

Lastly, advantages of the coil structure 103P are described. In the absence of the detour member, the coil structure 103P may achieve leakage inductance smaller than the leakage inductance achieved by the coil structures 101P and 102P. That is, the adjustment range of the leakage inductance using the detour member is large. Accordingly, when the design principle of the coil structure 103P is employed, the leakage inductance may be set so as to have various magnitudes by utilizing the detour member.

The principle of the present embodiment enables various coil structures to be designed. In view of the above-described various advantages, the arrangement pattern of the windings in the coil structure may be decided. The number of turns of the winding in each region may be decided, depending on the design parameters including the leakage inductance, the maximum magnetic flux density, and the input-to-output voltage ratio, which are desired. For example, in designing the coil structure 102P, the leakage inductance may be decreased by increasing the number of turns of the primary winding 301 in the second region 582P.

Embodiment 19

Various coil structures that form a plurality of detour magnetic paths may be designed on the basis of the design principle described in relation to Embodiment 17. Embodiment 19 describes an example of a coil structure that forms a plurality of detour magnetic paths.

Figure 28:
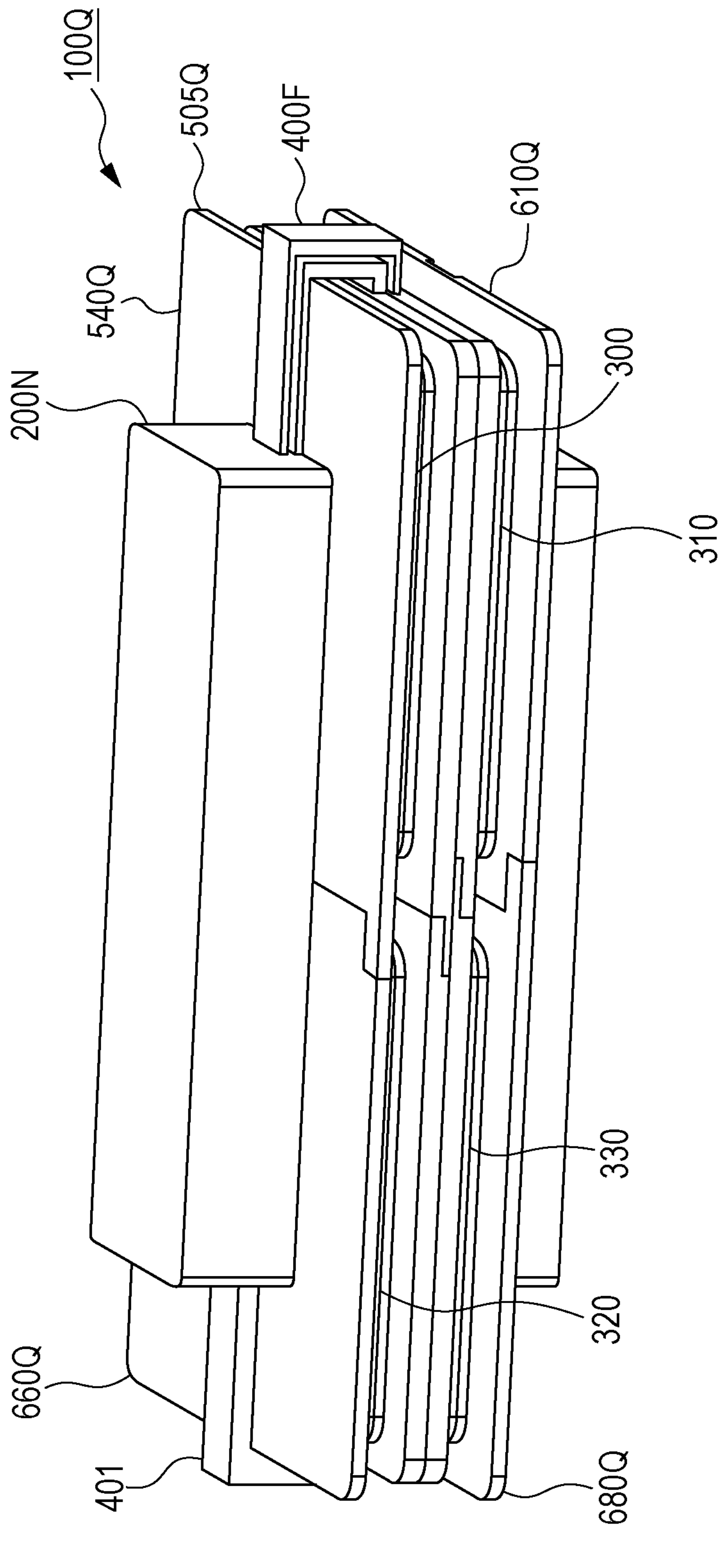
FIG. 28 is a schematic perspective view of a coil structure according to Embodiment 19.

FIG. 28 is a schematic perspective view of a coil structure 100Q according to Embodiment 19. The coil structure 100Q is described with reference to FIG. 28. The reference alphanumeric characters used in common in Embodiments 15, 17, and 19 imply that the elements to which the common reference alphanumeric characters are given in Embodiment 19 have the same functions as the functions of the elements to which the common reference alphanumeric characters are given in Embodiment 15 or 17. Accordingly, the explanation in Embodiment 15 or 17 is applied to such elements in Embodiment 19.

Similar to Embodiment 17, the coil structure 100Q includes the magnetic core 200N, the coil portions 300, 310, 320, and 330, and the detour member 400F. Similar to Embodiment 15, the coil structure 100Q further includes the detour member 401.

The coil structure 100Q further includes a bobbin structure 505Q. The bobbin structure 505Q includes a fixing structure for fixing the detour members 400F and 401. The fixing structure may be the grooved structure and the engaging structure described in relation to Embodiment 15.

The bobbin structure 505Q includes bobbin portions 540Q, 610Q, 660Q, and 680Q. The coil portion 300 surrounds the bobbin portion 540Q. The coil portion 310 surrounds the bobbin portion 610Q. The coil portion 320 surrounds the bobbin portion 660Q. The coil portion 330 surrounds the bobbin portion 680Q. The detour member 400F forms a detour magnetic path around the bobbin portion 540Q. The detour member 401 forms a detour magnetic path around the bobbin portion 660Q. Alternatively, the coil structure may be designed so that respective detour magnetic paths are formed around the bobbin portions 540Q, 610Q, 660Q, and 680Q. The principle of the present embodiment is not limited to specific formation positions of the detour magnetic paths.

The number of detour magnetic paths in the coil structure may be set to more than two. The principle of the present embodiment is not limited to a specific number of detour magnetic paths.

Embodiment 20

The coil structure described in relation to Embodiments 12 to 19 includes two coil portions aligned along one coil axis. Induced current may be caused in one of the two coil portions by supplying current to the other of the two coil portions. The coil portions may be arranged around each of two coil axes. In this case, induced current may be caused in the coil portion that surrounds one of the two coil axes by supplying current to the coil portion that surrounds the other of the two coil axes. Embodiment 20 describes a coil structure in which respective coil portions are arranged around two coil axes.

Figure 29:
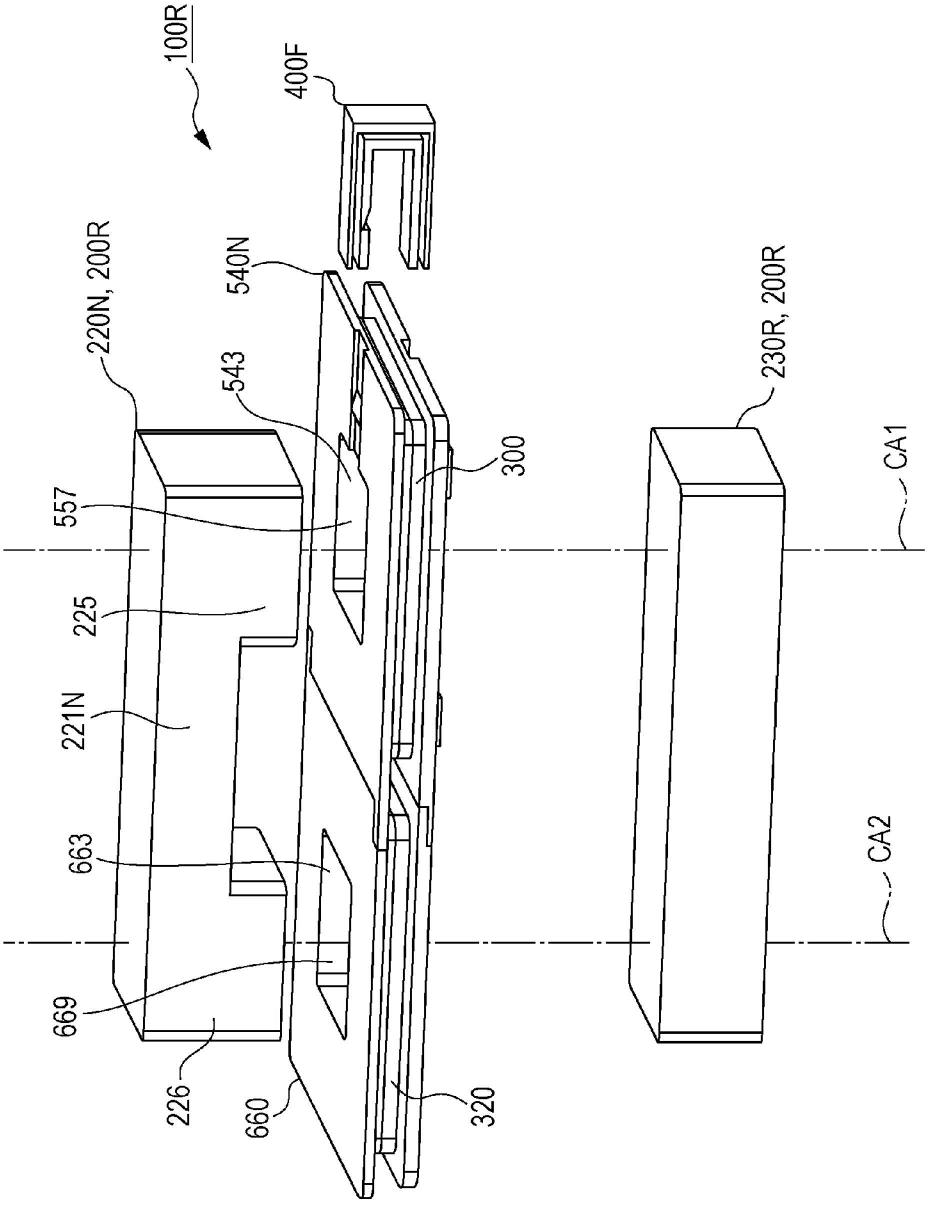
FIG. 29 is a schematic exploded perspective view of a coil structure according to Embodiment 20.

FIG. 29 is a schematic exploded perspective view of a coil structure 100R according to Embodiment 20. The coil structure 100R is described with reference to FIG. 29. The reference alphanumeric characters used in common in Embodiments 17 and 20 imply that the elements to which the common reference alphanumeric characters are given in Embodiment 20 have the same functions as the functions of the elements to which the common reference alphanumeric characters are given in Embodiment 17. Accordingly, the explanation in Embodiment 17 is applied to such elements in Embodiment 20.

Similar to Embodiment 17, the coil structure 100R includes the coil portions 300 and 320, the bobbin portions 540N and 660, and the detour member 400F. The coil portion 300 and the bobbin portion 540N surround the first coil axis CA1. The coil portion 320 and the bobbin portion 660 surround the second coil axis CA2 defined next to the first coil axis CA1. In the present embodiment, the bobbin portion 660 exemplifies the second bobbin portion. The coil portion 320 exemplifies the second coil portion.

The coil structure 100R further includes a magnetic core 200R. Similar to Embodiment 17, the magnetic core 200R includes the upper core 220N. The magnetic core 200R further includes a lower core 230R, which is shaped like a square bar.

The right core leg 225 is inserted into an insertion hole 557 defined by the tube-like portion 543 along the first coil axis CA1 and is connected to the lower core 230R. The left core leg 226 is inserted into an insertion hole 669 defined by the tube-like portion 663 along the second coil axis CA2 and is connected to the lower core 230R. In the present embodiment, the linkage portion 221N, which extends between the right core leg 225 and the left core leg 226, exemplifies the first linkage portion. The right core leg 225 exemplifies the first core leg. The left core leg 226 exemplifies the second core leg.

The lower core 230R is located apart from the linkage portion 221N in the direction in which the first coil axis CA1 and the second coil axis CA2 extend. In the present embodiment, the direction in which the first coil axis CA1 and the second coil axis CA2 extend exemplifies the first direction. The lower core 230R exemplifies the second linkage portion.

One of the coil portions 300 and 320 may be supplied with current. In this case, induced current occurs in the other of the coil portions 300 and 320.

Embodiment 21

The coil structure manufactured on the basis of the various embodiments described above may be included in a power converter that converts alternating current to direct current as a transformer. In this case, the power converter may be included in a charging apparatus that stores electrical energy. Embodiment 21 describes a power converter that includes a coil structure manufactured on the basis of the various embodiments described above.

Figure 30:
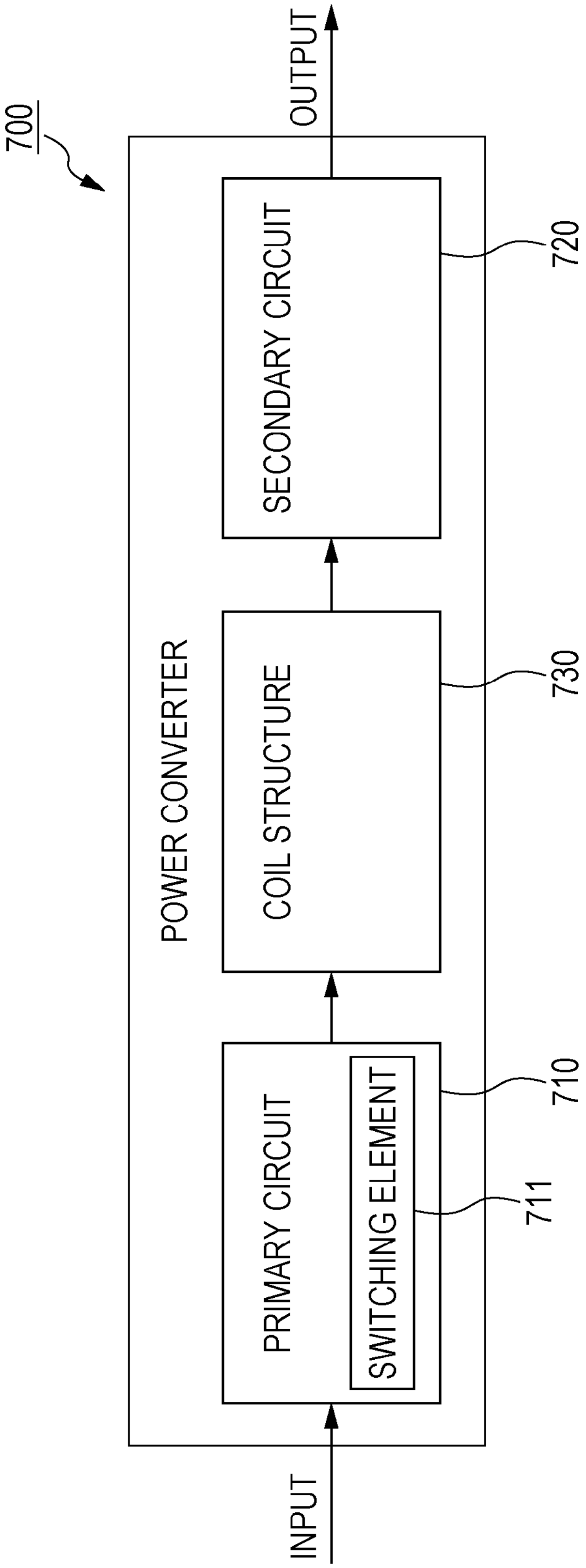
FIG. 30 is a schematic block view of a power converter according to Embodiment 21.

FIG. 30 is a schematic block view of a power converter 700 according to Embodiment 21. The power converter 700 is described with reference to FIG. 30.

The power converter 700 includes a primary circuit 710, a secondary circuit 720, and a coil structure 730. The primary circuit 710 includes a switching element 711. The timings at which the switching element 711 is turned on or off may be adjusted so as to stabilize the voltage of the secondary circuit 720. In the present embodiment, the primary circuit 710 exemplifies the switching circuit.

The coil structure 730 may be formed on the basis of the principle of any one of the above-described various embodiments. Alternatively, the coil structure 730 may be formed on the basis of a combination of the principles of the above-described various embodiments.

The coil structure 730 may function as a transformer that insulates the secondary circuit 720 from the primary circuit 710.

The power converter 700 may convert the alternating current input to the primary circuit 710 to direct current. In this case, the power converter 700 may be included in a charging apparatus.

The principles of the above-described various embodiments may be combined as to fit uses of the coil structure or properties that the coil structure is desired to have.

The principles of the above-described embodiments may be suitably utilized for various apparatuses that uses electromagnetic induction.

What is claimed is:

1. A coil structure comprising:

a magnetic core that defines a closed loop magnetic path in which a magnetic flux flows, the magnetic core including a core leg;

a coil that is wound around the core leg about a coil axis extending in a first direction, the coil generating the magnetic flux;

a detour member that is separate from the magnetic core, the detour member defining a detour magnetic path that detours around the closed loop magnetic path between a first point and a second point located apart from the first point in the first direction, one of the first point and the second point being located at a position at which a part of the magnetic flux that flows along the core leg is caused to flow into the detour magnetic path, the other of the first point and the second point being located at a position at which the part of the magnetic flux that flows along the detour magnetic path is caused to meet the magnetic flux that flows along the core leg, the detour member including a first piece and a second piece, the first piece defining the first point, the second piece defining the second point; and a fixing portion that includes an adjoining member and a connecting portion, the adjoining member adjoining the core leg, the connecting portion connecting at least one of the first piece and the second piece to the adjoining member, the connecting portion fixing a first positional relation between the core leg and the first point and a second positional relation between the core leg and the second point.

2. The coil structure according to claim 1, wherein the adjoining member includes a bobbin portion that includes: a tube-like portion around which the coil is wound; a first plate extending outward from the tube-like portion; and a second plate being located apart from the first plate in the first direction and extending outward from the tube-like portion, and the connecting portion connects the first piece to the first plate.

3. The coil structure according to claim 2, wherein the connecting portion connects the second piece to the second plate.

4. The coil structure according to claim 2, wherein the connecting portion includes a insertion hole being provided to the first plate and extending in a second direction, and the connecting portion connects the first piece to the adjoining member by causing the first piece to be inserted into the insertion hole.

5. The coil structure according to claim 2, wherein the connecting portion includes an insertion groove being provided to the first plate and extending in a second direction, and the connecting portion connects the first piece to the adjoining member by causing the first piece to be inserted into the insertion groove.

6. The coil structure according to claim 2, wherein the detour member includes an outer shell member that covers the detour member at least partially.

7. The coil structure according to claim 6, wherein the connecting portion includes an insertion groove being provided to the first plate and extending in a second direction the connecting portion connects the first piece to the adjoining member by causing the outer shell member to be inserted into the insertion groove, the connecting portion includes a projecting portion that projects in the insertion groove, the outer shell member includes a depressed portion complementary to the projecting portion, and engagement of the projecting portion and the depressed portion hinders displacement of the first piece in the second direction.

8. The coil structure according to claim 6, wherein the connecting portion includes an insertion groove being provided to the first plate and extending in a second direction the connecting portion connects the first piece to the adjoining member by causing the outer shell member to be inserted into the insertion groove, the connecting portion includes a depressed portion that is depressed in the insertion groove, the outer shell member includes a projecting portion complementary to the depressed portion, and engagement of the projecting portion and the depressed portion hinders displacement of the first piece in the second direction.

9. The coil structure according to claim 6, wherein the detour member includes a first magnetic piece and a second magnetic piece arranged next to the first magnetic piece, the first magnetic piece including the first piece and the second piece, and the outer shell member includes an accommodation groove capable of accommodating the first magnetic piece and the second magnetic piece.

10. The coil structure according to claim 2, wherein the detour member is detachable from the bobbin portion.

11. The coil structure according to claim 1, wherein the detour member includes a first magnetic material, the magnetic core includes a second magnetic material, and the first magnetic material is different from the second magnetic material.

12. A power converter comprising:

the coil structure according to claim 1; and a switching circuit that includes a switching element.

13. A coil structure comprising:

a magnetic core that includes a ring-like portion;

a coil wound around a part of the ring-like portion of the magnetic core;

a detour member that includes a U-shaped magnetic piece having a first end and a second end and detours a part of a magnetic flux that flows in the magnetic core, the first end and the second end facing each of both adjacent parts of the magnetic core, the both adjacent parts connecting to the part around which the coil is wound; and a fixing portion that fixes a positional relation between the magnetic core and the detour member, wherein the fixing portion includes:

a bobbin portion that adjoins the part of the magnetic core, the bobbin portion including: a tube-like portion around which the coil is wound; a first plate extending outward from the tube-like portion; and a second plate located apart from the first plate along the tube-like portion and extending outward from the tube-like portion; and a connecting portion that connects the detour member to the bobbin portion.

14. The coil structure according to claim 13, wherein the U-shaped magnetic piece includes round corners or right-angled corners.

15. The coil structure according to claim 13, wherein the detour member is detachable from the bobbin portion.

16. A power converter comprising:

the coil structure according to claim 13; and a switching circuit that includes a switching element.

* * * * *